(12) United States Patent
Tuck

(10) Patent No.: US 12,096,395 B2
(45) Date of Patent: Sep. 17, 2024

(54) METHODS AND APPARATUS FOR RADIO FREQUENCY POWER MODE SELECTION

(71) Applicant: QUALCOMM Incorporated, San Diego, CA (US)

(72) Inventor: David Tuck, San Juan Capistrano, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 17/476,308

(22) Filed: Sep. 15, 2021

(65) Prior Publication Data
US 2023/0082416 A1 Mar. 16, 2023

(51) Int. Cl.
H04W 64/00 (2009.01)
H04W 4/021 (2018.01)
H04W 52/28 (2009.01)

(52) U.S. Cl.
CPC ......... *H04W 64/006* (2013.01); *H04W 4/021* (2013.01); *H04W 52/283* (2013.01)

(58) Field of Classification Search
CPC ....... H04W 64/00; H04W 4/90; H04W 76/50; H04W 4/02; H04W 16/14; H04W 24/00; H04W 24/10; H04W 4/029; H04W 52/283; H04W 72/0453; H04W 72/542; H04W 4/80; H04W 36/08; H04W 56/001; H04W 36/302; H04W 36/30; H04W 84/12; H04W 36/18; H04W 52/40; H04W 64/003; H04W 72/12; H04W 24/04; H04W 4/027; H04W 4/33; H04W 52/143; H04W 72/0446; H04W 24/02; H04W 16/10; H04W 72/02; H04W 72/04; H04W 72/54; H04W 72/56; H04W 28/26; H04W 36/305; H04W 52/0245; H04W 52/228; H04W 52/28; H04W 36/32; H04W 4/025; H04W 40/18; H04W 40/20; H04W 52/282; H04W 72/00; H04W 92/18
See application file for complete search history.

(56) References Cited

U.S. PATENT DOCUMENTS

2008/0126282 A1  5/2008  Sinclair et al.
2010/0056181 A1  3/2010  Rippon et al.
(Continued)

OTHER PUBLICATIONS

International Search Report and Written Opinion—PCT/US2022/042296—ISA/EPO—Dec. 19, 2022.

*Primary Examiner* — Kwasi Karikari
(74) *Attorney, Agent, or Firm* — Thien T. Nguyen

(57) ABSTRACT

A mobile device may be configured to build a power mode database for positioning based on the mobile device's location and associate power mode information, including the operating mode that is requested for positioning and the operating mode that is used for positioning at the location. Additional factors may be associated with the location including contextual information, such as user context, environmental context, and temporal context. The power mode database may be a local database on the mobile device or a remote database, such as a crowdsourced database, accessible via a server. The mobile device may access the power mode database based on a current location and requested operating mode, as well as contextual information, to obtain the actual operating mode to be used for positioning at the location.

46 Claims, 18 Drawing Sheets

(56) References Cited

U.S. PATENT DOCUMENTS

| | | |
|---|---|---|
| 2011/0161276 A1 | 6/2011 | Krumm et al. |
| 2012/0052873 A1 | 3/2012 | Wong |
| 2015/0005026 A1 | 1/2015 | Wild et al. |
| 2017/0142684 A1* | 5/2017 | Bhatt .................. G01S 5/02521 |
| 2017/0249007 A1 | 8/2017 | Hardin et al. |
| 2018/0087909 A1 | 3/2018 | Do et al. |
| 2020/0382919 A1* | 12/2020 | Huang ...................... G01S 5/01 |

* cited by examiner

400 →

| Location | Requested Mode | Context Parameters i | ... | Context Parameters n | Actual Mode |
|---|---|---|---|---|---|
| Loc A | | | | | |
| Loc A | | | | | |
| Loc A | | | | | |
| Loc B | | | | | |

| | Requested Power Mode | Actual Power Mode | Session Results (3D PUNC, yield, power) | | | | |
|---|---|---|---|---|---|---|---|
| Zone | Accuracy, Power, TBF | Power Mode | n | n-1 | n-2 | f1()=Median | Freq |
| 1 | High, High, 1 | mode1a | 8,100,17.0 | 8,100,16.8 | | 8,100,17.0 | 2 |
| | High, High, 1 | mode1b | 10,100, 14.0 | 15, 50, 20.0 | 10,100,13.9 | 10, 100, 14.0 | 3 |
| 2 | Low, Low, 10 | mode3a | 25, 95, 8.1 | 26, 94, 8.0 | | 26, 95, 8.0 | 2 |
| | Low, Low, 10 | mode3b | 28, 85, 7.5 | 30, 85, 7.6 | 26, 86, 7.5 | 28, 85, 7.5 | 3 |
| | Low, Low, 10 | mode4 | 22, 75, 5.5 | 21, 56, 5.6 | | 22, 75, 5.6 | 2 |
| 3 | High, Low, 1 | mode1a | 8,100,16.9 | 9,100,17.3 | | 9, 100, 17.3 | 2 |
| | High, Low, 1 | mode3a | 25, 99, 8.3 | 29, 95, 8.2 | | 29, 95, 8.3 | 2 |

FIG. 4B

METHODS AND APPARATUS FOR RADIO FREQUENCY POWER MODE SELECTION

BACKGROUND OF THE DISCLOSURE

1. Field of the Disclosure

Aspects of the disclosure relate generally to wireless communications and positioning.

2. Description of the Related Art

A receiver for Satellite Positioning Systems (SPS) and a transceiver for wireless communication systems are often embedded in a mobile device, such as a mobile phone, a wearable device, a laptop computer, an Internet of Thing (IoT) device, etc. SPS, for example, may include Global Navigation Satellite Systems (GNSS), such as Global Positioning System (GPS), while wireless communication systems include, e.g., terrestrial Wireless Wide Area Networks (WWAN), such as Long-Term Evolution (LTE) or Fifth Generation New Radio (5G NR), non-terrestrial WWANs, e.g., satellite communication systems, and Wireless Local Area Networks (WLAN), such as Wi-Fi. The SPS receiver may receive SPS signals from satellite vehicles and provide the SPS signals to a positioning operation, whereas the wireless communication transceiver may receive and transmit wireless data and control signals for various communication operations.

The wireless transceivers or receiver for SPS may be used for various functionalities of a mobile device, such as an IoT device, and may consume device power. For example, in areas where SPS signals are unavailable, e.g., in urban canyons or indoors, operating the SPS receiver may unnecessarily consume device power. Moreover, actively performing positioning measurements, e.g., using the SPS receiver and/or the wireless transceiver, in areas where a high degree of positioning accuracy is not required may unnecessarily consume power. Power savings modes have been implemented in some mobile device, e.g., to dynamically select, enable or disable wireless communications technologies or wireless transceivers when signals are not available. There exists a substantial need for improvement in the management of mobile device power consumption based on wireless transceivers or wireless technologies for smooth operation and additional power savings.

SUMMARY

A mobile device may be configured to build a power mode database for positioning based on the mobile device's location and associate power mode information, including the operating mode that is requested for positioning and the operating mode that is used for positioning at the location. Additional factors may be associated with the location including contextual information, such as user context, environmental context, and temporal context. The power mode database may be a local database on the mobile device or a remote database, such as a crowdsourced database, accessible via a server. The mobile device may access the power mode database based on a current location and requested operating mode, as well as contextual information, to obtain the actual operating mode to be used for positioning at the location.

In one implementation, a method performed by a mobile device for building a power mode database for positioning, the method includes determining one or more location zones in which the mobile device is located; determining power mode information for radio frequency (RF) reception that is associated with each location zone, the power mode information comprising a requested operating power mode and an actual operating power mode used in each location zone, wherein the power mode information comprises types and frequencies of RF signals received for positioning; and storing each location zone and the power mode information associated with each location zone in the power mode database.

In one implementation, a mobile device configured for building a power mode database for positioning, the mobile device includes a wireless transceiver configured to wirelessly communicate with entities in a wireless network; at least one memory; and at least one processor coupled to the wireless transceiver and the at least one memory, wherein the at least one processor is configured to: determine one or more location zones in which the mobile device is located; determine power mode information for radio frequency (RF) reception that is associated with each location zone, the power mode information comprising a requested operating power mode and an actual operating power mode used in each location zone, wherein the power mode information comprises types and frequencies of RF signals received for positioning; and store each location zone and the power mode information associated with each location zone in the power mode database.

In one implementation, a mobile device configured for building a power mode database for positioning, the mobile device includes means for determining one or more location zones in which the mobile device is located; means for determining power mode information for radio frequency (RF) reception that is associated with each location zone, the power mode information comprising a requested operating power mode and an actual operating power mode used in each location zone, wherein the power mode information comprises types and frequencies of RF signals received for positioning; and means for storing each location zone and the power mode information associated with each location zone in the power mode database.

In one implementation, a non-transitory storage medium including program code stored thereon, the program code is operable to configure at least one processor in a mobile device for building a power mode database for positioning, the program code comprising instructions to: determine one or more location zones in which the mobile device is located; determine power mode information for radio frequency (RF) reception that is associated with each location zone, the power mode information comprising a requested operating power mode and an actual operating power mode used in each location zone, wherein the power mode information comprises types and frequencies of RF signals received for positioning; and store each location zone and the power mode information associated with each location zone in the power mode database.

In one implementation, a method performed by a mobile device for using a power mode database for positioning, the method includes determining a current location zone in which the mobile device is located; obtaining from the power mode database an actual operating power mode to be used in the current location zone based on the current location zone and a requested operating power mode, wherein the power mode database includes a plurality of location zones and power mode information associated with each location zone, the power mode information comprising the requested operating power mode and the actual operating power mode associated with each location zone; and applying the actual operating power mode to receive radio frequency (RF) signals for positioning in the current location zone.

In one implementation, a mobile device configured for using a power mode database for positioning, the mobile device includes a wireless transceiver configured to wirelessly communicate with entities in a wireless network; at least one memory; and at least one processor coupled to the wireless transceiver and the at least one memory, wherein the at least one processor is configured to: determine a current location zone in which the mobile device is located; obtain from the power mode database an actual operating power mode to be used in the current location zone based on the current location zone and a requested operating power mode, wherein the power mode database includes a plurality of location zones and power mode information associated with each location zone, the power mode information comprising the requested operating power mode and the actual operating power mode associated with each location zone; and apply the actual operating power mode to receive radio frequency (RF) signals for positioning in the current location zone.

In one implementation, a mobile device configured for using a power mode database for positioning, the mobile device includes means for determining a current location zone in which the mobile device is located; means for obtaining from the power mode database an actual operating power mode to be used in the current location zone based on the current location zone and a requested operating power mode, wherein the power mode database includes a plurality of location zones and power mode information associated with each location zone, the power mode information comprising the requested operating power mode and the actual operating power mode associated with each location zone; and means for applying the actual operating power mode to receive RF signals for positioning in the current location zone.

In one implementation, a non-transitory storage medium including program code stored thereon, the program code is operable to configure at least one processor in a mobile device for using a power mode database for positioning, the program code comprising instructions to: determine a current location zone in which the mobile device is located; obtain from the power mode database an actual operating power mode to be used in the current location zone based on the current location zone and a requested operating power mode, wherein the power mode database includes a plurality of location zones and power mode information associated with each location zone, the power mode information comprising the requested operating power mode and the actual operating power mode associated with each location zone; and apply the actual operating power mode to receive RF signals for positioning in the current location zone.

In one implementation, a method performed by a server for building a power mode database for positioning, includes receiving, from at least one mobile device, location zones in which each of the at least one mobile device is located and power mode information for radio frequency (RF) reception that is associated with each location zone, the power mode information comprising a requested operating power mode and an actual operating power mode used in each location zone, wherein an operating power mode comprises types and frequencies of RF signals received for positioning; and storing each location zone and the power mode information associated with each location zone in the power mode database.

In one implementation, a server configured for building a power mode database for positioning, the server includes an external interface configured to communicate with entities in a wireless network; at least one memory; and at least one processor coupled to the external interface and the at least one memory, wherein the at least one processor is configured to: receive, from at least one mobile device, via the external interface, location zones in which each of the at least one mobile device is located and power mode information for radio frequency (RF) reception that is associated with each location zone, the power mode information comprising a requested operating power mode and an actual operating power mode used in each location zone, wherein an operating power mode comprises types and frequencies of RF signals received for positioning; and store each location zone and the power mode information associated with each location zone in the power mode database.

In one implementation, a server configured for building a power mode database for positioning, includes means for receiving, from at least one mobile device, location zones in which each of the at least one mobile device is located and power mode information for radio frequency (RF) reception that is associated with each location zone, the power mode information comprising a requested operating power mode and an actual operating power mode used in each location zone, wherein an operating power mode comprises types and frequencies of RF signals received for positioning; and means for storing each location zone and the power mode information associated with each location zone in the power mode database.

In one implementation, a non-transitory storage medium including program code stored thereon, the program code is operable to configure at least one processor in a server for building a power mode database for positioning, the program code comprising instructions to: receive, from at least one mobile device, location zones in which each of the at least one mobile device is located and power mode information for radio frequency (RF) reception that is associated with each location zone, the power mode information comprising a requested operating power mode and an actual operating power mode used in each location zone, wherein an operating power mode comprises types and frequencies of RF signals received for positioning; and store each location zone and the power mode information associated with each location zone in the power mode database.

In one implementation, a method performed by a server for using a power mode database for positioning, includes receiving from a mobile device a current location zone in which the mobile device is located; receiving from the mobile device a requested operating power mode for the mobile device in the current location zone, wherein the requested operating power mode comprises types and frequencies of radio frequency (RF) signals received for positioning; obtaining from the power mode database an actual operating power mode to be used by the mobile device in the current location zone based on the current location zone and the requested operating power mode, wherein the power mode database includes a plurality of location zones and power mode information associated with each location zone, the power mode information comprising the requested operating mode and the actual operating mode associated with each location zone; and sending an indication of the actual operating power mode to the mobile device, the actual operating power mode to be used by the mobile device to receive RF signals for positioning in the current location zone.

In one implementation, a server configured for using a power mode database for positioning, the server includes an external interface configured to communicate with entities in a wireless network; at least one memory; and at least one processor coupled to the external interface and the at least one memory, wherein the at least one processor is configured to: receive, via the external interface, from a mobile device a current location zone in which the mobile device is located; receive, via the external interface, from the mobile device a requested operating power mode for the mobile device in the current location zone, wherein the requested operating power mode comprises types and frequencies of radio frequency (RF) signals received for positioning; obtain from the power mode database an actual operating power mode to be used by the mobile device in the current location zone based on the current location zone and the requested operating power mode, wherein the power mode database includes a plurality of location zones and power mode information associated with each location zone, the power mode information comprising the requested operating mode and the actual operating mode associated with each location zone; and send, via the external interface, an indication of the actual operating power mode to the mobile device, the actual operating power mode to be used by the mobile device to receive RF signals for positioning in the current location zone.

In one implementation, a server configured for using a power mode database for positioning, includes means for receiving from a mobile device a current location zone in which the mobile device is located; means for receiving from the mobile device a requested operating power mode for the mobile device in the current location zone, wherein the requested operating power mode comprises types and frequencies of radio frequency (RF) signals received for positioning; means for obtaining from the power mode database an actual operating power mode to be used by the mobile device in the current location zone based on the current location zone and the requested operating power mode, wherein the power mode database includes a plurality of location zones and power mode information associated with each location zone, the power mode information comprising the requested operating mode and the actual operating mode associated with each location zone; and means for sending an indication of the actual operating power mode to the mobile device, the actual operating power mode to be used by the mobile device to receive RF signals for positioning in the current location zone.

In one implementation, a non-transitory storage medium including program code stored thereon, the program code is operable to configure at least one processor in a server for using a power mode database for positioning, the program code comprising instructions to: receive from a mobile device a current location zone in which the mobile device is located; receive from the mobile device a requested operating power mode for the mobile device in the current location zone, wherein the requested operating power mode comprises types and frequencies of radio frequency (RF) signals received for positioning; obtain from the power mode database an actual operating power mode to be used by the mobile device in the current location zone based on the current location zone and the requested operating power mode, wherein the power mode database includes a plurality of location zones and power mode information associated with each location zone, the power mode information comprising the requested operating mode and the actual operating mode associated with each location zone; and send an indication of the actual operating power mode to the mobile device, the actual operating power mode to be used by the mobile device to the mobile device to receive RF signals for positioning in the current location zone.

BRIEF DESCRIPTION OF THE DRAWINGS

Aspects of the disclosure are illustrated by way of example. In the accompanying figures, like reference numbers indicate similar elements.

FIG. 4A illustrates an example of a power mode database.

FIG. 4B illustrates a table with examples of the type of data that may be collected and stored in the database and used for likelihood estimation.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

Satellite Positioning System (SPS) receivers and wireless transmitters, such as Wireless Wide Area Network (WWAN) and Wireless Local Area Network (WLAN) transmitters, are often embedded in a mobile device, such as a mobile phone, a wearable device, a laptop computer, an Internet of Thing (IoT) device, or a semiautonomous or autonomous vehicle, such as a ground vehicle, i.e., a self-driving car or truck, or an aerial vehicle, such as an unmanned aerial vehicle (UAV) sometimes referred to as a drone, etc. The SPS receiver may receive SPS signals from satellite vehicles and performs positioning operations based on the received SPS signals. The SPS receiver may support different global or regional positioning systems, such as Global Positioning System (GPS) signals, GLOobal NAvigation Satellite System (GLONASS) signals, Galileo (GAL) signals, BeiDou (BDS) signals, and/or signals of other type of satellite positioning system.

The wireless transmitter transmits and receives wireless signals for various communication operations, including data and control, and positioning. A WWAN transmitter may support various communications systems including, for example, include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). Additionally, the WWAN transmitter may support non-terrestrial, e.g., satellite-based, communication systems. In some implementations, satellite-based communication systems may be combined with terrestrial wireless communications systems, such as 5G New Radio (NR) networks. In such a system, a mobile device may access a satellite, also referred to as a satellite vehicle (SV), instead of a terrestrial base station, which may connect to an earth station, also referred to as a ground station or non-terrestrial (NTN) gateway, which in turn may connect to a 5G network. A WLAN transmitter may support various communications systems including Wi-Fi, Long-Term Evolution (LTE) Direct, etc.

Figure 1:
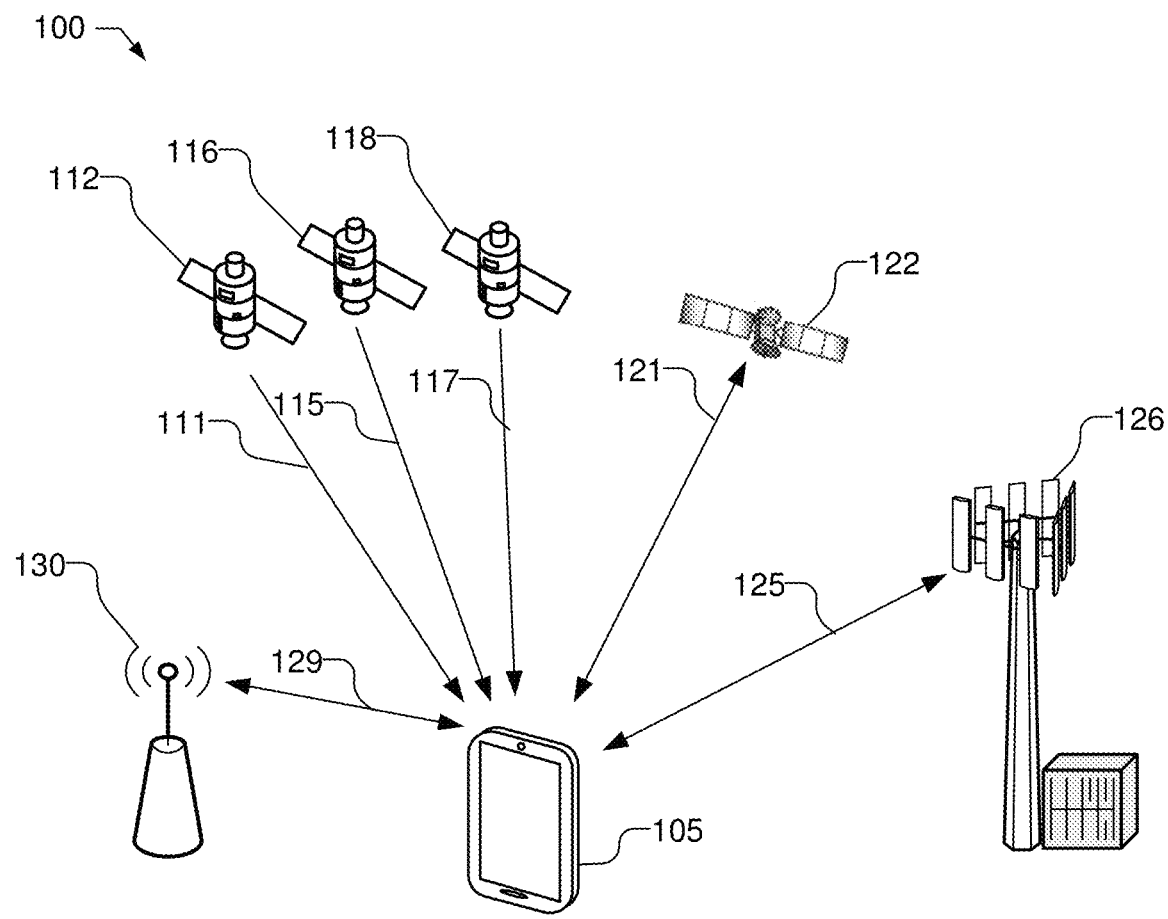
FIG. 1 illustrates a simplified diagram of a system in which a mobile device may build a power mode database and use the power mode database for power mode power mode selection during positioning.

FIG. 1 illustrates a simplified diagram of a system 100 in which a mobile device 105 receives SPS signals from positioning satellite vehicles 112, 116, and 118 and wireless signals from terrestrial base station 126, a communication satellite vehicle 122, and access point 130, which may be used for positioning. The mobile device 105 may build a power mode database based on location and associated factors including the power mode requested and used by the mobile device and may use the power mode database for power mode power mode selection during positioning. The SPS signals can be transmitted based on various satellite position signaling standards, such as a GPS, GLONASS, GAL, BDS, and/or other type of satellite positioning system. A mobile device 105 can include a satellite positioning system (SPS) receiver that may be compatible with one or more of these satellite position signaling standards. The SPS receiver may process the SPS signals on one or more frequency bands based on the signaling standards to extract information and perform a position calculation operation based on the extracted information.

Mobile device 105 may be a device designed to perform numerous functions, including the ability to determine its own position based on the reception of SPS signals from satellites. Mobile device 105, for example, may include a SPS receiver capable of receiving SPS signals from one or more satellites and one or more processors configured to perform satellite-based positioning. As shown here, mobile device 105 receives SPS signals 111, 115, and 117 from positioning satellite vehicles 112, 116, and 118, respectively. The SPS signals may be, e.g., any Global Navigation Satellite System (GNSS) such as GPS, GLONASS, GAL, or Beidou or some other local or regional system such as Indian Regional Navigation Satellite System (IRNSS), Quasi-Zenith Satellite System (QZSS), European Geostationary Navigation Overlay Service (EGNOS) or Wide Area Augmentation System (WAAS).

Typically, each of the SPS signals 111, 115, and 117 would include timing information relating to when the SPS signal was transmitted from the respective satellite. Each SPS signal may also include ephemeris information which can be used to determine the position of the satellite at the time the SPS signal is transmitted. Mobile device 105 is able to determine when it receives each of the SPS signals 111, 115, and 117. The transmission time and reception time of each SPS signal may be aligned on a common timing reference, such as a common clock, known to the mobile device 105. By taking the difference between the reception time and transmission time, mobile device 105 may compute the flight time associated with each SPS signal, for it to travel from the respective satellite to mobile device 105. The flight time can then be used to compute the distance between each satellite and mobile device, based on the speed of light. Once the distance between each satellite and the mobile device is found, multilateration may be used to compute the position of mobile device 105, based on the known position of each satellite and the distance between each satellite and mobile device 105. SPS signals may be further used for determining the velocity of the mobile device 105 and may be further used for determination of absolute time.

In addition to satellite-based positioning, the mobile device 105 may be configured to support positioning using terrestrial wireless signals. For example, the mobile device 105 may include one or more wireless transceivers capable of receiving (and transmitting) wireless signals from and to one or more terrestrial wireless nodes and one or more processors configured to perform positioning using the terrestrial wireless signals, e.g., by measuring the wireless signals and calculating the position of the mobile device 105 or sending the measurements to an external location server for position calculation. The mobile device 105, for example, may support positioning using terrestrial wireless signals from a plurality of base stations (illustrated by base station 126) and/or a plurality of access points (illustrated by access point 130). The base station 126 may be part of a Radio Access Network (RAN) in a Wireless Wide Area Network (WWAN) such as Long Term Evolution (LTE) network, a Fifth Generation (5G) network, etc., and the access point 130 may be part of a Wireless Local Area Network (WLAN), such as a IEEE 802.11 WiFi network, or a Wireless Personal Area Network (WPAN), such as a BlueTooth® network, etc. The mobile device 105 may receive downlink signals from the base station 126 and/or access point 130 and measure parameters such as timing, angle, power, or a combination thereof. In some implementations, the mobile device 105 may further transmit uplink signals that are received and measured by the base station 126 and/or access point 130. For example, the mobile device 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), or a round trip signal propagation time (RTT) between the mobile device 105 and a cellular transceiver (e.g. base station 126) or a local transceiver (e.g., access point 130). The mobile device 105 may use these measurements together with assistance data (e.g., terrestrial almanac data or GNSS satellite data such as GNSS Almanac and/or GNSS Ephemeris information) received from a location server (not shown) or broadcast by base station 126 to determine a location for the mobile device 105 using any one of several position methods such as, for example, GNSS, Assisted GNSS (A-GNSS), Advanced Forward Link Trilateration (AFLT), Observed Time Difference Of Arrival (OTDOA), TDOA, AOA, AOD, RTT, etc.

An estimate of a location of the mobile device 105 may be referred to as a location, location estimate, location fix, fix, position, position estimate or position fix, and may be geographic, thus providing location coordinates for the mobile device 105 (e.g., latitude and longitude) which may or may not include an altitude component (e.g., height above sea level, height above or depth below ground level, floor level or basement level). Alternatively, a location of the mobile device 105 may be expressed as a civic location (e.g., as a postal address or the designation of some point or small area in a building such as a particular room or floor). A location of the mobile device 105 may also be expressed as an area or volume (defined either geographically or in civic form) within which the mobile device 105 is expected to be located with some likelihood or confidence level (e.g., 67%, 95%, etc.). A location of the mobile device 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. The location may be expressed as an absolute location estimate for the mobile device, such as location coordinates or address, or as a relative location estimate for the mobile device, such as a distance and direction from a previous location estimate or from a known absolute location. The location of the mobile device may include a linear velocity, an angular velocity, a linear acceleration, an angular acceleration, an angular orientation for the mobile device, e.g., the orientation of the mobile device relative to a fixed global or local coordinate system, an identification of a trigger event for locating the mobile device, or some combination of these. For example, trigger events may include an area event, a motion event, or a velocity event. An area event, for example, may be the mobile device moving into a defined area, moving out of the area and/or remaining in the area. A motion event, for example, may include movement of the mobile device by a threshold straight line distance or threshold distance along a mobile device trajectory. A velocity event, for example, may include the mobile device attaining a minimum or maximum velocity, a threshold increase and/or decrease of velocity, and/or a threshold change in direction. In the description contained herein, the use of the term location may comprise any of these variants unless indicated otherwise. When computing the location of a mobile device, it is common to solve for local x, y, and possibly z coordinates and then, if needed, convert the local coordinates into absolute ones (e.g., for latitude, longitude and altitude above or below mean sea level).

In addition, the mobile device 105 may support other categories of functions that relate to wireless communications. For example, the mobile device 105 may include one or more wireless transceivers capable of receiving (and transmitting) wireless signals from and to one or more terrestrial wireless nodes and one or more processors configured to process the wireless signals. For example, wireless communications may serve as an important link in connecting mobile device 105 over private and/or public networks with other devices such as servers and other mobile devices. This may include communication over various types of wireless networks, including WWAN, WLAN, and WPAN networks, among others. FIG. 1 illustrates wireless communications between the mobile device 105 and a terrestrial base station 126, a communication satellite vehicle 122, and an access point 130. However, other examples of wireless communications may include peer-to-peer communications between mobile devices such as Wi-Fi Direct, Long-Term Evolution (LTE) Direct, or Proximity-based Services (ProSe) Direction Communication (PC5), etc. Examples of WWAN may include satellite communications, 5G NR, LTE, wideband code division multiple access (WCDMA), and the like. Additional examples of wireless communications may include near field communications (NFC), Bluetooth communications, etc.

As used herein, the terms "mobile device" and "base station" are not intended to be specific or otherwise limited to any particular Radio Access Technology (RAT), unless otherwise noted. In general, a mobile device may be any wireless communication device (e.g., a mobile phone, router, tablet computer, laptop computer, tracking device, wearable (e.g., smartwatch, glasses, augmented reality (AR)/virtual reality (VR) headset, etc.), semi-autonomous or autonomous ground vehicle (e.g., automobile, truck, motorcycle, bicycle, etc.), semi-autonomous or autonomous aerial vehicle (e.g., UAV or drone), Internet of Things (IoT) device, etc.) used by a user to communicate over a wireless communications network. A mobile device may be mobile or may (e.g., at certain times) be stationary, and may communicate with a Radio Access Network (RAN). As used herein, the term "mobile device" may be referred to interchangeably as an "user equipment," "access terminal" or "AT," a "client device," a "wireless device," a "subscriber device," a "subscriber terminal," a "subscriber station," a "user terminal" or UT, a "mobile terminal," a "mobile station," or variations thereof. Generally, mobile devices can communicate with a core network via a RAN or in some cases a communication satellite, and through the core network the mobile devices can be connected with external networks such as the Internet and with other mobile devices. Of course, other mechanisms of connecting to the core network and/or the Internet are also possible for the mobile devices, such as over wired access networks, WLAN networks (e.g., based on IEEE 802.11, etc.), WPAN networks, and so on.

The mobile device 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR), etc. For instance, mobile device 105 may transmit and receive signals 125 on a wireless link to a base station 126 and a signal 129 to an access point 130 on a wireless link. The base station 126, for example, may be part of a Radio Access Technology (RAT) and may support LTE or 5G NR communications, and access point 130 may support IEEE 802.11 WiFi.

The mobile device 105 may further or alternatively support wireless communications with a communication satellite vehicle 122. For example, the mobile device 105 may perform wireless communications by send and receive signals 121 to and from one or more communication satellite vehicles 122 via a wireless link. It should be understood that the communication satellite vehicle 122 is separate from positioning satellite vehicles 112, 116, and 118 and is not part of the SPS. The communication satellite vehicle 122 may be part of a wireless communication network, such a 5G New Radio (NR) or some other wireless access type such as Code Division Multiple Access (CDMA).

The reception (and transmission) of wireless signals consumes device power. Moreover, various imposed requirements for positioning, communications, etc., may result in different levels of power consumption. For example, some wireless functions may require specific positioning accuracy, timing, latency, and data rates that require a high level of power consumption, while other wireless functions may use different requirements, which result in lower levels of power consumption. Thus, various power modes may be requested by different functions within the mobile device 105, e.g., to achieve a desired result, such as a desired positioning accuracy level, timing latency, data rate, etc. A requested power mode, for example, may specify operation characteristics, such as the types of wireless signals to be used, the frequencies of wireless signals to be used, the update rate, radio frequency (RF) sampling time and modes, positioning accuracy, etc.

For example, during positioning, a location may be requested from one or more applications (Apps) or functions on the mobile device. For example, in a phone implementation, there are many Apps that may require the location for their usage and these Apps may request the location to the operating system. The location request from the Apps, for example, may generally include the accuracy needs and the time that is allowed for position to be provided. In addition, these requests for location may contain a power consumption attribute. In general, it is desirable to obtain the location estimate using a power mode that will reduce power consumption.

The location may be provided to some external entity for usage, but the external entities generally do not have detailed knowledge of the internal capabilities of the location technology of the mobile device or the power modes that are present and usable. Accordingly, externally originated request in terms of power consumption, i.e., requested operating mode, is typically generic in terms of power modes (for example the request may be prioritize accuracy over power, or use lowest power or provide best accuracy without regard to power).

A requested operating mode may be translated by the location technology or operating system within the mobile device to determine which power modes (that are available internally) may be used to satisfy the request. For example, an App for ride sharing may use the location, but may have no knowledge of the radio frequency (RF) sampling time or constellations or frequencies supported or available or the number of channels supported by the mobile device and would only request a location estimate with accuracy needs and time between fixes/update rate. Other application, such as Emergency service, may only request the most accurate location with no regard for power consumption. Such a request would be translated by the operating system or location technology, for example, for the SPS constellations that are allowed to be used for emergency services in which country.

The requested operating mode may be the mode requested by the function or application that will eventually receive the location estimate or by the operating system or by higher level software stack around the location technology. The actual operating mode used by the location technology may be based on the definition of internal modes (which can change as time goes along with algorithm improvements) which are a combination of lower level power saving features or may reflect the underlying features explicitly.

The operation characteristics in a requested power mode, however, may not be adequate to achieve the desired result. For example, in some locations, certain wireless signals may be unavailable or weak, as in urban canyons or in indoor environments. In such environments, if the mobile device 105 is requested to perform a specific wireless function (e.g., positioning), the mobile device 105 may attempt to use the requested operation characteristics, e.g., using SPS signals with specified frequencies, at a particular data rate, but may find the operation characteristics are inadequate for positioning with the desired accuracy, latency, etc. For example, the mobile device 105 may be located in an environment where SPS signals are unavailable or weak. Accordingly, the mobile device 105 may need to adjust the power mode, e.g., increasing integration time, increasing the number of frequencies used, etc., to achieve the desired positioning accuracy. Moreover, the mobile device 105 may be required to make iterative adjustments over time to the power mode until the desired positioning result is achieved. During these various attempts, the mobile device 105 is consuming power without providing the required results. Moreover, each positioning attempt takes time, and accordingly adequate positioning results may be delayed.

In some implementations discussed herein, the mobile device 105 may use a power mode manager to select an appropriate power mode to be used to achieve the desired power and performance requirements, e.g., during positioning. The power mode manager in the mobile device 105, for example, may consider the current status information and requirements to determine the appropriate power mode to be used. The current status and requirements, for example, may include information, such as location, communication status, propagated states, Resilient PNT (Positioning, Navigation, and Timing) Conformance, battery status (e.g., battery level, charging, etc.), and network (e.g., coverage LTE, 5G NR, etc.). The power mode manager, for example, may use a current location of the mobile device 105 and a power mode database that stores actual operating modes to be used for various requested operating modes at different locations. The power mode database may further store context information, such as user context, environmental context, and temporal context, which may be further used to select the actual operating modes to be used for various requested operating modes at different locations.

Figure 2:
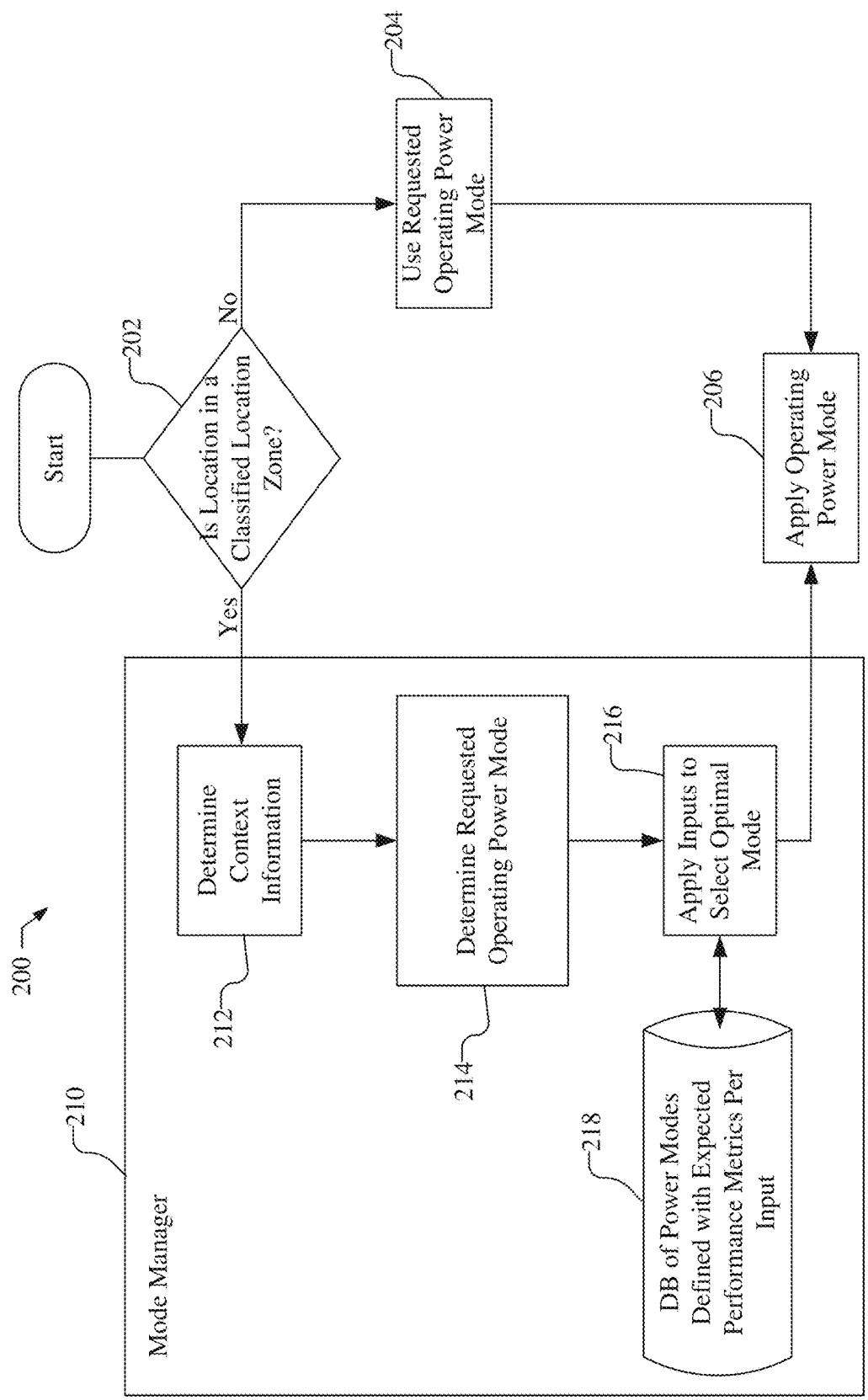
FIG. 2 illustrates an example of the operation of a mode manager in a mobile device to select an appropriate operating mode to be used to achieve desired power and performance requirements during positioning.

FIG. 2 illustrates an example of the operation 200 of a mode manager 210 in the mobile device 105 to select an appropriate operating power mode to be used to achieve the desired power and performance requirements, e.g., during positioning.

As illustrated at block 202, the mobile device 105 may determine if its current location is in a classified location zone. The mobile device 105, for example, may determine its current location as a rough location, e.g., propagated from previous locations, or based on current wireless signals or cell IDs that may be received, coarse position injection, network position aiding, sensor-assisted positioning (e.g., dead reckoning), or WiFi positioning. The mobile device 105 may have a list of classified location zones stored in memory. For example, on-device learning may be used to build up shapes with a geo-polygon library, or the high level operating system (HLOS) may provide a building ID that may be use saved and queried against building IDs, or may receive, e.g., crowd-sourced, location zones from other entities.

If the current location is not in a classified location zone, the mobile device 105 selects the requested operating power mode as the default (block 204) to be applied as the operating power mode that is used (block 206). The requested operating power mode may be determined based on a user or application (e.g., maps, navigation, etc.) requested positioning mode and may, e.g., specify the position accuracy, power consumption allowed, time-between fixes, etc.

If the current location is in a classified location zone, the mode manager 210 may determine context information associated with the location (block 212). The context information for example, may include environmental context information, such as whether the current location is indoors or outdoors, whether RF signal reception is obstructed or unobstructed, average uncertainty (e.g., 3D positioning uncertainty) for each power mode, the types of RF signals that are available, signal characteristics, etc.; user context, such as whether the mobile device 105 is moving and the class of motion of the mobile device 105 (e.g., walking, biking, driving, train, etc.), the battery level or charging status, etc.; temporal context such as the time of day, day of week, etc.; or any combination of the foregoing.

The mode manager 210 may further determine the requested operating power mode (block 214), which may be determined, e.g., based on a user or application requested positioning mode, and which may include e.g., the types of RF signals and/or the frequencies of the RF signals to be received for positioning. In some implementations, the requested operating power mode may include the update rate, a required performance or accuracy, or other requirements. For example, in some embodiments, the determined requested operating power mode may include the requirements such as the Quality of Service (QoS) of the location request, the requested positioning accuracy, latency requirements, update rate, etc. Additional parameters may also be determined, such as the current communications status and wireless connections that are available.

The mode manager 210 (at block 216) obtains an optimal operating power mode to be used from a power mode database 218, e.g., using the current location zone and the requested operating power mode, as determined at block 214, as inputs. The power mode database 218 may be stored locally on the mobile device 105 or may be stored remotely and may be accessed via a server (such as server 320 shown in FIG. 3), e.g., by sending the current location zone and requested operating power mode (as well as additional parameters, such as context information if available) to the server and the server accesses the power mode database 218 and returns the optimal operating power mode to the mobile device 105. The power mode database 218, if stored locally or remotely, by way of example, may be generated by the mobile device over time, or if stored remotely, may be a crowdsourced database generated using information from multiple mobile devices.

In some implementations, user context, accuracy requirements, RF environment, or some combination thereof, as determined at blocks 212 and 214, may also be used as an input to obtain the operating power mode to be used from a power mode database 218. The power mode database 218, for example, may include a plurality of location zones and power mode information associated with each location zone, the power mode information comprising a requested operating mode and an actual operating mode associated with each location zone. The power mode database 218 may further include context information, accuracy information, RF environment, or a combination thereof associated with the location zones and power mode information, which may be used as input in addition to location zone and requested operating power mode to search for and obtain the optimal operating power mode to be used by the mobile device 105. In some implementations, a machine learning model trained based on the power mode database 218 may be used to predict the optimal operating power mode given the context information provided as input.

The mode manager 210, in some implementations, may obtain the operating power mode to be used based on the current location zone by determining likelihoods of operating power modes of achieving a desired operation performance for the current location zone based on the requested operating power mode and one or more of the context information, accuracy information, RF environment from the power mode database. In some implementations, the likelihood may be determined using machine learning (ML) algorithms and models. For example, a k-Nearest Neighbor (kNN) algorithm, support vector machine (SVM), Gradient Boosted Machines, or neuron network model may be used to build a supervised ML model that will predict the most likely optimal RF power mode given the location zone and context information. In such supervised ML training, the label information may be attained from a previously collected database of RF power mode information, where the optimal RF power mode for each sample scenario is chosen as the label data. The ML training, for example, may occur on the device when the device is plugged-in for recharging at night or when the device is not being used by the user. In another implementation, the ML training may additionally or alternatively occur on a server using either crowdsourced data, or by using crowdsourced model weight updates and federated learning. The mode manager 210 may select the optimal operating power mode based on the highest likelihood for potential operating power modes, which may be above a predetermined threshold.

Once the optimal operating power mode is obtained from the power mode database 218, or the estimated optimal power mode is obtained by a ML model trained on the power mode database 218, the operating power mode may be applied as the operating power mode that is used (block 206). Thus, based on the use of the power mode database 218 and inputs including at least the current location and the requested operating power mode, the mobile device 105 may quickly and accurately obtain and apply the optimal operating power mode, without requiring initially attempting positioning using the requested operating power mode and attempting positioning with different operating power modes until an operating mode is found that provides adequate results. Moreover, the use of the power mode database 218 to obtain an optimal operating power mode provides greater flexibility and enables power savings options while performing requested function, in comparison to simply turning transceivers on or off in response to, e.g., the wireless environment or location.

Figure 3:
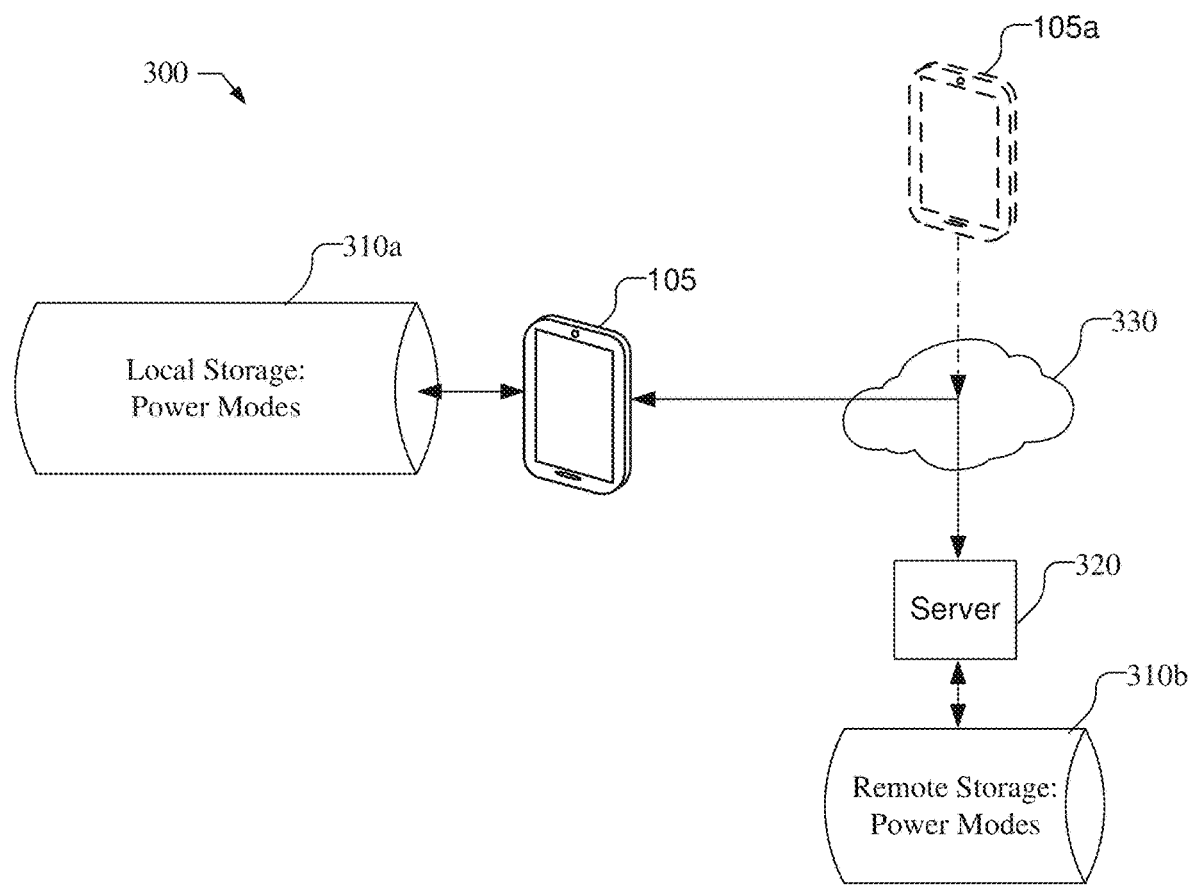
FIG. 3 illustrates a high-level architecture for building or accessing a local or remote power mode database.

FIG. 3 illustrates a high-level architecture 300 for building or accessing a local power mode database 310a or a remote power mode database 310b, sometimes collectively referred to as power mode database 310, which may be the same or similar to the power mode database 218.

The mobile device 105 may build a power mode database 310 by determining a current location in which the mobile device 105 is located. The current location, for example, may be determined based on a rough, estimated location or as an accurate positioning fix. In some implementations, the current location may be determined as a location zone, which may be predefined and stored in the mobile device 105. The location zone, for example, may be geo-polygon, a civic location (e.g., postal address, building ID, etc.) or other geographic representations. The mobile device 105 may have a list of classified location zones stored in memory that may be provided, e.g., by server 320 or may be determined by a power mode manager, e.g., based on location observations mapped to geopolygons, building ID, or zones identified through map. The mobile device 105 may determine which location zone it is currently located based on the location of the mobile device 105.

The mobile device 105 may further determine power mode information associated with the current location zone. The power mode information, for example, includes the requested operating power mode, e.g., determined based on a user requested positioning mode, and the actual operating RF Mode for the current location zone. The operating mode, for example, may include at least the types and frequencies of RF signals received for positioning. The requested operating power mode may be the mode requested by an application in the mobile device to achieve a desired positioning result. The actual operating power mode may be an operating power mode used by the mobile device to achieve the requested positioning result. For example, the actual operating power mode may be the same as the requested operating power mode. In other implementations, the mobile device 105 may attempt positioning using the requested operating power mode but may need to adjust the operating power mode until the requested positioning result is achieved. For example, the mobile device 105 may obtain the requested operating power mode, and use the requested type of RF signals, the requested frequencies of RF signal, requested update rate for positioning in an attempt to achieve a required operation performance. The mobile device 105 may adjust the operating power mode from the requested operating power mode during positioning if the required operation performance is not achieved. The mobile device 105 adjusts the operating power modes and monitors the performance of operation during positioning until the required operation performance is achieved thereby determining the actual operating power mode at the location zone that achieves the required operation performance.

In some implementations, microelectromechanical systems (MEMS) usage may be associated in with the RF power mode. For example, the RF may be on for 500 ms every 10 seconds with continuous MEMS sensors running to propagate through the off time. The MEMS usage may be associated with and considered part of the RF power mode.

The mobile device 105 stores the current location zone and the power mode information associated with the current location zone in the power mode database 310. The mobile device 105 may update the power mode database 310 over time. For example, the mobile device 105 may provide power mode information associated with each different location zone in which the mobile device 105 is present and performs positioning. Moreover, the mobile device 105 may update the power mode information associated with each location zone over time, i.e., each time the mobile device 105 is present in the same location zone and performs positioning. The update for each location zone maintains the database and provides provide temporal context, e.g., power mode information associated with a location zone at different times of the day and different days of the week.

The mobile device 105 may further determine context information at each location zone and may store the context information associated with the location zone and power mode information. For example, the context information may be user context, such as whether the mobile device 105 is moving and if so the class of motion, e.g., walking, biking, driving, train, etc. The class of motion, for example, may be determined based on velocity information determined and motion type of the mobile device 105 determined using positioning techniques and inertial sensors, such as accelerometers, gyroscopes, etc. Further user context information may include, e.g., the battery level and whether the battery is charging. Context information may further include environmental context information, such as whether the current location is indoors or outdoors and whether RF signal reception is obstructed or unobstructed, etc. MEMS sensors may be used to detect context information, and may use inertial sensors to detect motion patterns, light sensors for determining whether the current location is indoors or outdoors, etc. The environmental context may be based on signal measurements and/or comparison of a determined location to geographic representations (e.g., maps). Additional context information may include, e.g., the RF environment within the location zone, which may include visible access points, cell IDs, WWAN positioning, types of RF signals available and characteristics of received RF signals, such as received signal strength indication (RSSI), signal to noise ratio (S/N), reference signal received power (RSRP), reference signal received quality (RSRQ), etc.

The mobile device 105 may additionally determine accuracy information for each location zone and store the accuracy information in the power mode database 310 associated with the location zone and power mode information. For example, the accuracy information associated with a location zone and power mode information, for example, may include the requested positioning accuracy, a requested update rate, an achieved positioning accuracy, or any combination thereof.

As illustrated in FIG. 3, the mobile device 105 may store the current location zone and the power mode information (and any additional information) associated with the current location zone in a local power mode database 310a, which may be located within the mobile device 105. The local power mode database 310a may store information that is particularly relevant to the mobile device 105, such as temporal contextual information, which may enable power mode selection based on the user's typical daily or weekly activities.

Additionally, as illustrated in FIG. 3, the mobile device 105 may store the current location zone and associate power mode information (and any additional information) in a remote power mode database 310b, through a server 320. Communications with server 320 may be performed using a wireless network 330, which may be a WWAN or WLAN network. The mobile device 105 may send the current location or location zone of the mobile device 105 and associated power mode information (and any additional information) to the server 320 and the remote power mode database 310b. In some implementations, the server 320 may determine the current location zone for the mobile device 105 if the mobile device 105 sends its current location. The server 320 may store the location zone and associated power mode information (and any additional information) in the remote power mode database 310b. The remote power mode database 310b may be a crowdsourced database, which may be built by multiple mobile devices, illustrated by mobile device 105a, sending their location or location zones and associated power mode information (and any additional information) to the server 320, which stores the location zones and associated power mode information (and any additional information) in the remote power mode database 310b. The remote power mode database 310b, which may be crowdsourced, may maintain attributes over more location zones, i.e., more location zones than visited by one mobile device, over all RF bands of interest and allows for real-time adjustment, such as network outages.

FIG. 4A illustrates, by way of illustration, an example of a power mode database 400, which may be the same or similar to the power mode database 218 and 310. The power mode database 400 may include entries for each location zone, illustrated as Loc A and Loc B, as well as a requested operating mode and an actual operating mode, and may further include a number of context parameters, illustrated as context parameters i through n. While a limited number of entries are illustrated in the power mode database 400, it should be understood that any number of locations, and entries and additional types of locations and entries may be included and will still fall within the described embodiments. Furthermore, it should be understood that while the power mode database 400 is illustrated as a table, the particular arrangement of information in FIG. 4A is presented or purposes of illustration and not limitation. Any suitable arrangement of information could be used and still fall within the described embodiments.

The location entries in the power mode database 400 may be location zones identified as an area or volume, e.g., defined either geographically, e.g., as geo-polygons, or in civic form, e.g., building IDs, postal address, or designation of some point or small area within a building such as a particular room or floor, or any other desired geographic representations, or any combination thereof. power mode database 400 illustrates two locations, e.g., Loc A and Loc B, but may include many more locations.

In some implementations, locations may be areas that serve as transitions between operating power modes. For example, a location that is identified as transition point may be an area that is determined to switch between operating power modes. For example, a transition point may be an entrance or exit from a building or an urban canyon. Locations that are transition points may be flagged as a transition point so that it is clear that when a mobile device 105 is located in the location, a transition between operating power modes is likely necessary. In some implementations, the operating mode transitions associated with a transition point may be stored in the power mode database 400 as well, e.g., in the requested operating mode and actual operating mode entries.

The operating modes for the requested operating mode and the actual operating mode entries in the power mode database 400 may include the operating RF parameters used for positioning, such as the types of RF signals to be measured (e.g., SPS signals, LTE signals, 5G NR signals, WiFi signals, etc.), and the frequencies of the RF signals. The operating mode may further include information, such as the update rate, operation performance metrics (such as position accuracy or QoS), etc. It should be understood that each separate operating RF parameter included in the operating mode may have a separate entry or subentry in the power mode database 400 or may be combined with other operating RF parameters. The requested mode may be the operating power mode that is requested from internal functions or applications in the mobile device 105 what at the associated location. The actual mode, on the other hand, may be the operating power mode that is applied and used by the mobile device 105 for positioning at the associated location in response to the requested operating power mode and may be the same or different than the requested mode.

In some implementations, multiple contextual parameters associated with the location and the requested and actual modes may be included in the power mode database 400. For example, the contextual parameters may include user context information, such as whether the mobile device 105 is moving and the class of motion (e.g., walking, biking, driving, train, etc.), the battery level, charging status, etc. Additional user context information associated with the location and the requested and actual modes that may be included, for example, may include activity on the mobile device 105, such as active applications, the source of the requested operating power mode, etc. It should be understood that each separate type of user context parameter may be included in a separate contextual entry, may be a subentry within user context parameters or may be combined in some manner with other user context parameters or with other contextual parameters.

The contextual information may include environmental context that is associated with the location and the requested and actual modes, such as whether the location is indoors or outdoors, obstruction of RF signal reception, etc. The environmental context may further include information about the RF environment associated with the location, such as the types of RF signals that are available and characteristics of received RF signals, such as RSSI, S/N, RSRP, RSRQ, etc. It should be understood that each separate type of environmental context parameter may be included in a separate contextual entry, may be a subentry within environmental context parameters or may be combined in some manner with other environmental context parameters or with other contextual parameters.

The contextual information may include temporal context associated with the location and the requested and actual modes, such as the time of day, day of the week, etc. The temporal contextual information may be recorded with each new entry for location, requested mode, actual mode, or any of the other contextual information and may be updated when the location, requested mode, actual mode entries are updated. It should be understood that each separate type of temporal context parameter may be included in a separate contextual entry, may be a subentry within temporal context parameters or may be combined in some manner with other temporal context parameters or with other contextual parameters.

Additionally, parameters may be entered in the power mode database 400 associated with the location and the requested and actual mode. For example, the positioning accuracy, e.g., requested and/or actually achieved may be included in the power mode database 400 associated with the location and the requested and actual mode. The positioning accuracy, for example, may be a determined uncertainty or confidence level of the positioning estimate. The positioning accuracy, for example, may be a contextual entry, e.g., environmental context, or may be included in the requested and actual mode, or a combination thereof.

Thus, as illustrated in power mode database 400, for any location and requested mode, there will be associated an actual mode, and possibly one or more contextual parameters. The power mode database 400 may be updated for any new location by entering the associated requested mode and actual mode, as well as any contextual parameters. Locations within the power mode database 400 may be updated by adding entries for any new requested mode along with the associated actual mode, as well as any contextual parameters. Locations and requested mode entries in the power mode database 400 may be updated for any changes in contextual parameters and/or changes in the actual mode.

For any current location and requested operating power mode for a mobile device 105, the power mode database 400 may be used to determine an associated actual operating power mode to be used by the mobile device 105. If contextual parameters are associated with the location and requested mode, the contextual parameters may be used to determine the appropriate associated actual operating power mode to be used. In some implementations, likelihoods of operating power mode of achieving a desired operation performance may be determined using the entries in the power mode database 400. For example, likelihoods may be established based on frequency of observation or lack thereof and the time between observations. In some implementations, if there are multiple actual modes associated with a location and requested mode and there are different contextual parameters, the likelihoods of achieving a desired performance may be determined using a likelihood function. In some implementations, the likelihood function may weight contextual parameters, such as estimated position error, or RF availability.

FIG. 4B shows a table illustrating another example of a power mode database 450 that provides an example of the type of data that may be collected and stored in the database and used for likelihood estimation.

In table of FIG. 4B, the requested accuracy, for example, may be high or low, and may be resolved over time and may be operating system dependent. Likewise, the requested power may be high or low, and may be resolved over time and may be operating system dependent. The time between fixes (TBF) may be in seconds, e.g., so that a TBF of 10 seconds potentially provides 30 fixes in a 300 second session. The ZoneID may be a location zone such as a geo-polygon (e.g., defined with defined by vertices defined by the mobile device or through crowdsourcing), a civic location (e.g., postal address, building ID, etc.), area, or other geographic representations defined by the mobile device or through crowdsourcing or defined by a map partner. The Avg 3D PUNC is the average 3D position uncertainty. The maximum position uncertainty may be monitored and stored in addition or in the alternative to the average 3D position uncertainty. The fix yield is the ratio of fixes over potential fixes for a session. The media power mode used is the most commonly observed low level power mode implemented by the mobile device in the session. Of course, additional, fewer or different parameters may be monitored and stored.

The table of FIG. 4B shows illustrative data for 16 sessions, covering 3 geographic zones (Zone 1, Zone 2, and Zone 3), and 5 different power modes (Mode1a, Mode1b, Mode3a, Mode3b, and Mode4). If the mobile device 105 were to enter zone 1 again, with the same requested operating power mode, e.g., Accuracy=High, Power=High, Time-between-fixes (TBF)=1), (which may be determined based on user requested positioning mode, e.g., to achieve the requested positioning result) the mobile device may use the model estimate for selecting expected performance and choosing which power mode to use, e.g., Mode1a has median performance (3D pos uncertainty=8, yield=100, power=17) and Mode1b has (10,100,14) using a likelihood function.

For example, the likelihood function may select a power mode as a base, and calculate the delta ratios for each category (e.g., 3D pos uncertainty, yield, and power in the present example), which may be combined to determine the operating mode with a highest score for the zone and requested operating power mode. For example, in the present example, Mode1a may be selected as a base and the delta ratios for each category in each available power mode (Mode1b in the present example) may be determined, e.g., 3D pos uncertainty=(10−8)/8=0.25, yield (100−100)/100=0, power (14−17)/17=−0.18. To determine a score, the delta ratios may be combined to determine the operating mode with the highest score. For example, in the present example, the delta ratios may be summed, i.e. 0.25+0−0.18=0.07, which indicates that the base (i.e., Mode1a) is better than the other option (i.e., Mode1b) by 0.07. Accordingly, the better model option may be selected as it is known to perform better in zone 1 for the set of contextual parameters.

With large samples, the numbers may vary and a more complex overlay may be added. Moreover, different likelihood functions may be used other than the median (e.g., 90th percentile) or the function may be parametrized with extra details such as the time-of-day or user states (pedestrian\driving\unknown). Further, the likelihood function may emphasize some categories more than others, e.g., by weighting categories differently, e.g., weight for the ratios of 3DPUNC, Yield, or Power may be modified from 1,1,1 to 1, 2, 4, or any other desired weighting, to determine the operating mode with the highest score.

Figure 5:
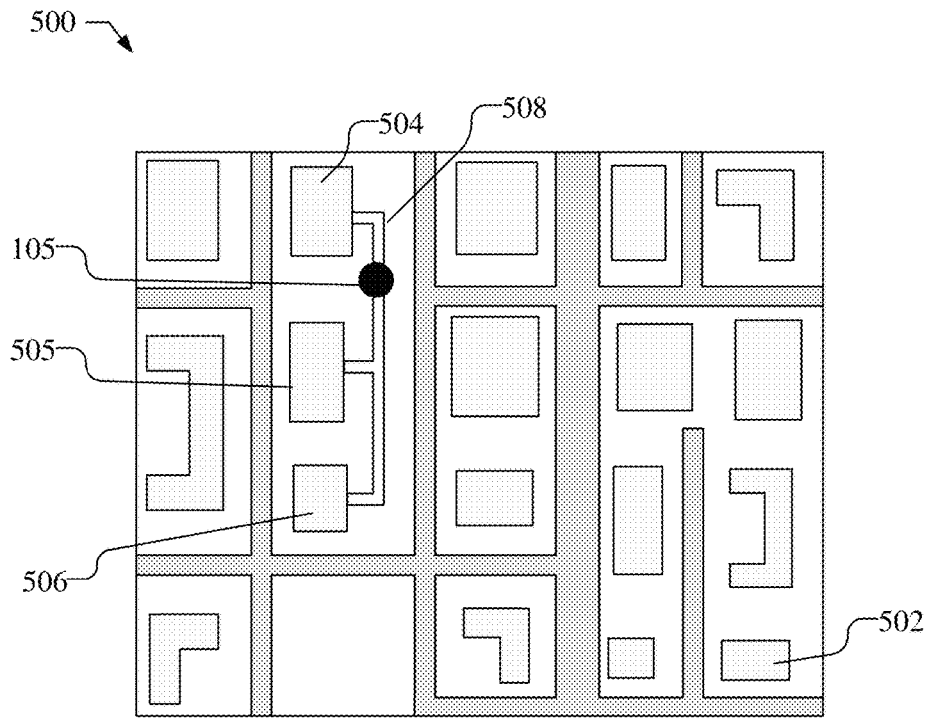
FIG. 5 illustrates a city environment in which a mobile device may build a power mode database and/or use power mode selection during positioning.

FIG. 5, by way of example, illustrates an environment 500, which may be a city with various building, streets, and paths/walkways. The location of the mobile device 105 is illustrated with a black dot as an example. The RF conditions across the environment 500, and thus, for optimal power savings during positioning, the power mode used by the mobile device 105 at different locations may be based on the RF conditions at each location. The RF conditions and modes of operation for positioning at various locations may be observed by the mobile device 105 over time and stored and updated in a power mode database.

For example, the user of the mobile device 105 may spend time daily in the user's home 502, office 504, parking structure 505, and gym 506. From observation, it may be determined that GNSS signals are denied within these indoor locations, but not in external locations, such as the path 508 between the office 504 and gym 506. The mobile device 105 may only connect to LTE networks and WiFi within the office 504, while the gym 506 and home have access to LTE and 5G networks and WiFi. Thus, by way of example, when the mobile device 105 is in the parking structure 505 or office 504, the mobile device 105 may save power during positioning using LTE (or WiFi) and not using GNSS or 5G positioning, while at home 502 or in the gym 506 positioning may be performed using LTE, 5G or WiFi and not using GNSS.

Without use of a power mode database, during positioning the mobile device 105 will use the default power mode, e.g., the requested operating power mode. In some locations, within the environment 500, the requested operating power mode, however, will not be possible (e.g., RF signals may be unavailable) or may not provide the desired positioning performance. Accordingly, the mobile device 105 may alter the operating power mode, e.g., switching frequencies of RF signals, or types of RF signals, until the desired positioning performance is achieved. During this process, positioning results may not be available and additional power is consumed.

In some implementations, the mobile device 105 may build the power mode database during this process, e.g., by storing a current location and associated requested and actual operating power modes to the power mode database. The power mode database, for example, may be built over time so that an entry for each location (location zone) visited by the mobile device 105 along with associated requested and actual operating modes and context information, including user context, environmental context, and temporal context, may be entered, and updated over time. Thus, the power mode database will include entries indicating that indoor locations within the environment 500 are GNSS denied but outdoor location zones, such as path 508 are GNSS availability, and the different RF signals are available in different locations, such as LTE and WiFi in the office 504, and LTE, 5G, and WiFi at the gym 506 and home 502. The power mode database may be built using information only from the mobile device 105 or through crowdsourcing.

During positioning with the use of the power mode database, the mode manager 210 in the mobile device 105 may use the current location and requirements, e.g., requested operating power mode, as inputs to determine an optimized configuration of existing power modes via the power mode database. When the mobile device 105 is located in specific locations, an optimized configuration for operating power mode may be obtained from the power mode database, based on the location, requested operating power mode and any contextual information. Thus, when the mobile device 105 is at the office 504 and GNSS positioning is requested with a specific update rate, the power mode database may be used to determine that at those locations and with the requested operating power mode, the actual operating power mode uses LTE, which may use a different update rate. Accordingly, the mobile device 105 can save power by avoiding GNSS and 5G and using LTE for positioning, as indicated in the power mode database. Similarly, if the mobile device 105 is at the gym 506 or home 502, the mobile device 105 can save power by avoiding GNSS and optimizing LTE, 5G or WiFi, as may be indicated in the power mode database. Thus, the mobile device 105 may quickly and efficiently determine the optimal operating mode to use for positioning, thereby saving power and reducing latency.

Additionally, the power mode manager may observe and store transition points in the power mode database. Transition points, for example, are location areas at which operating power modes transition. For example, a transition point may be an entrance or exit from a building, where GNSS transitions from strong to weak or unavailable. Other transition points may be, e.g., where certain networks, RF signals or frequencies transition from available to unavailable, and thus, a mobile device may be required to transition from one operating power mode to another.

In some implementation, the optimal power savings for each operating power mode and location may be learned over time so that a "daily routine" for a mobile device 105 may be determined and optimized. For example, a user of the mobile device 105 may follow a repeated daily routine that over time may be predictable based on entries in the power mode database, e.g., based on temporal context information associated with locations and requested operating power modes. The power mode manager may use the power mode database, and the temporal context information associated with locations and requested operating power modes as inputs, to determine and proactively switch to the optimal operating power mode for the mobile device 105 for optimal power savings.

By way of example, the mobile device 105 may be determined to be "deep" indoors, e.g., in an area with poor SPS and cellular connection. The mode manager 210 in the mobile device 105 may use the current location, and context information, and requirements, as inputs to determine an optimized configuration of existing power modes via the power mode database. For example, the optimized configuration may be determined to be WiFi and MEMS sensors for indoor navigation requirements, or simply using WiFi for determining periodic locations. The mode manager 210, for example, may place the location task on pause (e.g., placing the location processor standby or off), with wakeup from a MEMS accelerometer pin, and when it wakes up it goes back to the power mode from before.

The data may be grouped based on zone ID and requested mode and may characterize the zone ID with a profile for requested modes and resulting accuracy and mode implementation details. Accordingly, in one example, the lowest power mode that meets a requested accuracy requirement for the zone ID in which the UE is located may be selected for use by the mobile device based on the stored previous observations, such as an average or median of the average position uncertainty (avg 3D PUNC) (and/or the maximum position uncertainty) reported through all the zone visits. In another example, if a specific power mode for a zone ID is requested for which there is no prior knowledge, a default implementation may be used to methodically select lower level operating modes and adjusting as necessary. For example, the mobile device may be controlled to start at the most frequently implemented mode at the lower level and to increase as necessary to reduce the amount of switching between different lower level operating modes.

In various embodiments the power mode database 400 may be stored on a computer-readable storage medium of the mobile device 105 or it may be stored remotely, e.g., with server 320, and may be wirelessly accessible by the mobile device 105. The computer-readable storage medium that contains the database and the feature set information may comprise a subscriber identity module (SIM) of the mobile device 105 in some embodiments. In various embodiments, the feature set information may be preconfigured or preloaded and stored on the SIM by a home wireless network provider or by a user of the mobile computing device. For example, a home wireless network provider may preload a SIM with roaming wireless network information, including feature set information for the roaming wireless networks or carriers. In some embodiments, a user of mobile device 105 may additionally or alternatively have the option of updating, changing or otherwise amending the database to reflect changes in wireless networks or to reflect user preferences.

Additionally, a general ML model may be used to learn to recommend an optimal RF power mode to be used for unknown locations, e.g., using the context information and the user requested accuracy level, based on the most frequently used power modes for the context information requested accuracy level.

The general ML model may be trained using a supervised training method, where the label information is provided (the optimal RF power mode for the given setting and user required accuracy level), or by reinforcement training method, where the label information is not provided but the reinforcement learning agent learns an optimal policy for RF power mode while interacting with the environment and observing the rewards and penalty associated with each action it took, which would be the power consumption, position accuracy, position uncertainty, etc.

Alternatively, the general ML model may be trained as a recommender system on a server, where each (location zone, context information, observed optimal RF power mode) sample can be used to fill the recommender system table, such as the power mode database 400 shown in FIG. 4A. The entries from devices sharing similar "context information-to-optimal RF power mode" characteristics may be assumed to behave similarly when such a device enters a location zone that it has not experienced before, but the devices with similar characteristics have already experienced.

Additionally, specific ML model(s) may be trained for each location zone, using the collected data from the location zone.

In an alternative to training a specific ML model for each location zone, a clustering algorithm, such as k-means method, may be used on each location zone to group the zones together in a cluster that share similar context and environment characteristics. Then a specific ML model may be trained for each cluster group, with the collected data from all the location zones in the cluster. The clustering algorithm may be used in the future to map a new location to existing cluster group(s), or create a new cluster for the new location if the location zone's context and environment characteristics are significantly different from the existing cluster groups.

The ML model training, for example, may be performed in several ways.

For example, in one implementation, online learning may be used in which only the data available locally on the device is used. Online training, for example, may occur when the device is not in active use. For example, ML model training on the device may occur when the device is plugged in a charger at nighttime and no activity on the device is detected for a predetermined duration, and it may be assumed that the user is not going to use the device for a while. In another implementation, training may occur on a server using crowdsourced data, and the updated model may be downloaded from the server to the devices. In another implementation, federated learning may be used, where the collected data on each device stays on the device, e.g., for privacy protection, and only the updated model parameters and weights are crowdsourced on a server. The server may aggregate the updated model parameters and weights from multiple devices, then make final updates to the model parameters and weights. The final model parameters and weights may then be downloaded to each device to update the specific model instance on the device.

FIG. 6A to FIG. 6G illustrate examples of ML modeling strategies that may be used in one or more implementations.

Figure 6A:
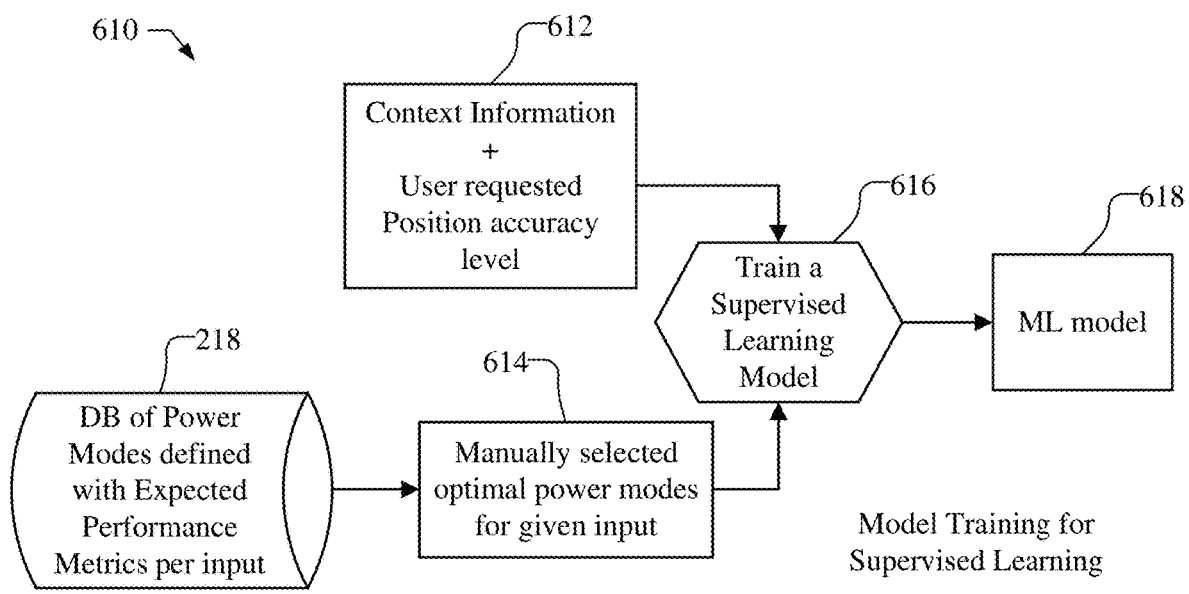
FIG. 6A to FIG. 6G illustrate examples of ML modeling strategies that may be used in one or more implementations.

FIG. 6A, for example, illustrates an example of model training for supervised learning 610, in which both the input data 612 and the label data 614 are provided to the model training 616 to generate a ML model 618. In the given scenario, the input data 612 is the context information and user-requested position accuracy level, while the label data 614 will be the optimal RF power mode observed in the setting that is selected from the power mode database 218. The supervised learning method can train different types of machine learning models, which can include any multi-class classification model that predicts the optimal RF power mode, such as neural networks, gradient boosted machines, support vector machines, random forest and k-nearest neighbor trees.

Figure 6B:
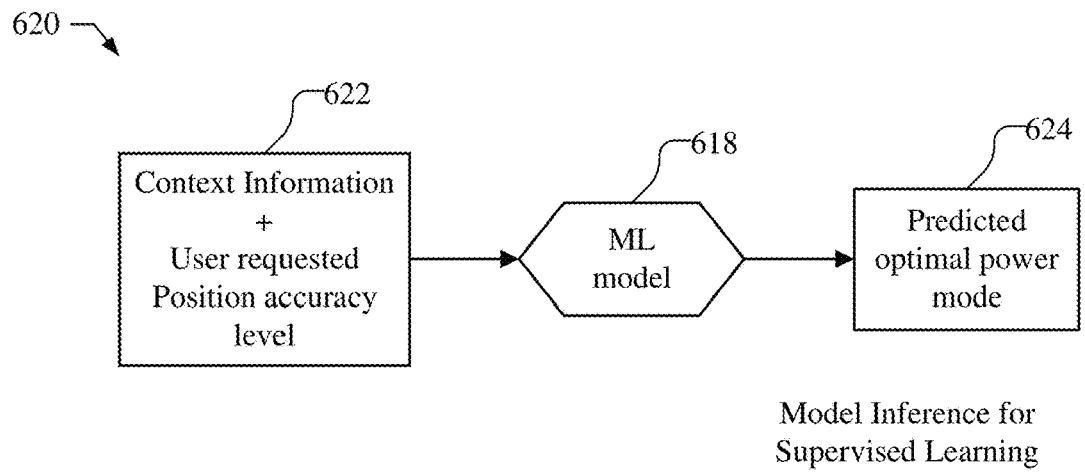

FIG. 6B, for example, illustrates an example of model inference for supervised learning 620, in which input data 622 is provided to the ML model 618, e.g., trained in FIG. 6A, and a predicted optimal RF power mode 624 is output. The ML model 618, may predict the top k most likely optimal RF power modes for the given input setting, ranked by the probability of a given RF power mode to be most optimal in the given input setting.

Figure 6C:
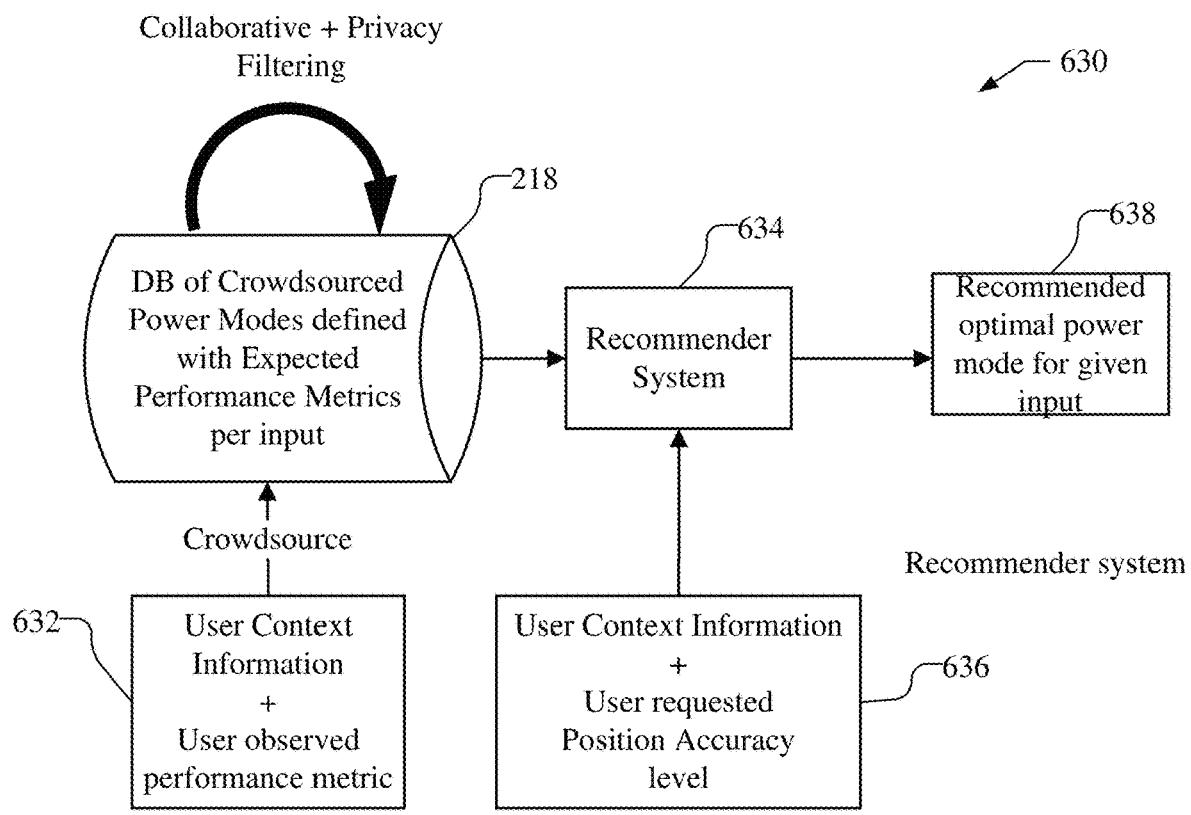

FIG. 6C illustrates a recommender process 630 that involves a technique referred to as collaborative filtering, where the data used for making recommendations are crowdsourced. As illustrated, crowdsourced input data 632 that includes the context information, which may include the location zone information and the observed optimal RF power mode, may be crowdsourced from a number of user devices and stored in the power mode database 218. In particular, the crowdsourced information may include information that can be used to characterize and measure the similarity between each crowdsourced set of information. Such similarity information may be used by collaborative and privacy filtering process to learn and recommend a RF power mode that is most likely to be optimal in a given setting, provided that the setting with similar characteristics have been observed in the crowdsourced data. For example, a crowd of user devices that collects the context information, the user-requested position accuracy level and the observed optimal RF power mode in the setting may upload the crowdsourced input data 632 to a server that hosts a recommender system 634. When a user device encounters a new environment that it has not experienced before, it may query the recommender system 634 in the server to provide a recommended RF power mode setting. The query will include user input data 636 including the context information that the device observed, which may include the location zone information, as well as the user-requested position accuracy level. The recommender system 634 will than query its internal power mode database 218 with collaborative and privacy filtering to find past observations with similar settings, and output 638 a recommended RF power mode that had worked well in the past observations.

Both supervised learning, such as illustrated in FIGS. 6A and 6B, and recommender system, such as illustrated in FIGS. 6C, can be done at different groups of zones and user/device groups. In particular, it is possible to train and maintain a supervised learning ML model and/or recommender system per each location zone, provided that sufficient measurement data are available for each zone. Such schemes would increase the accuracy of the ML model since it is allowed to overfit to the specific characteristics of the location zone without having to worry to generalize the model to other location zones.

Figure 6D:
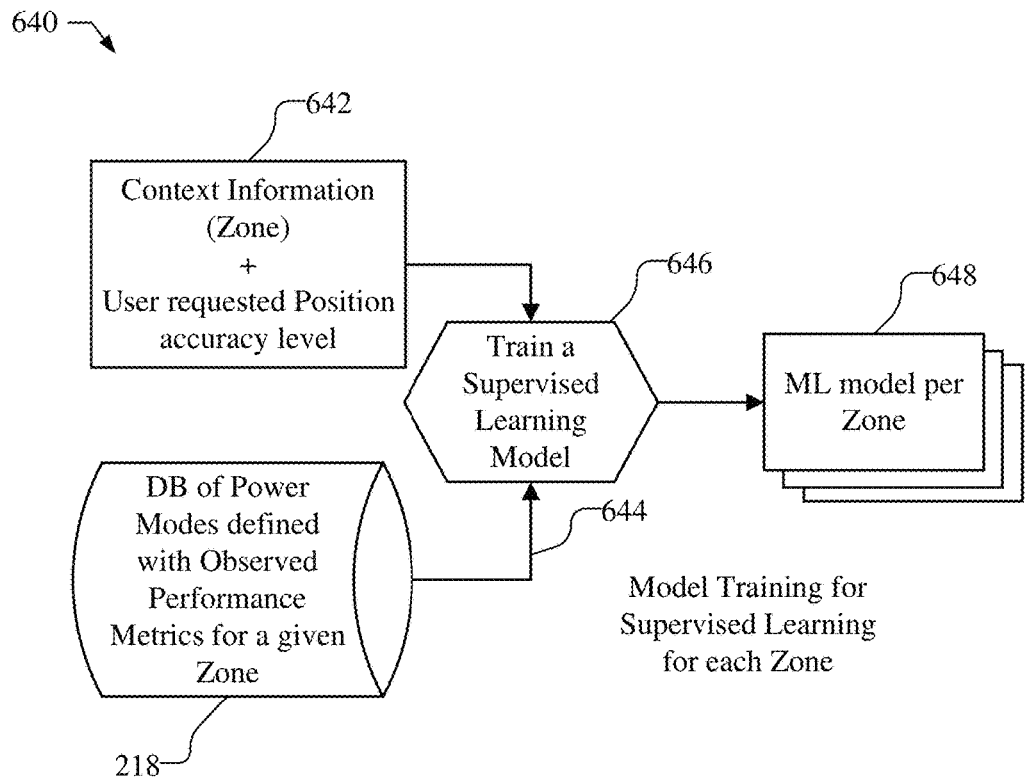

FIG. 6D, for example, illustrates an example of model training for supervised learning per zone 640, in which both the input data 642 and the label data 644 from the power mode database 218 are provided to the model training 646 to generate ML models per zone 648. The input data 642 is the context information, which includes the location zone, and user-requested position accuracy level, while the label data 644 may be the optimal RF power mode observed in the setting that is selected from the power mode database 218.

Figure 6E:
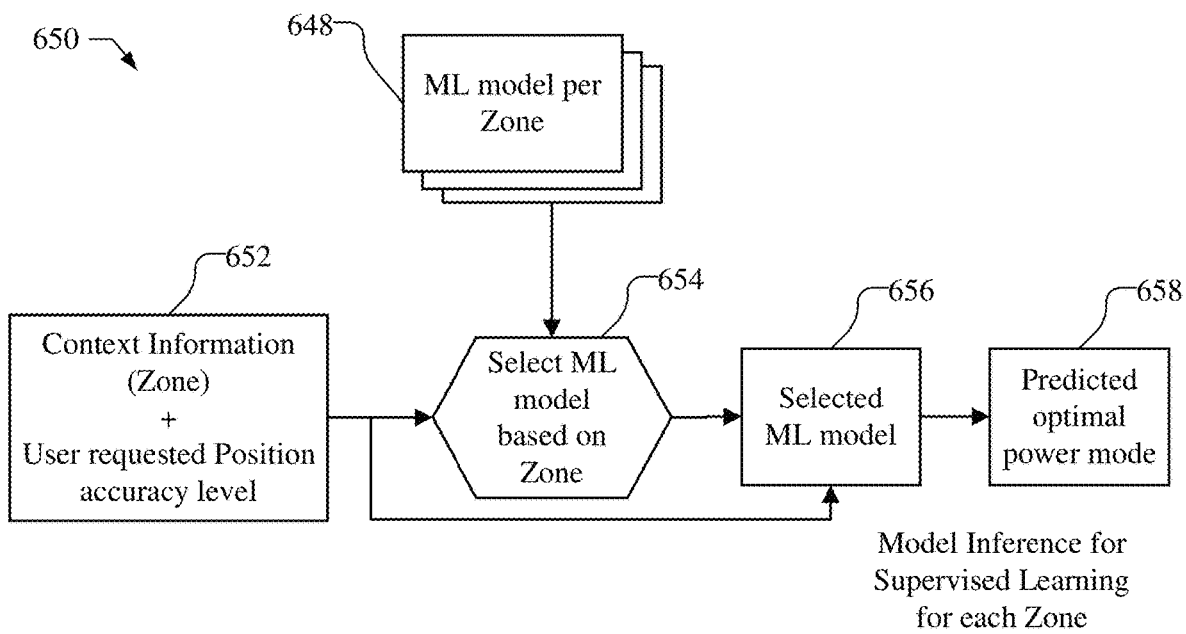

FIG. 6E illustrates an example of model inference for supervised learning for each zone 650, in which input data 652, which includes the context information, including the location zone is provided to a ML model selector 654. The ML model selector uses the location zone to select the ML model 656 from the ML models per zone 648, e.g., trained in FIG. 6D. The selected ML model 656 also receives the input data 652, which includes the context information and user-requested position accuracy level, and uses the input data to output a predicted optimal RF power mode 658. The selected ML model 656, may predict the top k most likely optimal RF power modes for the location zone and the given input setting, ranked by the probability of a given RF power mode to be most optimal in the given input setting and location zone.

Since training and maintaining separate ML models per each location zone may be expensive, it is possible to cluster the location zones with similar characteristics to a cluster group. Then one can train and maintain a ML model for each cluster group, which would reduce the number of ML models to maintain and also increase the amount data available to train a ML model. The clustering may be done using existing clustering algorithms such as k-means and derivative methods. For example, the k-means algorithm may be used on the crowdsourced data (context information, requested position accuracy level) to form arbitrary number of clusters that share similar RF power mode characteristics, user device characteristics, and/or location-specific characteristics. When a user device requests the server to provide a recommendation for optimal RF power mode in a given setting, the clustering algorithm may first map the context information sent by the user device to a specific cluster group. Then it will use a ML model, such as illustrated in FIG. 6B or 6E or recommender system, such as illustrated in FIG. 6C, specific to the cluster to make prediction on the optimal RF power mode.

Figure 6F:
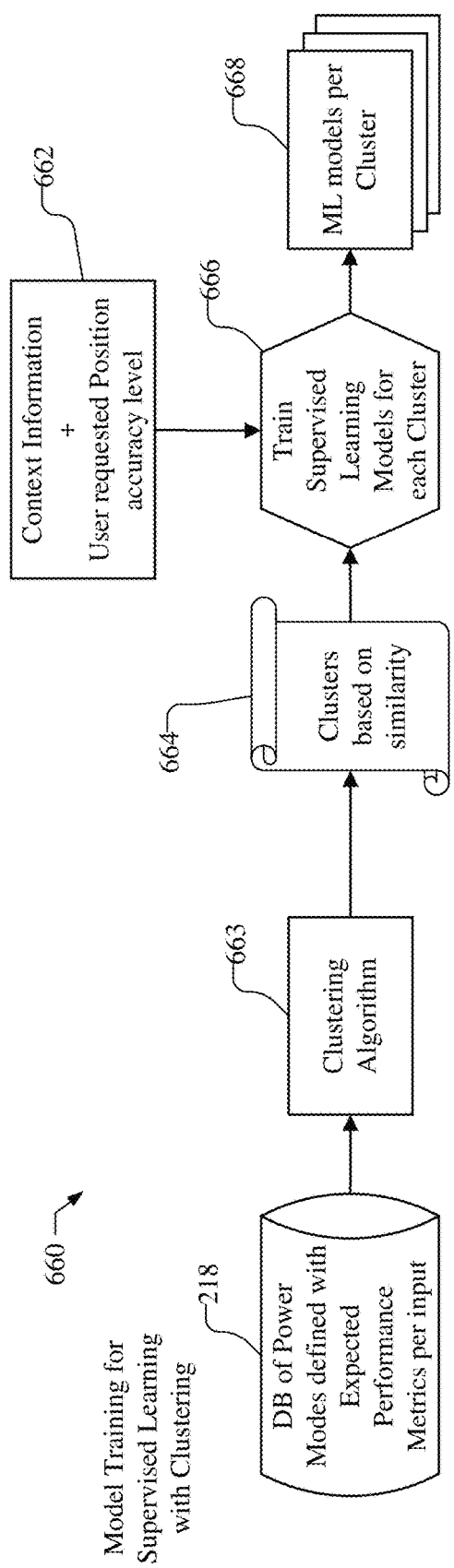
Figure 6G:
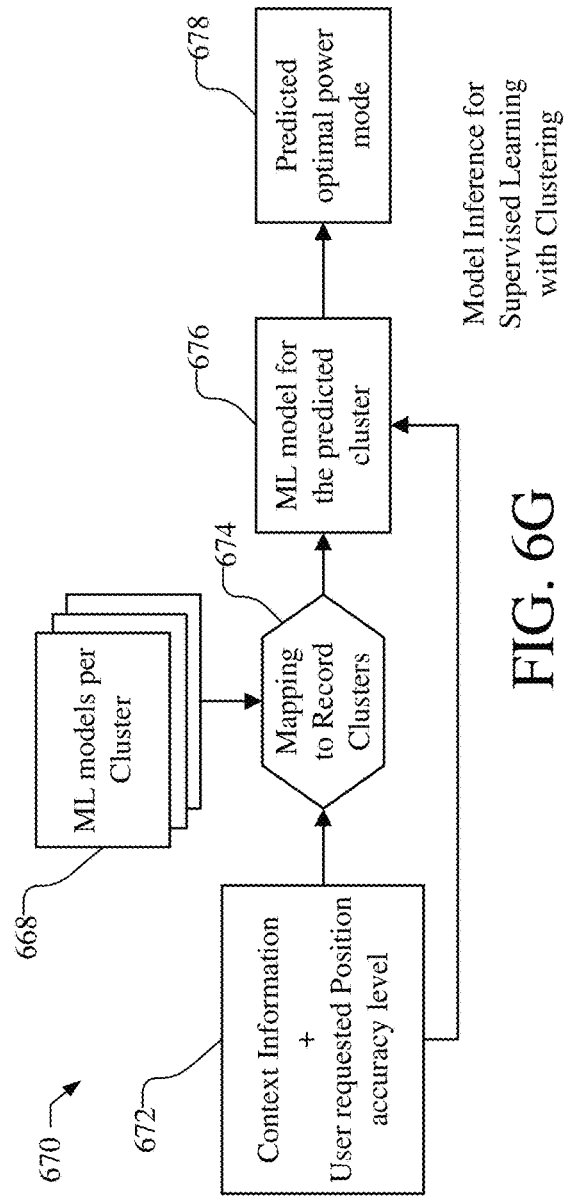

FIG. 6F, for example, illustrates an example of model training for supervised learning with clustering 660, in which both the input data 662 and cluster data 664 are provided to the model training 666 to generate ML models per cluster 668. The input data 662 is the context information, which may include location zone, and user-requested position accuracy level, while the cluster data 664 is produced using a clustering algorithm 663, such as k-means or its derivative methods, on crowdsourced data from the power mode database 218. The clustering algorithm 663, such as the k-means algorithm, may form an arbitrary number of clusters that share similar RF power mode characteristics, user device characteristics, and/or location-specific characteristics.

FIG. 6E illustrates an example of model inference for supervised learning with clustering 670, in which input data 672, including the context information, which may include the location zone, and user requested position accuracy level, is provided to a ML model selector 674. The ML model selector 674 maps the input data to the ML models per cluster 668, e.g., trained in FIG. 6F. The selected ML model 676 also receives the input data 672, which includes the context information and user-requested position accuracy level, and uses the input data to output a predicted optimal RF power mode 678. The selected ML model 676, may predict the top k most likely optimal RF power modes for the location zone and the given input setting, ranked by the probability of a given RF power mode to be most optimal in the given input setting and location zone.

Figure 7A:
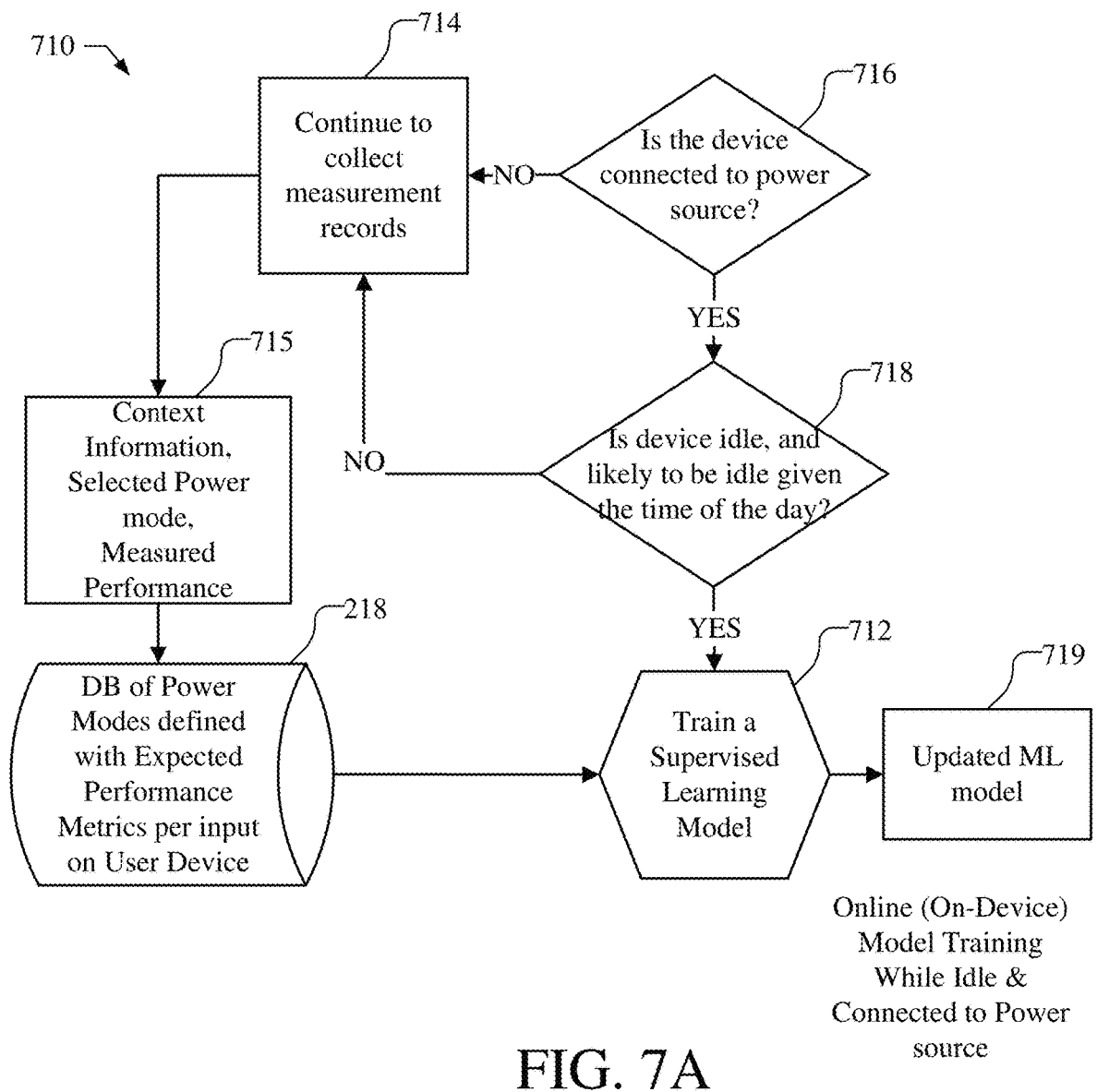
FIG. 7A to FIG. 7C illustrate examples of training approaches that may be used in one or more implementations.
Figure 7B:
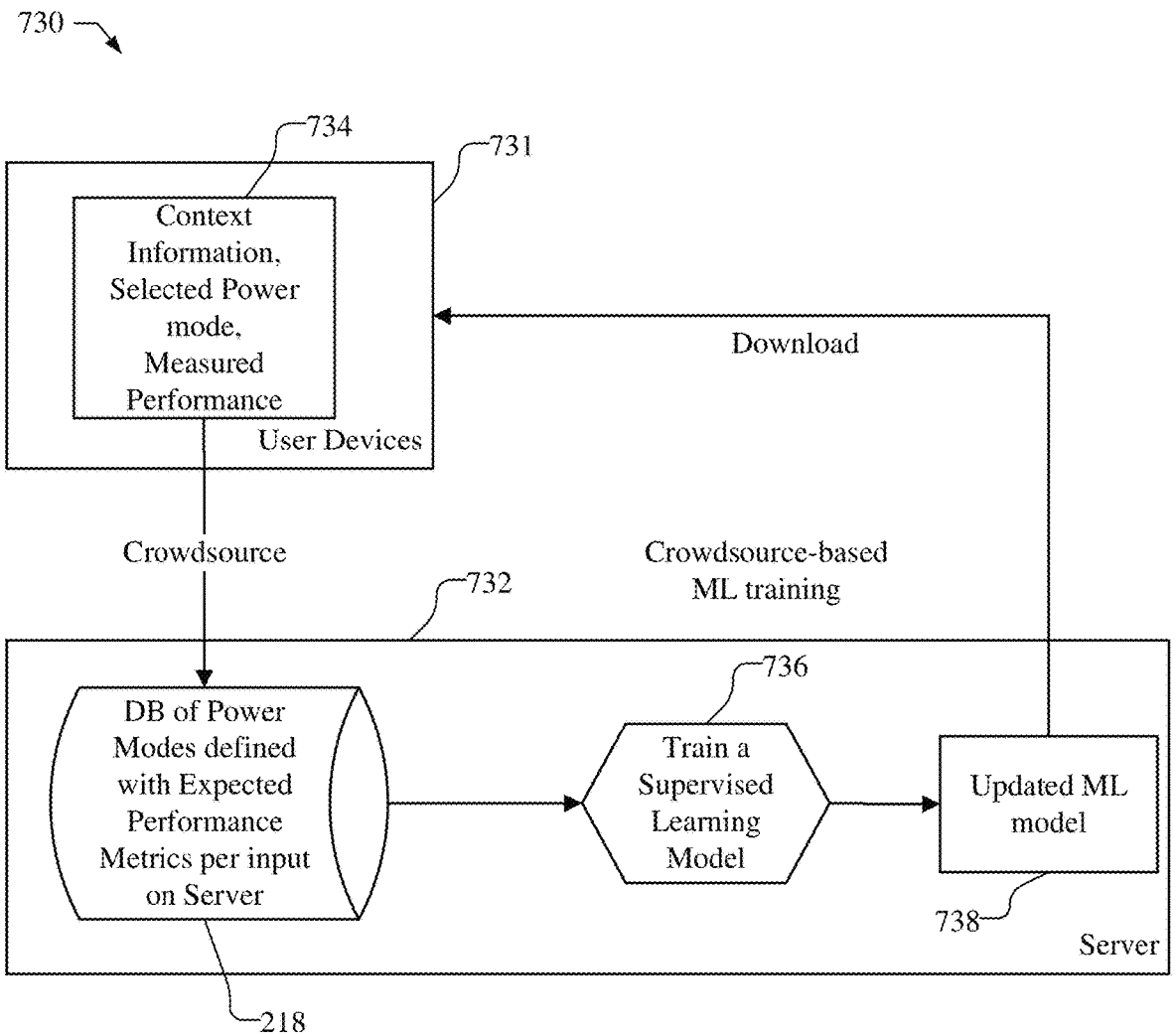
Figure 7C:
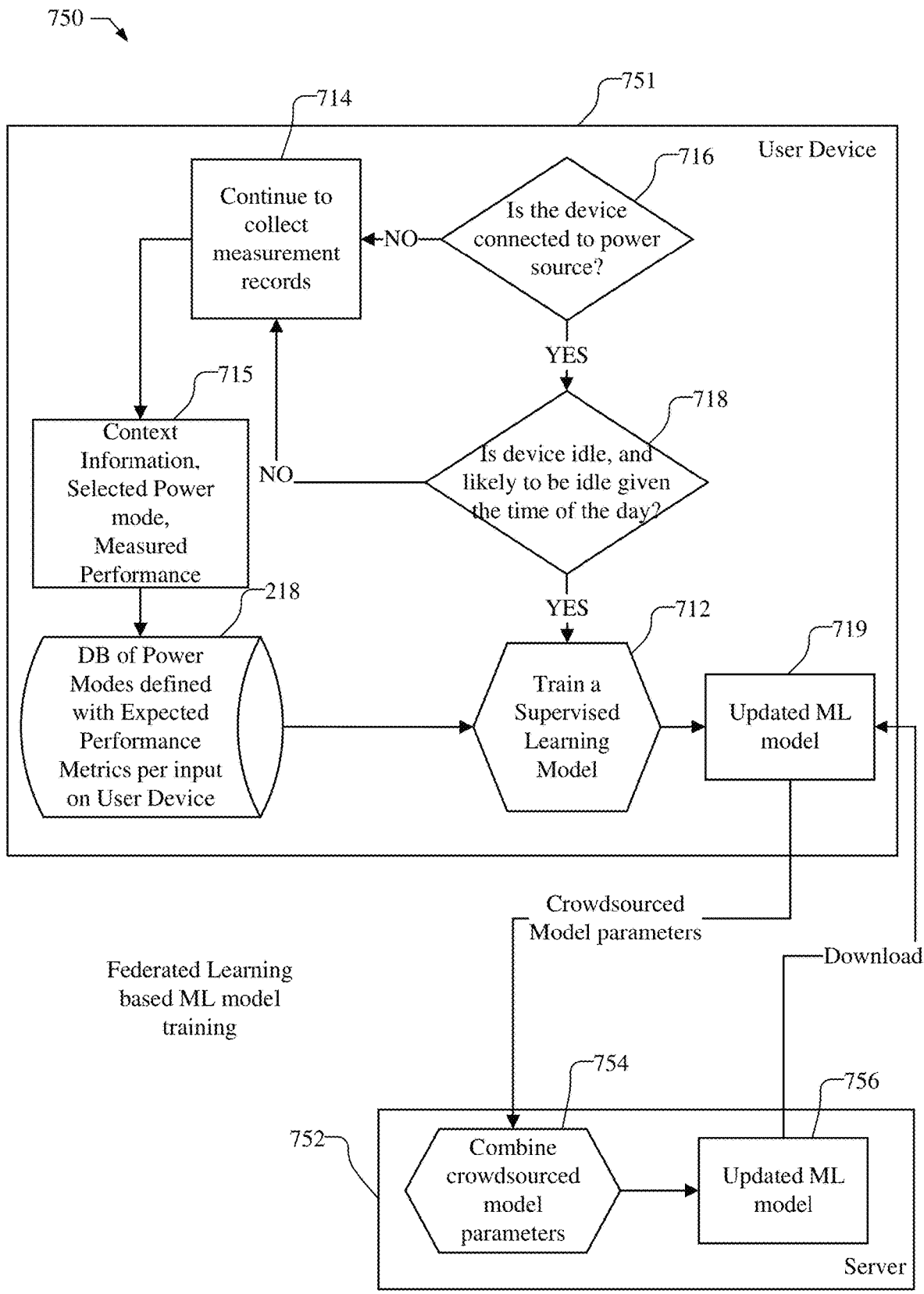

FIG. 7A to FIG. 7C illustrate examples of training approaches that may be used in one or more implementations.

FIG. 7A illustrates an example of an online learning process 710, which is sometimes referred to as on-device learning. An online (on-device) learning method involves training 712 a ML model that is in a user device using the data and the label collected by the user device, e.g., similar to the training shown in FIGS. 6A, 6D, and 6F. To do so, each user device would collect and record 714 the context information and requested position accuracy level along with the selected RF power mode and its performance metric data 715, which is stored in the power mode database 218. The ML model can be trained 712 on the user device once sufficient records are collected. The compute and power requirements to train a ML model on edge devices may be high. Thus, it may be advantageous to mitigate the cost of model training. One such method to mitigate the cost of model training is to postpone the training until the user device is connected to a power source as illustrated by block 716, or has sufficient battery charge level, and the device is idle for some predetermined duration, as illustrated by block 718. The training does not need to be completed in one continuous session. The training can be distributed to multiple time durations that meet the power and CPU idleness requirement to produce the updated ML model 719.

FIG. 7B illustrates an example of training process 730 on a server 732 with crowdsourced user data. Since online learning can be expensive in terms of power, time, and CPU cycles for edge devices, the ML model training may also be performed on a server 732 where the user-observed training and label data, e.g., context information and requested position accuracy level along with the selected RF power mode and its performance metric data 734 are crowdsourced in the power mode database 218 from user devices 731. Once sufficient amount of data is crowdsourced, the server 732 can initiate a ML model training 736 session to produce an updated ML model 738. Since servers are less limited by power or computing power than user devices, the model training 73 can be done in a continuous session. Also, engineers can manually inspect and modify the ML modeling using the crowdsourced data. The updated ML model 738 may be downloaded to the user devices 731.

FIG. 7C illustrates an example of a federated learning process 750 on a server 752 with crowdsource model parameters from user devices 751. While the model training using crowdsourced data on a server is ideal for ML model performance, crowdsourcing such data entails potential user privacy risks. To mitigate such privacy risks, the federated learning approach may be used, where the private user data stays in the user device and only the incremental model parameter updates from the user device's online learning are crowdsourced by the server. For example, an offline ML model 719, such as discussed in FIG. 7A, is trained in the user device 751 to predict the optimal RF power mode given a user context information can be deployed to a host of user devices initially. As each user device 751 collects more data and label, each device can run online training 712 to update the parameters in its ML model 719. The parameter updates can be crowdsourced by the server 752 with much reduced privacy concern. Since each user device 751 is using the same ML model architecture, the structure of the model parameters will be the same among these devices and only the values will vary. The server 752 may aggregate 754 these model parameter updates from the host of user devices to form a finalized model update 756, which then can be pushed (e.g., downloaded) to each user device 751 for enhanced and more generalized model performance.

Figure 8:
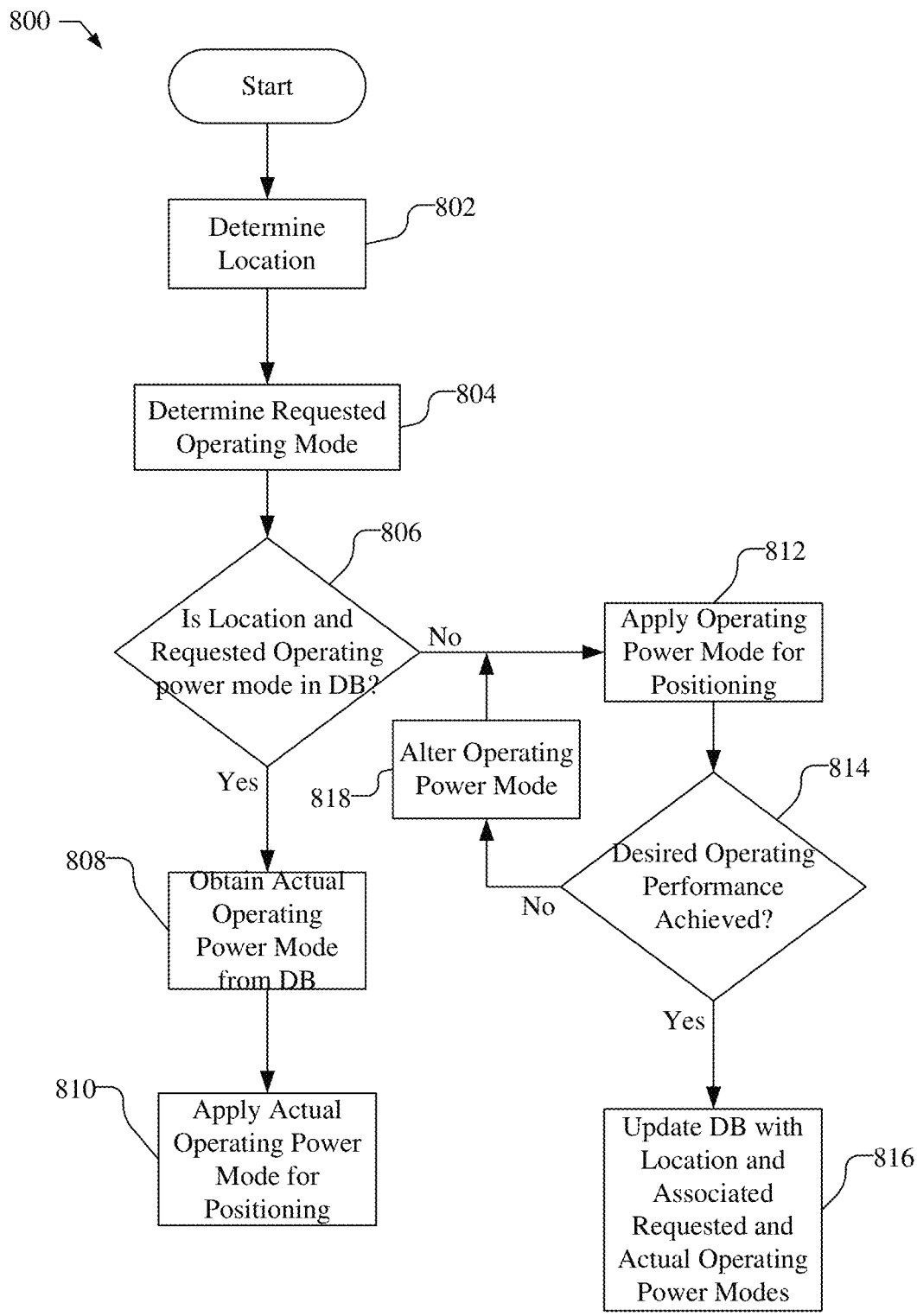
FIG. 8 is a flow chart illustrating operation of a power mode manager in a mobile device to select an appropriate operating power mode for positioning and/or build a power mode database.

FIG. 8 is a flow chart 800 illustrating operation of a power mode manager in the mobile device 105 to select an appropriate operating power mode for positioning and/or build a power mode database in accordance with some implementations.

As illustrated at block 802, at the start of a positioning, a rough location of the mobile device 105 may be determined. The location may be determined, for example, based on a prior recent position estimate, e.g., within a threshold amount of time, or based on the wireless signals and/or base stations or access points that are visible, etc. In some implementations, the location may be converted to a location zone such as a geo-polygon, a civic location (e.g., postal address, building ID, etc.) or other geographic representations, which may be stored in mobile device 105 or generated by the power mode manager.

At block 804, the requested operating power mode for positioning may be determined. The requested operating power mode, for example, may be requested by an internal function or application in the mobile device 105 and may be determined based on a requested positioning mode. The requested operating power mode may include, e.g., the types of signals and the frequencies of the RF signals to be received for positioning. Additional parameters may additionally be determined, such as an update rate, performance, or accuracy requirements, e.g., QoS of the location request, latency requirements, etc. Current contextual parameters, including user context, environmental context, and temporal context, may likewise be determined.

At block 806, the power mode manager may determine if the location and requested operating power mode (and in some implementations the current contextual parameters) are already stored in the power mode database. For example, if the power mode database is local, the power mode manager may access the local database to determine if the location (or location zone) and associated requested and actual operating power modes are already stored in the local database. If the power mode database is remote, e.g., for example, if the database is a crowdsourced database, the power mode manager may send the location (or location zone) and associated requested and actual operating power modes to a remote server and the server may determine if the data is already stored in power mode database. In some implementations, for example, the power mode manager may provide the current location, and the server may associate the location with a location zone. If the power mode database already includes the location (or location zone) and requested operating power mode, the actual operating power mode may be obtained from a local power mode database or remote power mode database (via a server) at block 808. In some implementations, contextual parameters may additionally be used to obtain the associated actual operating power mode from the power mode database. In some implementations, the actual operating power mode may be determined based on likelihoods of the operating power mode achieving a desired operation performance. For example, likelihoods may be established based on frequency of observation or lack thereof and the time between observations and may use weighting for various contextual parameters. Likelihoods may be determined for operating power modes to achieve a desired operation performance for the current location zone based on the requested operating power mode and the one or more parameters from the power mode database, and the power mode information with the highest likelihood that is above a predetermined threshold may be selected as the actual operating power mode.

At block 810, the actual operating power mode obtained from the power mode database may be applied and used while determining a position of the mobile device.

If at block 806, it is determined that the location and requested operating power mode (and in some implementations the current contextual parameters) are not already stored in the power mode database, at block 812, the default operating power mode, i.e., the requested operating power mode, may be applied and used to attempt to determine a position of the mobile device.

At block 814, the power mode manager may determine if the desired operating performance is achieved, e.g., whether the position can be obtained with the desired accuracy, latency, update rate, etc. If the desired operating performance is achieved, at block 816, the power mode database is updated with the location (or location zone) and associated requested and actual operating power modes. For example, if the power mode database is local, the power mode manager may store the location (or location zone) and associated requested and actual operating power modes to the local database. If the power mode database is remote, e.g., for example, if the database is a crowdsourced database, the power mode manager may send the location (or location zone) and associated requested and actual operating power modes to a remote server and the server may store the data in the power mode database. In some implementations, for example, the power mode manager may provide the current location, and the server may associate the location with a location zone. In some implementations, the current contextual information, such as user context, environmental context (including, e.g., the RF environment such as received signal characteristics), and temporal context associated with the location and requested and actual operating power modes may be stored in the power mode database as well. Additional parameters, such as requested and achieved positioning accuracy may additionally be entered into the power mode database. In some implementations, the location or location zone may be indicated if it is a transition point, e.g., if the operating power mode transitions from one mode to a different mode.

If the desired operating performance is not achieved, at block 818, the operating RM mode may be altered, e.g., to change the frequency of signals and/or the type of signals used, and blocks 812 and 814 are repeated until the desired operating performance is achieved, and the power mode database is updated with location and associated requested and actual operating power modes in block 816 accordingly.

In some implementations, after applying the actual operating power mode for positioning at block 810, the power mode manager may determine if the desired operating performance is achieved and if not, may iteratively adjust the operating power mode until the desired operating performance is achieved and update the power mode database with the actual operating power mode used to achieve the desired operating performance, along with any relevant contextual parameters, similar to blocks 812, 814, 816 and 818. Thus, the power mode database may be updated with new locations with associated requested and actual operating power modes over time. Additionally, locations with associated requested and actual operating power modes that are already present power mode database may be updated over time.

Figure 9:
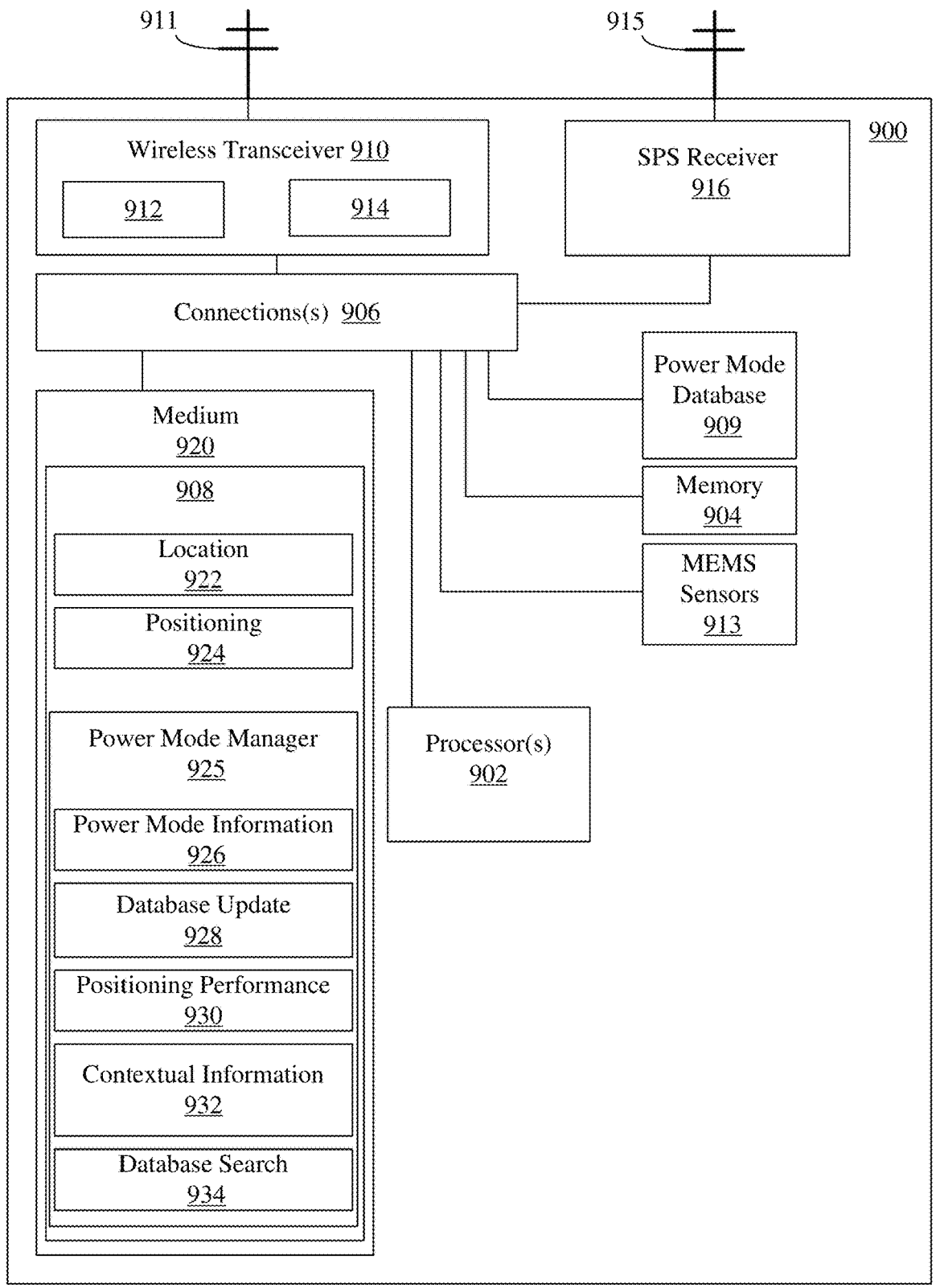
FIG. 9 shows a schematic block diagram illustrating certain exemplary features of a mobile device enabled to support building a power mode database and to support positioning using the power mode database.

FIG. 9 shows a schematic block diagram illustrating certain exemplary features of a mobile device 900, e.g., which may be mobile device 105 shown in FIG. 1, enabled to support building a power mode database and to support positioning using the power mode database, according to the disclosure herein. The mobile device 900 may be configured to perform the operations illustrated in FIGS. 2, 3, 6, 7, and 8, and the processes 1100 and 1200 of FIGS. 11 and 12, respectively, and any associated algorithms as discussed herein. Mobile device 900 may, for example, include one or more processors 902, memory 904, an external interface such as a wireless transceiver 910, MEMS sensors 913 that may include, e.g., inertial sensors, such as an accelerometer, gyroscope, magnetometers, etc., light sensors, etc., and an SPS receiver 916, which may be operatively coupled with one or more connections 906 (e.g., buses, lines, fibers, links, etc.) to non-transitory computer readable medium 920 and memory 904. The mobile device 900 may also include a local power mode database 909, which may be similar to or the same as power mode database 400 shown in FIG. 4A and may be stored on a computer-readable storage medium. In some implementations, the mobile device 900 may not have a local power mode database but may use a remote power mode database. The mobile device 900 may further include additional items, which are not shown, such as a user interface that may include e.g., a display, a keypad or other input device, such as virtual keypad on the display, through which a user may interface with the mobile device, or a satellite positioning system receiver. In certain example implementations, all, or part of mobile device 900 may take the form of a chipset, and/or the like.

The wireless transceiver 910 may, for example, include a transmitter 912 enabled to transmit one or more signals over one or more types of wireless communication networks and a receiver 914 to receive one or more signals transmitted over the one or more types of wireless communication networks, and may be configured for various communication protocols/standards, such as satellite communications, 5G NR, LTE, Wi-Fi, etc. In some implementations, mobile device 900 may include separate transceivers for different types of wireless signaling. The SPS receiver 916 may receive SPS signals with multiple frequency bands and of various satellite position signaling standards, such as GPS, GLONASS, GAL, BDS, and/or other type of satellite positioning system. The SPS receiver 916 may include a measurement engine and a position engine, or one or more of the measurement engine and position engine may be implemented by the one or more processors 902, e.g., implementing one or more instructions or program code 908 on a non-transitory computer readable medium, such as medium 920 and/or memory 904. The wireless transceiver 910 and SPS receiver 916 may be controlled for different power modes. For example, the wireless transceiver 910 and SPS receiver 916 may be turned off or on, tuned to specific frequencies, update rates adjusted, etc., based on an applied operating power mode.

In some embodiments, mobile device 900 may include one or more antennas 911 and 915, which may be internal or external. Antenna 911 may be used to transmit and/or receive signals processed by wireless transceiver 910. In some embodiments, antenna 911 may be coupled to wireless transceiver 910. In some embodiments, measurements of signals received (transmitted) by mobile device 900 may be performed at the point of connection of the antenna 911 and wireless transceiver 910. For example, the measurement point of reference for received (transmitted) RF signal measurements may be an input (output) terminal of the receiver 914 (transmitter 912) and an output (input) terminal of the antenna 911. In a mobile device 900 with multiple antennas 911 or antenna arrays, the antenna connector may be viewed as a virtual point representing the aggregate output (input) of multiple mobile device antennas. Antenna 915 may be coupled to SPS receiver 916 and may be used to receive SPS signals on multiple frequency bands. In some embodiments, measurements of SPS signals received by mobile device 900 may be performed at the point of connection of the antenna 915 and SPS receiver 916.

The MEMS sensors 913 may include, e.g., an accelerometer, gyroscope, magnetometers, etc., which may be used to detect movement and orientation of the mobile device 900 and may be used to detect user context information, such as one or more motion characteristics of the mobile device 900 which may be classified, e.g., as walking, biking, driving, train, etc. The MEMS sensors 913 may further include light detectors, which may be able to detect, e.g., if the mobile device 900 is indoors or outdoors.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of mobile device 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in mobile device 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables or databases (such as power mode database 909) may reside in the medium 920 and/or memory 904 and be utilized by the one or more processors 902 in order to manage both communications and the functionality described herein. It should be appreciated that the organization of the contents of the medium 920 and/or memory 904 as shown in mobile device 900 is merely exemplary, and as such the functionality of the modules and/or data structures may be combined, separated, and/or be structured in different ways depending upon the implementation of the mobile device 900.

The medium 920 and/or memory 904 may include a location module 922 that when implemented by the one or more processors 902 configures the one or more processors 902 to determine a location of the mobile device 900 and in some implementation, to determine a classified location zone in which the mobile device 900 is located. The one or more processors 902, for example, may be configured to determine a rough estimate for the current location of the mobile device 900 based on previous location estimates or based on wireless signals, which may include cell IDs, or other identifiers that may be used to provide an approximate position of the mobile device 900. The one or more processors 902 may be configured to determine a classified location zone in which the mobile device 900 is present, e.g., based on geo-polygons, civic locations (e.g., postal address, building ID, room, floor, etc.) or other geographic representations that may be stored in mobile device 900 or otherwise obtained based on location observations mapped to geopolygons, building ID, or zones identified through stored or downloaded maps.

The medium 920 and/or memory 904 may include a positioning module 924 that when implemented by the one or more processors 902 configures the one or more processors 902 to perform positioning using wireless signals, e.g., using wireless transceiver 910 and/or SPS receiver 916 to apply an operating power mode comprising specific types and frequencies of RF signals, update rates, etc., for receiving and measuring wireless signals for positioning. The one or more processors 902 may be configured to obtain a requested operating power mode for a particular location (for example, based on a requested positioning mode, e.g., to achieve the requested positioning result, and which may include, e.g., the type of RF signal, frequencies of RF signal, update rate, and operation performance, and may adjust the operating power mode from the requested operating power mode during positioning and to monitor which operating power mode is applied to obtain the desired operation performance. The one or more processors 902 may further be configured to apply an actual operating power mode for positioning as obtained from a power mode database.

The medium 920 and/or memory 904 may include a power mode manager 925 that when implemented by the one or more processors 902 configures the one or more processors 902 to use a power mode database for positioning and/or to build and update the power mode database, as discussed herein. The power mode manager 925, for example, may include a number of functional modules and/or data structures which may be combined, separated, and/or be structured in different ways depending upon the implementation of the mobile device 900.

The medium 920 and/or memory 904 may include a power mode information module 926, which may be part of the power mode manager 925, that when implemented by the one or more processors 902 configures the one or more processors 902 to determine power mode information for RF reception at any location. The power mode information, for example, may be an operating power mode requested by a function or application in the mobile device 900 and the actual operating power mode used for positioning, wherein an operating power mode comprises types and frequencies of RF signals received for positioning.

The medium 920 and/or memory 904 may include a database update module 928, which may be part of the power mode manager 925, that when implemented by the one or more processors 902 configures the one or more processors 902 to store the location or location zone and associated power mode information in a power mode database. For example, the location or location zone and associated power mode information may be stored in the local power mode database 909 or may be sent to a remote server, e.g., via wireless transceiver 910, for storage in a remote power mode database. The one or more processors 902 may be configured to store each determined location or location zone and associated power mode information in the power mode database and to update the power mode database as additional data is obtained. Moreover, the one or more processors 902 may be configured to store contextual information associated with the location or location zone and power mode information in the power mode database.

The medium 920 and/or memory 904 may include a positioning performance module 930, which may be part of the power mode manager 925, that when implemented by the one or more processors 902 configures the one or more processors 902 to determine the positioning performance and whether a requested positioning operation performance is achieved. By way of example, the positioning performance may be based on accuracy, such as an uncertainty or confidence level of the positioning estimate, or update rate, latency, etc.

The medium 920 and/or memory 904 may include a context information module 932, which may be part of the power mode manager 925, that when implemented by the one or more processors 902 configures the one or more processors 902 to determine context information associated with a location and power mode information used for positioning. The context information, for example, may include user context such as whether the mobile device 900 is moving and, if so, the class of motion such as walking, biking, driving, train, etc., which may be determined using data from the MEMS sensors 913, the current battery level, charging status etc. The context information may include the environmental context as well, such as whether the location of the mobile device 900 is indoors or outdoors, which may be determined using the current position and stored or downloaded map, whether RF signal reception is obstructed, e.g., based on Non-Line of Sight determinations, as well as the types of RF signals that are available at the current location and characteristics of received RF signals, such as RSSI, S/N, RSRP, RSRQ, etc. The context information may include temporal contextual information, such as a current time and/or day of the week.

The medium 920 and/or memory 904 may include a database search module 934, which may be part of the power mode manager 925, that when implemented by the one or more processors 902 configures the one or more processors 902 to obtain from a power mode database the actual operating power mode to be used in a current location zone based on the current location zone and the requested operating power mode. For example, a local power mode database 909 may be searched based on the current location or location zone and a requested operating power mode to obtain the actual operating power mode, or the current location or location zone and the requested operating power mode may be sent to a remote server, e.g., via wireless transceiver 910, to obtain the actual operating power mode from a remote power mode database. In some implementations, the actual operating power mode may be further obtained based on additional parameters such as context information, accuracy information, RF environment or a combination thereof. In some implementations, the one or more processors may be configured to determine likelihoods of operating power modes for achieving a desired operation performance for a current location or location zone based on the requested operating power mode and one or more parameters, and to select an operating power mode with the highest likelihood that is above a predetermined threshold as the actual operating power mode.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a program code 908. For example, the non-transitory computer readable medium including program code 908 stored thereon may include program code 908 to support building a power mode database and/or support positioning using the power mode database, in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include a wireless transceiver 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable program code 908 stored thereon, which if executed by one or more processors 902 may be operatively enabled to perform all or portions of the example operations as described herein. Computer readable medium 920 may be a part of memory 904.

Figure 10:
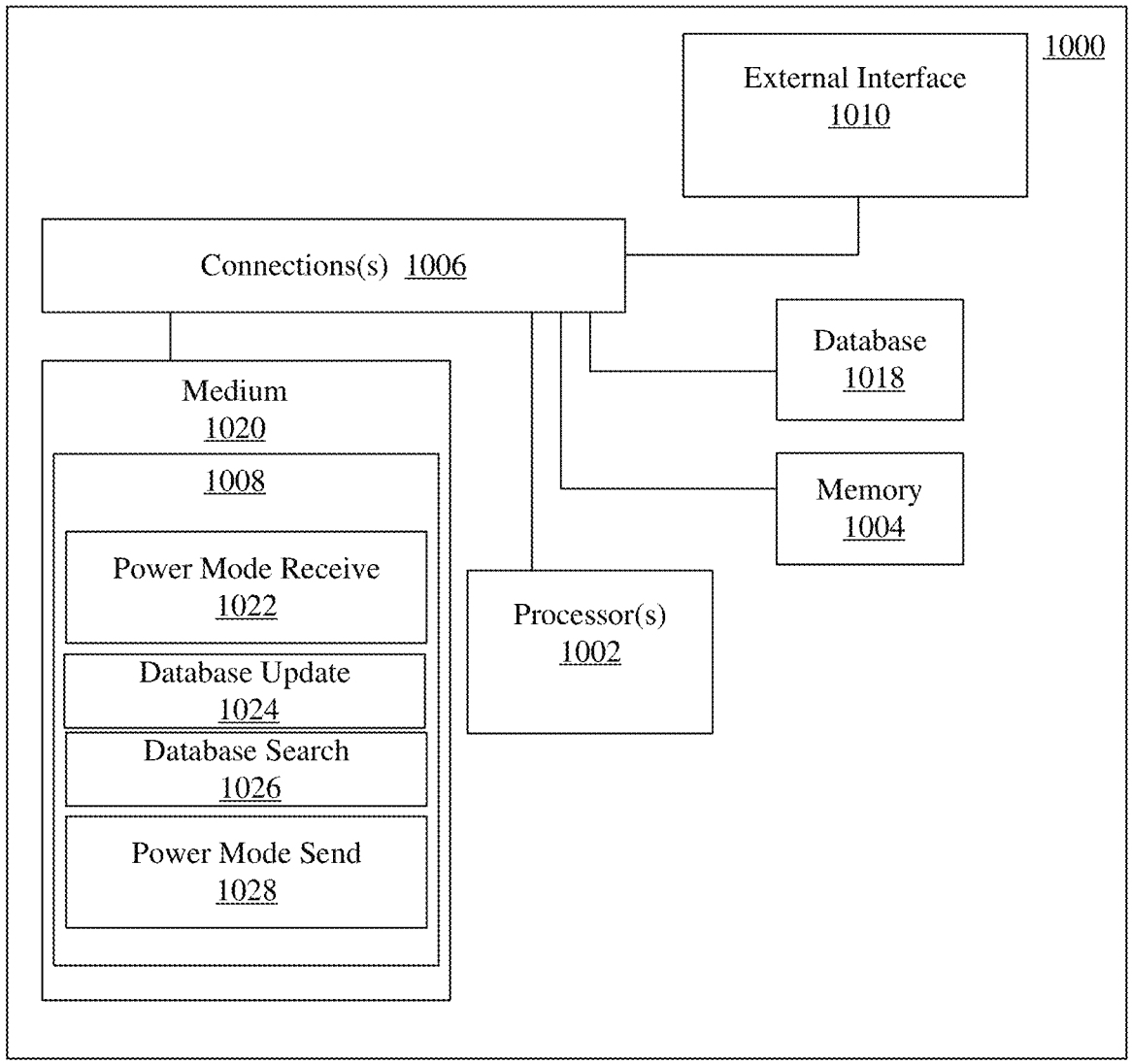
FIG. 10 shows a schematic block diagram illustrating certain exemplary features of a server enabled to support building a power mode database and to support positioning using the power mode database.

FIG. 10 shows a schematic block diagram illustrating certain exemplary features of a server 1000, e.g., which may be server 320 shown in FIG. 3, enabled to support building a power mode database and to support positioning using the power mode database, according to the disclosure herein. The server 1000 may be configured to perform the operations illustrated in FIGS. 2, 3, 6, 7, and 8, and the processes 1300 and 1400 of FIGS. 13 and 14, respectively, and any associated algorithms as discussed herein. The server 1000 may, for example, include one or more processors 1002, memory 1004, and an external interface, which may include an external interface 1010 (e.g., wireline or wireless network interface to other network entities and/or a core network) to communicate with one or more mobile devices, and which may be operatively coupled with one or more connections 1006 (e.g., buses, lines, fibers, links, etc.) to non-transitory computer readable medium 1020 and memory 1004. The server 1000 may also include or connected to a power mode database 1018, which may be the similar to or the same as power mode databases 400 or 450 shown in FIGS. 4A and 4B and may be stored on a computer-readable storage medium. FIG. 10 illustrates the power mode database 1018, but the power mode database 1018 may be separate from the server 1000 and may be accessible through one or more connections, e.g., through external interface 1010. In some implementations, the server 1000 may further include additional items, which are not shown, such as a user interface that may include e.g., a display, a keypad or other input device, such as virtual keypad on the display, through which a user may interface with the network entity. In certain example implementations, all, or part of server 1000 may take the form of a chipset, and/or the like. The external interface 1010 may be a wired or wireless interface capable of connecting to one or more mobile devices 105, e.g., via base station 126, access point 130, or communication satellite vehicle 122 illustrated in FIG. 1.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of server 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in server 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors.

A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in server 1000 is merely exemplary, and as such the functionality of the modules and/or data structures may be combined, separated, and/or be structured in different ways depending upon the implementation of the server 1000.

The medium 1020 and/or memory 1004 may include a power mode receive module 1022 that when implemented by the one or more processors 1002 configures the one or more processors 1002 to receive, via the external interface 1010, from one or more mobile devices, locations, or location zones in which each mobile device is located and associated power mode information for RF reception that is associated with each location zone. In some implementations, if a location of the mobile device is received, the one or more processors 1002 may be configured to determine a classified location zone in which the mobile device is present, e.g., based on geo-polygons, a civic locations (e.g., postal address, building ID, room, floor, etc.) or other geographic representations that may be stored in server 1000 or otherwise obtained based on location observations mapped to geopolygons, building ID, or zones identified through stored or downloaded maps. The power mode information, for example, may include an operating power mode, e.g., such as the types and frequencies of RF signals for positioning. In some implementations, the operating power mode may be the requested operating power mode, which the server 1000 may use to search the power mode database 1018, while in other implementations, the operating power mode may include both a requested operating power mode and actual operating power mode used for positioning by the mobile device, which the server 1000 may use to store in or update the power mode database 1018. In some implementations, the one or more processors 1002 may be further configured to receive context information associated with the location zone and power mode information. The context information, for example, may include user context, environmental context, temporal context, or a combination thereof. In some implementations, the one or more processors 1002 may be further configured to receive accuracy information associated with the location zone and power mode information. The accuracy information for example may comprise at least one of a requested positioning accuracy, an achieved positioning accuracy, an update rate, or a combination thereof. In some implementations, the one or more processors 1002 may be further configured to receive RF environment information associated with the location zone and power mode information, which may include, e.g., characteristics of received RF signals at the location zone.

The medium 1020 and/or memory 1004 may include a database update module 1024 that when implemented by the one or more processors 1002 configures the one or more processors 1002 to store location or location zone and associated power mode information in the power mode database 1018. In some implementations, the one or more processors 1002 may be further configured to store additional parameters associated with the location zone and associated power mode information, such as context information, accuracy information, or RF environment information.

The medium 1020 and/or memory 1004 may include a database search module 1026 that when implemented by the one or more processors 1002 configures the one or more processors 1002 to obtain from a power mode database 1018 the actual operating power mode to be used by a mobile device in a location zone based on the current location zone and the requested operating power mode. In some implementations, the actual operating power mode may be further obtained based on additional parameters such as context information, accuracy information, RF environment or a combination thereof. In some implementations, the one or more processors 1002 may be configured to determine likelihoods of operating power modes for achieving a desired operation performance for a current location or location zone based on the requested operating power mode and one or more parameters, and to select an operating power mode with the highest likelihood that is above a predetermined threshold as the actual operating power mode.

The medium 1020 and/or memory 1004 may include a power mode send module 1028 that when implemented by the one or more processors 1002 configures the one or more processors 1002 to send, via the external interface 1010, to a mobile device, the actual operating power mode to be used by the mobile device to receive RF signals for positioning in the mobile device's current location zone.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a program code 1008. For example, the non-transitory computer readable medium including program code 1008 stored thereon may include program code 1008 to support building a power mode database and/or to support positioning using a power mode database, in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include an external interface 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable program code 1008 stored thereon, which if executed by one or more processors 1002 may be operatively enabled to perform all or portions of the example operations as described herein. Computer readable medium 1020 may be a part of memory 1004.

Figure 11:
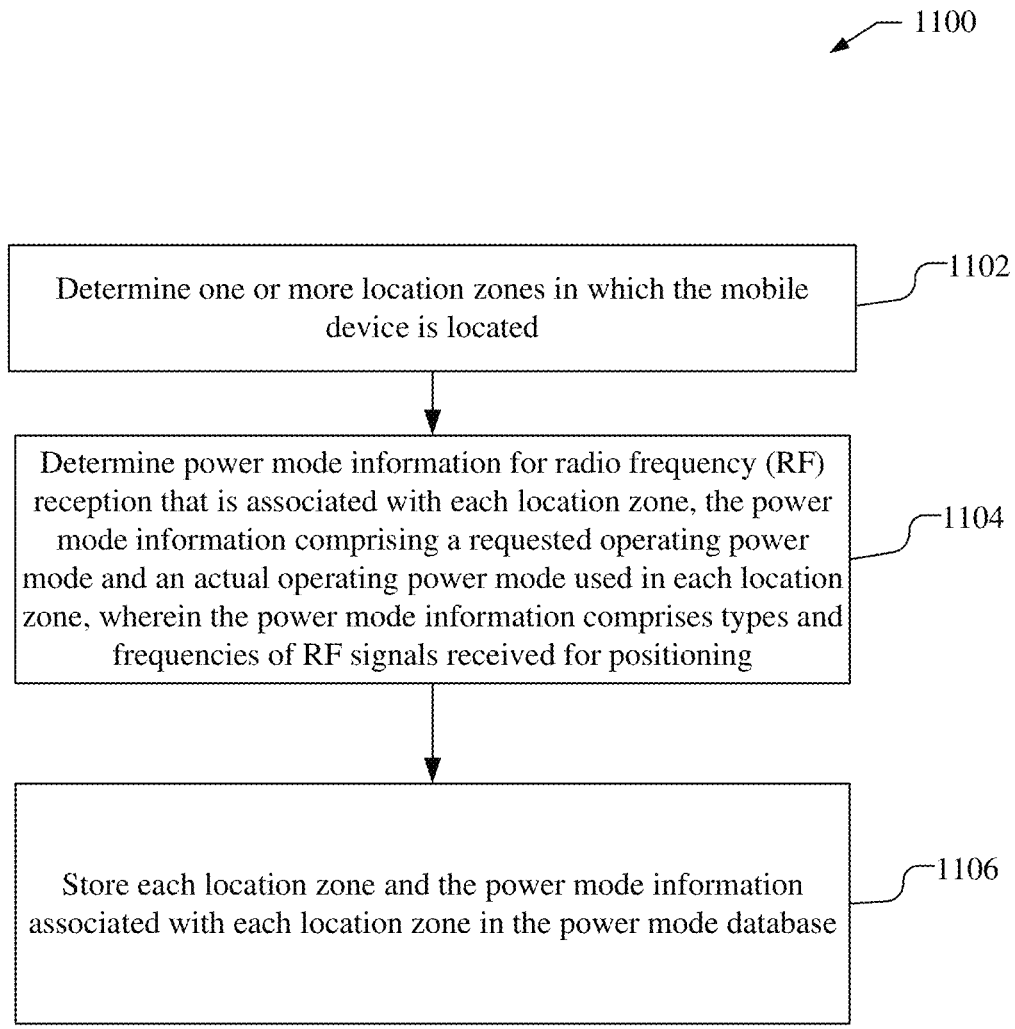
FIG. 11 is a flow chart illustrating a method performed by a mobile device for building a power mode database for positioning.

FIG. 11 is a flow chart illustrating a process 1100 for building a power mode database for positioning, performed by a mobile device, such as mobile device 105 or 900, as described herein.

At block 1102, one or more location zones in which the mobile device is located are determined, e.g., as discussed at block 802 of FIG. 8. A means for determining one or more location zones in which the mobile device is located may include the SPS receiver 916, a wireless transceiver 910, along with one or more processors 902 with dedicated hardware or implementing executable code or software instructions in memory 904 and/or medium 920 such as the location module 922.

At block 1104, power mode information is determined for radio frequency (RF) reception that is associated with each location zone, the power mode information comprising a requested operating power mode and an actual operating power mode used in each location zone, wherein the power mode information comprises types and frequencies of RF signals received for positioning, e.g., as discussed at blocks 804, 812, and 816 of FIG. 8. In one implementation, the operating power mode may further comprise at least one of positioning accuracy, power, time between fixes, or any combination thereof. The requested operating power mode, for example, may be based on a requested positioning mode, e.g., to achieve the requested positioning result. A means for determining power mode information for radio frequency (RF) reception that is associated with each location zone, the power mode information comprising a requested operating power mode and an actual operating power mode used in each location zone, wherein the power mode information comprises types and frequencies of RF signals received for positioning may include the SPS receiver 916, a wireless transceiver 910, along with one or more processors 902 with dedicated hardware or implementing executable code or software instructions in memory 904 and/or medium 920 such as the power mode information module 926.

At block 1106, each location zone and the power mode information associated with each location zone is stored in the power mode database, e.g., as discussed at block 816. A means for storing each location zone and the power mode information associated with each location zone in the power mode database may include the wireless transceiver 910, power mode database 909 along with one or more processors 902 with dedicated hardware or implementing executable code or software instructions in memory 904 and/or medium 920 such as the database update module 928.

In some implementations, the mobile device may determine additional power mode information associated with each location zone over time and update the power mode information associated with each location zone that is stored in the power mode database, e.g., as discussed at block 810 of FIG. 8. A means for determining additional power mode information associated with each location zone over time and updating the power mode information associated with each location zone that is stored in the power mode database may be the SPS receiver 916, a wireless transceiver 910, along with one or more processors 902 with dedicated hardware or implementing executable code or software instructions in memory 904 and/or medium 920 such as the power mode information module 926 and database update module 928.

In one implementation, the power mode database may be stored on the mobile device. In another implementation, the power mode database may be stored remotely from the mobile device, and may be, for example, a crowdsourced database. The mobile device may store each location zone and the power mode information associated with each location zone in the power mode database by sending each location zone and the power mode information associated with each location zone in the power mode database to a remote server that stores each location zone and the power mode information associated with each location zone in the power mode database, e.g., as discussed at block 816 of FIG. 8. A means for sending each location zone and the power mode information associated with each location zone in the power mode database to a remote server that stores the each location zone and the power mode information associated with each location zone in the power mode database may include the wireless transceiver 910 along with one or more processors 902 with dedicated hardware or implementing executable code or software instructions in memory 904 and/or medium 920 such as the database update module 928.

In one implementation, the mobile device may obtain a requested operating power mode in a location zone, the requested operating power mode comprising a requested type of RF signal, a requested frequencies of RF signal, a requested update rate, and a required operation performance, e.g., as discussed at blocks 802 and 804, and may adjust the operating power mode from the requested operating power mode during positioning, e.g., as discussed at block 818. The mobile device may monitor operation performance during positioning at the location zone to determine the actual operating power mode at the location zone that achieves the required operation performance, as discussed at block 814. A means for obtaining a requested operating power mode in a location zone, the requested operating power mode comprising a requested type of RF signal, a requested frequencies of RF signal, a requested update rate, and a required operation performance may include the SPS receiver 916, a wireless transceiver 910, along with one or more processors 902 with dedicated hardware or implementing executable code or software instructions in memory 904 and/or medium 920 such as the positioning module 924. A means for adjusting the operating power mode from the requested operating power mode during positioning may include the SPS receiver 916, a wireless transceiver 910, along with one or more processors 902 with dedicated hardware or implementing executable code or software instructions in memory 904 and/or medium 920 such as the positioning module 924. A means for monitoring operation performance during positioning at the location zone to determine the actual operating power mode at the location zone that achieves the required operation performance may include the SPS receiver 916, a wireless transceiver 910, along with one or more processors 902 with dedicated hardware or implementing executable code or software instructions in memory 904 and/or medium 920 such as the positioning module 924 and positioning performance module 930.

In some implementations, the mobile device may determine context information for each location zone and store in the power mode database context information associated with each location zone and power mode information, e.g., as discussed in blocks 804 and 816. The context information, for example, may include one or more of the following: user context comprising at least a class of motion of mobile device; environmental context comprising at least one or more of being indoors or outdoors, obstructed, or unobstructed RF signal reception, or a combination thereof; and temporal context comprising at least one of time of day, day of week, or a combination thereof. A means for determining context information for each location zone and storing in the power mode database context information associated with each location zone and power mode information may be the SPS receiver 916, a wireless transceiver 910, MEMS sensors 913 along with one or more processors 902 with dedicated hardware or implementing executable code or software instructions in memory 904 and/or medium 920 such as the context information module 932 and database update module 928.

In some implementations, the mobile device may determine accuracy information for each location zone and store in the power mode database the accuracy information associated with each location zone and power mode information, e.g., as discussed in blocks 804 and 816. The accuracy information, for example, may comprise at least one of a requested positioning accuracy, an achieved positioning accuracy, an update rate, or a combination thereof. A means for determining accuracy information for each location zone and storing in the power mode database the accuracy information associated with each location zone and power mode information may be the one or more processors 902 with dedicated hardware or implementing executable code or software instructions in memory 904 and/or medium 920 such as the positioning performance module 930.

In some implementations, the mobile device may determine an RF environment for each location zone and storing in the power mode database the RF environment associated with each location zone and power mode information, e.g., as discussed in blocks 804 and 816. The RF environment, for example, may comprise characteristics of received RF signals. A means for determining an RF environment for each location zone and storing in the power mode database the RF environment associated with each location zone and power mode information may include the SPS receiver 916, a wireless transceiver 910, along with one or more processors 902 with dedicated hardware or implementing executable code or software instructions in memory 904 and/or medium 920 such as the context information module 932.

Figure 12:
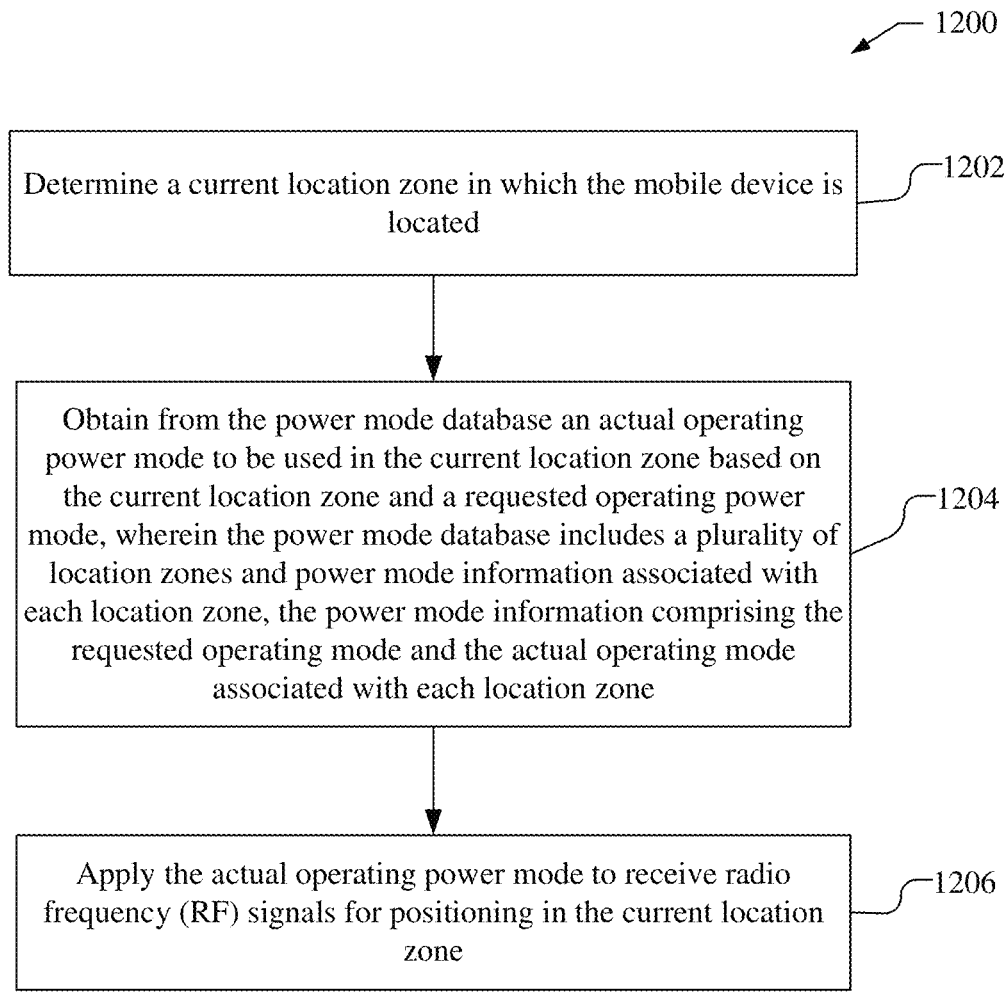
FIG. 12 is a flow chart illustrating a method performed by a mobile device for using a power mode database for positioning.

FIG. 12 is a flow chart illustrating a process 1200 for using a power mode database for positioning, performed by a mobile device, such as mobile device 105 or 900, as described herein.

At block 1202, a current location zone in which the mobile device is located is determined, e.g., as discussed at block 802 of FIG. 8. A means for determining a current location zone in which the mobile device is located may include the SPS receiver 916, MEMS sensors, 913, a wireless transceiver 910, along with one or more processors 902 with dedicated hardware or implementing executable code or software instructions in memory 904 and/or medium 920 such as the location module 922.

At block 1204, the mobile device obtains from the power mode database an actual operating power mode to be used in the current location zone based on the current location zone and a requested operating power mode, wherein the power mode database includes a plurality of location zones and power mode information associated with each location zone, the power mode information comprising a requested operating mode and an actual operating mode associated with each location zone, e.g., as discussed at block 808 of FIG. 8. In one implementation, an operating power mode may comprise at least one of types and frequencies of RF signals received for positioning, positioning accuracy, power, time between fixes, or any combination thereof. A means for obtaining from the power mode database an actual operating power mode to be used in the current location zone based on the current location zone and a requested operating power mode, wherein the power mode database includes a plurality of location zones and power mode information associated with each location zone, the power mode information comprising a requested operating mode and an actual operating mode associated with each location zone may include the wireless transceiver 910, along with one or more processors 902 with dedicated hardware or implementing executable code or software instructions in memory 904 and/or medium 920 such as the database search module 934.

At block 1206, the actual operating power mode is applied to receive radio frequency (RF) signals for positioning in the current location zone, e.g., as discussed at block 810 of FIG. 8. A means for applying the actual operating power mode to receive RF signals for positioning in the current location zone may include the SPS receiver 916, a wireless transceiver 910, along with one or more processors 902 with dedicated hardware or implementing executable code or software instructions in memory 904 and/or medium 920 such as the positioning module 924.

In one implementation, a requested operating power mode for the mobile device is determined, wherein the requested operating power mode comprises types and frequencies of RF signals received for positioning, e.g., as discussed at block 804 of FIG. 8. The requested operating power mode, for example, may be determined based on a user or application requested positioning mode, e.g., to achieve the requested positioning result. A means for determining a requested operating power mode for the mobile device, wherein the requested operating power mode comprises types and frequencies of RF signals received for positioning may include the SPS receiver 916, a wireless transceiver 910, along with one or more processors 902 with dedicated hardware or implementing executable code or software instructions in memory 904 and/or medium 920 such as the positioning module 924 and power mode information module 926.

In one implementation, the power mode database may be stored on the mobile device. In another implementation, the power mode database may be stored remotely from the mobile device, and may be, for example, a crowdsourced database. The mobile device may obtain from the power mode database the actual operating power mode by sending to a server an indication of the current location zone and the requested operating power mode; and receiving from the server an indication of the actual operating power mode to be used in the current location zone based on the indication on the current location zone and the requested operating power mode, e.g., as discussed at block 806 and 808 of FIG. 8. A means for sending to a server an indication of the current location zone and the requested operating power mode; and receiving from the server an indication of the actual operating power mode to be used in the current location zone based on the indication on the current location zone and the requested operating power mode may include the wireless transceiver 910 along with one or more processors 902 with dedicated hardware or implementing executable code or software instructions in memory 904 and/or medium 920 such as the database search module 934.

In one implementation, the mobile device may determine at least one or more parameters comprising context information, accuracy information, RF environment or a combination thereof, wherein the actual operating power mode to be used in the current location zone may be obtained further based on the one or more parameters, e.g., as discussed at block 808 of FIG. 8. The context information, for example, may include one or more of the following: user context comprising at least a class of motion of mobile device; environmental context comprising at least one or more of being indoors or outdoors, obstructed, or unobstructed RF signal reception, or a combination thereof; and temporal context comprising at least one of time of day, day of week, or a combination thereof. The accuracy information may comprise at least one of a requested positioning accuracy, an achieved positioning accuracy, an update rate, or a combination thereof. The RF environment may comprise characteristics of received RF signals. The actual operating power mode to be used in the current location zone further may be obtained from the power mode database, e.g., by determining likelihoods of operating power modes of achieving a desired operation performance for the current location zone based on the requested operating power mode and the one or more parameters from the power mode database, and selecting an operating power mode with a highest likelihood that is above a predetermined threshold as the actual operating power mode, e.g., as discussed at block 808 of FIG. 8. A means for determining likelihoods of operating power modes of achieving a desired operation performance for the current location zone based on the requested operating power mode and the one or more parameters from the power mode database may include the one or more processors 902 with dedicated hardware or implementing executable code or software instructions in memory 904 and/or medium 920 such as the database search module 934. A means for selecting an operating power mode with the highest likelihood that is above a predetermined threshold as the actual operating power mode may include the one or more processors 902 with dedicated hardware or implementing executable code or software instructions in memory 904 and/or medium 920 such as the database search module 934.

Figure 13:
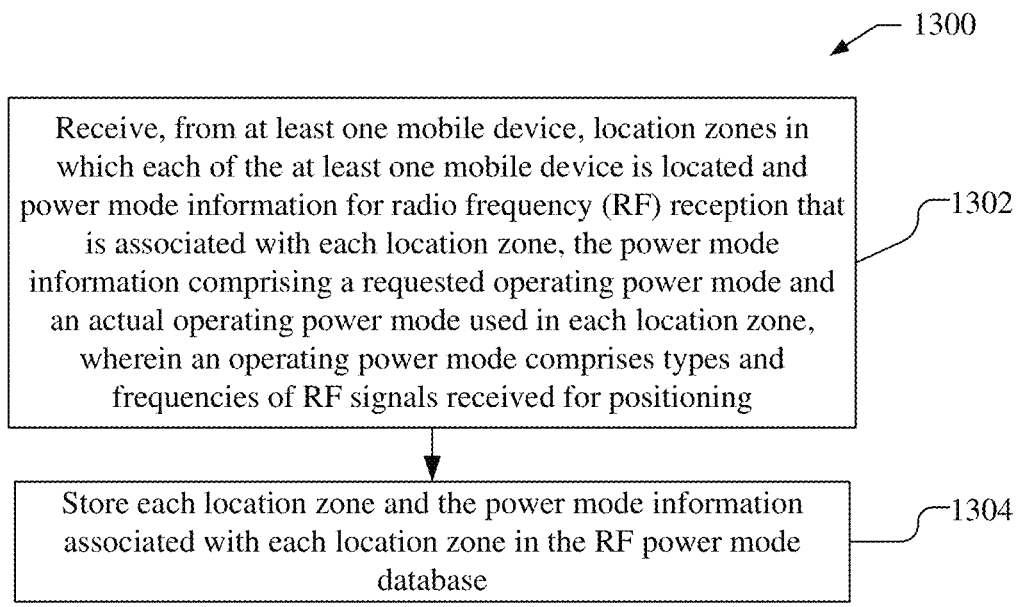
FIG. 13 is a flow chart illustrating a method performed by a server for building a power mode database for positioning.

FIG. 13 is a flow chart illustrating a process 1300 for building a power mode database for positioning, performed by a server, such as server 320 or 1000, as described herein.

At block 1302, the server receives, from at least one mobile device, location zones in which each of the at least one mobile device is located and power mode information for radio frequency (RF) reception that is associated with each location zone, the power mode information comprising a requested operating power mode and an actual operating power mode used in each location zone, wherein an operating power mode comprises types and frequencies of RF signals received for positioning, e.g., as discussed at block of 816 of FIG. 8. In one implementation, the operating power mode may further comprise at least one of positioning accuracy, power, time between fixes, or any combination thereof. A means for receiving, from at least one mobile device, location zones in which each of the at least one mobile device is located and power mode information for radio frequency (RF) reception that is associated with each location zone, the power mode information comprising a requested operating power mode and an actual operating power mode used in each location zone, wherein an operating power mode comprises types and frequencies of RF signals received for positioning may include the external interface 1010, along with one or more processors 1002 with dedicated hardware or implementing executable code or software instructions in memory 1004 and/or medium 1020 such as the power mode receive module 1022.

At block 1304, the server stores each location zone and the power mode information associated with each location zone in the power mode database, e.g., as discussed at block 816 of FIG. 8. A means for storing each location zone and the power mode information associated with each location zone in the power mode database may include the one or more processors 1002 with dedicated hardware or implementing executable code or software instructions in memory 1004 and/or medium 1020 such as the database update module 1024.

In some implementations, the server may receive additional power mode information associated with each location zone over time and update the power mode information associated with each location zone that is stored in the power mode database, e.g., as discussed at block 816 of FIG. 8. A means for receiving additional power mode information associated with each location zone over time may include the external interface 1010, along with one or more processors 1002 with dedicated hardware or implementing executable code or software instructions in memory 1004 and/or medium 1020 such as the power mode receive module 1022. A means for updating the power mode information associated with each location zone that is stored in the power mode database may include the one or more processors 1002 with dedicated hardware or implementing executable code or software instructions in memory 1004 and/or medium 1020 such as the database update module 1024.

In one implementation, the power mode database may be a crowdsourced database and the location zones and associated power mode information may be received from a plurality of mobile devices.

In one implementation, the server may receive context information for each location zone and store in the power mode database context information associated with each location zone and power mode information, e.g., as discussed at block 816 of FIG. 8. The context information, for example, may include one or more of the following: user context comprising at least a class of motion of mobile device; environmental context comprising at least one or more of being indoors or outdoors, obstructed, or unobstructed RF signal reception, or a combination thereof; and temporal context comprising at least one of time of day, day of week, or a combination thereof. A means for receiving context information for each location zone and a means for storing in the power mode database context information associated with each location zone and power mode information may include the external interface 1010, along with one or more processors 1002 with dedicated hardware or implementing executable code or software instructions in memory 1004 and/or medium 1020 such as the power mode receive module 1022 and database update module 1024.

In some implementations, the server may receive accuracy information for each location zone and storing in the power mode database the accuracy information associated with each location zone and power mode information, e.g., as discussed at block 816 of FIG. 8. The accuracy information for example may comprise at least one of a requested positioning accuracy, an achieved positioning accuracy, an update rate, or a combination thereof. A means for receiving accuracy information for each location zone and means for storing in the power mode database the accuracy information associated with each location zone and power mode information may include the external interface 1010, along with one or more processors 1002 with dedicated hardware or implementing executable code or software instructions in memory 1004 and/or medium 1020 such as the power mode receive module 1022 and database update module 1024.

In some implementations, the server may receive an RF environment for each location zone and store in the power mode database the RF environment associated with each location zone and power mode information, e.g., as discussed at block 816 of FIG. 8. The RF environment may comprise characteristics of received RF signals. A means for receiving an RF environment for each location zone and means for storing in the power mode database the RF environment associated with each location zone and power mode information may include the external interface 1010, along with one or more processors 1002 with dedicated hardware or implementing executable code or software instructions in memory 1004 and/or medium 1020 such as the power mode receive module 1022 and database update module 1024.

Figure 14:
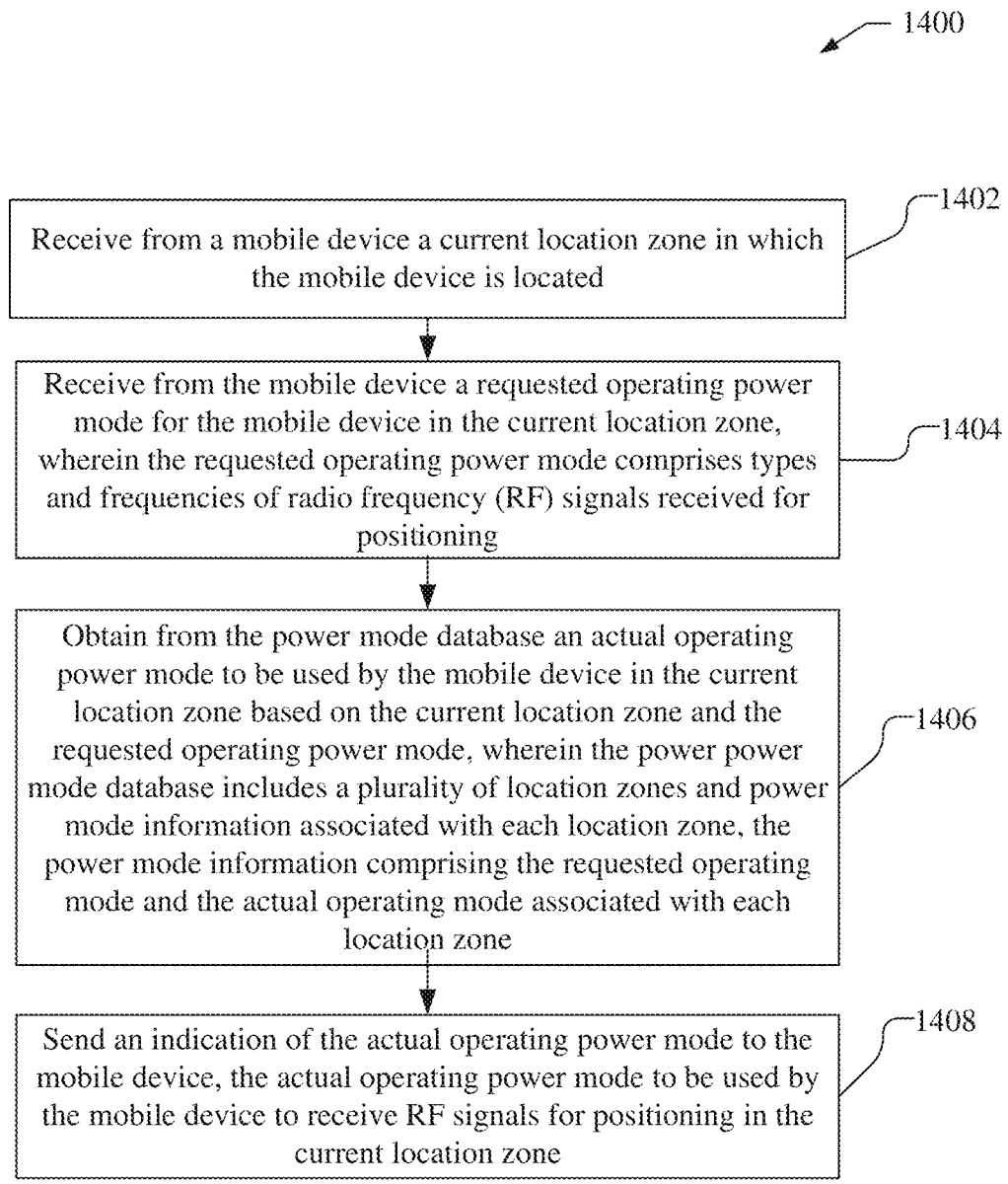
FIG. 14 is a flow chart illustrating a method performed by a server for using a power mode database for positioning.

FIG. 14 is a flow chart illustrating a process 1400 for using a power mode database for positioning, performed by a server, such as server 320 or 1000, as described herein.

At block 1402, the server may receive from a mobile device a current location zone in which the mobile device is located, e.g., as discussed at block 806 of FIG. 8. A means for receiving from a mobile device a current location zone in which the mobile device is located may include the external interface 1010, along with one or more processors 1002 with dedicated hardware or implementing executable code or software instructions in memory 1004 and/or medium 1020 such as the power mode receive module 1022.

At block 1404, the server may receive from the mobile device a requested operating power mode for the mobile device in the current location zone, wherein the requested operating power mode comprises types and frequencies of radio frequency (RF) signals received for positioning, e.g., as discussed at block 806 of FIG. 8. In one implementation, an operating power mode may comprise at least one of types and frequencies of RF signals received for positioning, positioning accuracy, power, time between fixes, or any combination thereof. A means for receiving from the mobile device a requested operating power mode for the mobile device in the current location zone, wherein the requested operating power mode comprises types and frequencies of radio frequency (RF) signals received for positioning may include the external interface 1010, along with one or more processors 1002 with dedicated hardware or implementing executable code or software instructions in memory 1004 and/or medium 1020 such as the power mode receive module 1022.

At block 1406, the server obtains from the power mode database an actual operating power mode to be used by the mobile device in the current location zone based on the current location zone and the requested operating power mode, wherein the power mode database includes a plurality of location zones and power mode information associated with each location zone, the power mode information comprising a requested operating mode and an actual operating mode associated with each location zone, e.g., as discussed at block 808 of FIG. 8. A means for obtaining from the power mode database an actual operating power mode to be used by the mobile device in the current location zone based on the current location zone and the requested operating power mode, wherein the power mode database includes a plurality of location zones and power mode information associated with each location zone, the power mode information comprising a requested operating mode and an actual operating mode associated with each location zone may include the one or more processors 1002 with dedicated hardware or implementing executable code or software instructions in memory 1004 and/or medium 1020 such as the database search module 1026.

At block 1408, the server sends to the mobile device an indication of the actual operating power mode to be used by the mobile device to receive RF signals for positioning in the current location zone, e.g., as discussed at block 808 of FIG. 8. A means for sending the actual operating power mode to the mobile device to receive RF signals for positioning in the current location zone may include the external interface 1010, along with one or more processors 1002 with dedicated hardware or implementing executable code or software instructions in memory 1004 and/or medium 1020 such as the power mode send module 1028.

In some implementations, the power mode database may be a crowdsourced database.

In some implementations, the server may receive from the mobile device at least one or more parameters comprising context information, accuracy information, RF environment or a combination thereof, and wherein obtaining from the power mode database the actual operating power mode to be used by the mobile device in the current location zone is further based on the one or more parameters, e.g., as discussed at block 806 of FIG. 8. A means for receiving from the mobile device at least one or more parameters comprising context information, accuracy information, RF environment or a combination thereof, and wherein obtaining from the power mode database the actual operating power mode to be used by the mobile device in the current location zone is further based on the one or more parameters may include the external interface 1010, along with one or more processors 1002 with dedicated hardware or implementing executable code or software instructions in memory 1004 and/or medium 1020 such as the power mode receive module 1022. The context information, for example, may include one or more of the following: user context comprising at least a class of motion of mobile device; environmental context comprising at least one or more of being indoors or outdoors, obstructed, or unobstructed RF signal reception, or a combination thereof; and temporal context comprising at least one of time of day, day of week, or a combination thereof. The accuracy information may comprise at least one of a requested positioning accuracy, an achieved positioning accuracy, an update rate, or a combination thereof. The RF environment may comprise characteristics of received RF signals. The actual operating power mode to be used in the current location zone further may be obtained from the power mode database, e.g., by determining likelihoods of operating power modes of achieving a desired operation performance for the current location zone based on the requested operating power mode and the one or more parameters from the power mode database, and selecting an operating power mode with a highest likelihood that is above a predetermined threshold as the actual operating power mode, e.g., as discussed at block 808 of FIG. 8. A means for determining likelihoods of operating power modes of achieving a desired operation performance for the current location zone based on the requested operating power mode and the one or more parameters from the power mode database may include the one or more processors 1002 with dedicated hardware or implementing executable code or software instructions in memory 1004 and/or medium 1020 such as the database search module 1026. A means for selecting an operating power mode with the highest likelihood that is above a predetermined threshold as the actual operating power mode may include the one or more processors 1002 with dedicated hardware or implementing executable code or software instructions in memory 1004 and/or medium 1020 such as the database search module 1026.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a mobile device for building a power mode database for positioning, the method comprising: determining one or more location zones in which the mobile device is located; determining power mode information for radio frequency (RF) reception that is associated with each location zone, the power mode information comprising a requested operating power mode and an actual operating power mode used in each location zone, wherein an operating power mode comprises types and frequencies of RF signals received for positioning; and storing each location zone and the power mode information associated with each location zone in the power mode database.

Clause 2. The method of clause 1, wherein the operating power mode further comprises at least one of positioning accuracy, power, time between fixes, or any combination thereof.

Clause 3. The method of any of clauses 1-2, further comprising determining additional power mode information associated with each location zone over time and updating the power mode information associated with each location zone that is stored in the power mode database.

Clause 4. The method of any of clauses 1-3, wherein the power mode database is stored on the mobile device.

Clause 5. The method of any of clauses 1-3, wherein the power mode database is stored remotely from the mobile device, and wherein storing each location zone and the power mode information associated with each location zone in the power mode database comprises sending each location zone and the power mode information associated with each location zone in the power mode database to a remote server that stores the each location zone and the power mode information associated with each location zone in the power mode database.

Clause 6. The method of clause 5, wherein the power mode database is a crowdsourced database.

Clause 7. The method of any of clauses 1-6, further comprising: obtaining the requested operating power mode in a location zone, the requested operating power mode comprising a requested type of RF signal, a requested frequencies of RF signal, a requested update rate, and a required operation performance; adjusting the operating power mode from the requested operating power mode during positioning; and monitoring operation performance during positioning at the location zone to determine the actual operating power mode at the location zone that achieves the required operation performance.

Clause 8. The method of any of clauses 1-7, further comprising determining context information for each location zone and storing in the power mode database context information associated with each location zone and the power mode information.

Clause 9. The method of clause 8, wherein the context information comprises one or more of the following: user context comprising at least a class of motion of mobile device; environmental context comprising at least one or more of being indoors or outdoors, obstructed, or unobstructed RF signal reception, or a combination thereof; temporal context comprising at least one of time of day, day of week, or a combination thereof.

Clause 10. The method of any of clauses 1-9, further comprising determining accuracy information for each location zone and storing in the power mode database the accuracy information associated with each location zone and the power mode information.

Clause 11. The method of clause 10, wherein the accuracy information comprises at least one of a requested positioning accuracy, an achieved positioning accuracy, an update rate, or a combination thereof.

Clause 12. The method of any of clauses 1-11, further comprising determining an RF environment for each location zone and storing in the power mode database the RF environment associated with each location zone and the power mode information.

Clause 13. The method of clause 12, wherein the RF environment comprises characteristics of received RF signals.

Clause 14. A mobile device configured for building a power mode database for positioning, the mobile device comprising: a wireless transceiver configured to wirelessly communicate with entities in a wireless network; at least one memory; and at least one processor coupled to the wireless transceiver and the at least one memory, wherein the at least one processor is configured to: determine one or more location zones in which the mobile device is located; determine power mode information for radio frequency (RF) reception that is associated with each location zone, the power mode information comprising a requested operating power mode and an actual operating power mode used in each location zone, wherein an operating power mode comprises types and frequencies of RF signals received for positioning; and store each location zone and the power mode information associated with each location zone in the power mode database.

Clause 15. The mobile device of clause 14, wherein the operating power mode further comprises at least one of positioning accuracy, power, time between fixes, or any combination thereof.

Clause 16. The mobile device of any of clauses 14-15, wherein the at least one processor is further configured to determine additional power mode information associated with each location zone over time and update the power mode information associated with each location zone that is stored in the power mode database.

Clause 17. The mobile device of any of clauses 14-16, wherein the power mode database is stored on the mobile device.

Clause 18. The mobile device of any of clauses 14-16, wherein the power mode database is stored remotely from the mobile device, and wherein the at least one processor is configured to store each location zone and the power mode information associated with each location zone in the power mode database by being configured to send, via the wireless transceiver, each location zone and the power mode information associated with each location zone in the power mode database to a remote server that stores the each location zone and the power mode information associated with each location zone in the power mode database.

Clause 19. The mobile device of clause 18, wherein the power mode database is a crowdsourced database.

Clause 20. The mobile device of any of clauses 14-19, wherein the at least one processor is further configured to: obtain the requested operating power mode in a location zone, the requested operating power mode comprising a requested type of RF signal, a requested frequencies of RF signal, a requested update rate, and a required operation performance; adjust the operating power mode from the requested operating power mode during positioning; and monitor operation performance during positioning at the location zone to determine the actual operating power mode at the location zone that achieves the required operation performance.

Clause 21. The mobile device of any of clauses 14-20, wherein the at least one processor is further configured to determine context information for each location zone and store in the power mode database context information associated with each location zone and the power mode information.

Clause 22. The mobile device of clause 21, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 23. The mobile device of any of clauses 14-22, wherein the at least one processor is further configured to determine accuracy information for each location zone and store in the power mode database the accuracy information associated with each location zone and the power mode information.

Clause 24. The mobile device of clause 23, wherein the accuracy information comprises at least one of a requested positioning accuracy, an achieved positioning accuracy, an update rate, or a combination thereof.

Clause 25. The mobile device of any of clauses 14-24, wherein the at least one processor is further configured to determine an RF environment for each location zone and store in the power mode database the RF environment associated with each location zone and the power mode information.

Clause 26. The mobile device of clause 25, wherein the RF environment comprises characteristics of received RF signals.

Clause 27. A mobile device configured for building a power mode database for positioning, the mobile device comprising: means for determining one or more location zones in which the mobile device is located; means for determining power mode information for radio frequency (RF) reception that is associated with each location zone, the power mode information comprising a requested operating power mode and an actual operating power mode used in each location zone, wherein an operating power mode comprises types and frequencies of RF signals received for positioning; and means for storing each location zone and the power mode information associated with each location zone in the power mode database.

Clause 28. The mobile device of clause 27, wherein the operating power mode further comprises at least one of positioning accuracy, power, time between fixes, or any combination thereof.

Clause 29. The mobile device of any of clauses 27-28, further comprising means for determining additional power mode information associated with each location zone over time and updating the power mode information associated with each location zone that is stored in the power mode database.

Clause 30. The mobile device of any of clauses 27-29, wherein the power mode database is stored on the mobile device.

Clause 31. The mobile device of any of clauses 27-29, wherein the power mode database is stored remotely from the mobile device, and wherein the means for storing each location zone and the power mode information associated with each location zone in the power mode database comprises means for sending each location zone and the power mode information associated with each location zone in the power mode database to a remote server that stores the each location zone and the power mode information associated with each location zone in the power mode database.

Clause 32. The mobile device of clause 31, wherein the power mode database is a crowdsourced database.

Clause 33. The mobile device of any of clauses 27-31, further comprising: means for obtaining the requested operating power mode in a location zone, the requested operating power mode comprising a requested type of RF signal, a requested frequencies of RF signal, a requested update rate, and a required operation performance; means for adjusting the operating power mode from the requested operating power mode during positioning; and means for monitoring operation performance during positioning at the location zone to determine the actual operating power mode at the location zone that achieves the required operation performance.

Clause 34. The mobile device of any of clauses 27-33, further comprising means for determining context information for each location zone and storing in the power mode database context information associated with each location zone and the power mode information.

Clause 35. The mobile device of clause 34, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 36. The mobile device of any of clauses 27-35, further comprising means for determining accuracy information for each location zone and storing in the power mode database the accuracy information associated with each location zone and the power mode information.

Clause 37. The mobile device of clause 36, wherein the accuracy information comprises at least one of a requested positioning accuracy, an achieved positioning accuracy, an update rate, or a combination thereof.

Clause 38. The mobile device of any of clauses 27-37, further comprising means for determining an RF environment for each location zone and storing in the power mode database the RF environment associated with each location zone and the power mode information.

Clause 39. The mobile device of clause 38, wherein the RF environment comprises characteristics of received RF signals.

Clause 40. A non-transitory storage medium including program code stored thereon, the program code is operable to configure at least one processor in a mobile device for building a power mode database for positioning, the program code comprising instructions to: determine one or more location zones in which the mobile device is located; determine power mode information for radio frequency (RF) reception that is associated with each location zone, the power mode information comprising a requested operating power mode and an actual operating power mode used in each location zone, wherein an operating power mode comprises types and frequencies of RF signals received for positioning; and store each location zone and the power mode information associated with each location zone in the power mode database.

Clause 41. The non-transitory storage medium of clause 40, wherein the operating power mode further comprises at least one of positioning accuracy, power, time between fixes, or any combination thereof.

Clause 42. The non-transitory storage medium of any of clauses 40-41, wherein the program code further include instructions to determine additional power mode information associated with each location zone over time and update the power mode information associated with each location zone that is stored in the power mode database.

Clause 43. The non-transitory storage medium of any of clauses 40-42, wherein the power mode database is stored on the mobile device.

Clause 44. The non-transitory storage medium of any of clauses 40-42, wherein the power mode database is stored remotely from the mobile device, and wherein the program code further include instructions to store each location zone and the power mode information associated with each location zone in the power mode database by being configured to send each location zone and the power mode information associated with each location zone in the power mode database to a remote server that stores the each location zone and the power mode information associated with each location zone in the power mode database.

Clause 45. The non-transitory storage medium of clause 44, wherein the power mode database is a crowd-sourced database.

Clause 46. The non-transitory storage medium of any of clauses 40-45, wherein the program code further include instructions to: obtain the requested operating power mode in a location zone, the requested operating power mode comprising a requested type of RF signal, a requested frequencies of RF signal, a requested update rate, and a required operation performance; adjust the operating power mode from the requested operating power mode during positioning; and monitor operation performance during positioning at the location zone to determine the actual operating power mode at the location zone that achieves the required operation performance.

Clause 47. The non-transitory storage medium of any of clauses 40-46, wherein the program code further include instructions to determine context information for each location zone and store in the power mode database context information associated with each location zone and the power mode information.

Clause 48. The non-transitory storage medium of clause 47, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 49. The non-transitory storage medium of any of clauses 40-48, wherein the program code further include instructions to determine accuracy information for each location zone and store in the power mode database the accuracy information associated with each location zone and the power mode information.

Clause 50. The non-transitory storage medium of clause 49, wherein the accuracy information comprises at least one of a requested positioning accuracy, an achieved positioning accuracy, an update rate, or a combination thereof.

Clause 51. The non-transitory storage medium of any of clauses 40-49, wherein the program code further include instructions to determine an RF environment for each location zone and store in the power mode database the RF environment associated with each location zone and the power mode information.

Clause 52. The non-transitory storage medium of clause 51, wherein the RF environment comprises characteristics of received RF signals.

Clause 53. A method performed by a mobile device for using a power mode database for positioning, the method comprising: determining a current location zone in which the mobile device is located; obtaining from the power mode database an actual operating power mode to be used in the current location zone based on the current location zone and a requested operating power mode, wherein the power mode database includes a plurality of location zones and power mode information associated with each location zone, the power mode information comprising the requested operating power mode and the actual operating power mode associated with each location zone; and applying the actual operating power mode to receive radio frequency (RF) signals for positioning in the current location zone.

Clause 54. The method of clause 53, wherein an operating power mode comprises at least one of types and frequencies of RF signals received for positioning, positioning accuracy, power, time between fixes, or any combination thereof.

Clause 55. The method of any of clauses 53-54, wherein the power mode database is stored on the mobile device.

Clause 56. The method of any of clauses 53-54, wherein the power mode database is stored remotely from the mobile device, and wherein obtaining from the power mode database the actual operating power mode comprises: sending to a server an indication of the current location zone and the requested operating power mode; and receiving from the server an indication of the actual operating power mode to be used in the current location zone based on the indication on the current location zone and the requested operating power mode.

Clause 57. The method of clause 56, wherein the power mode database is a crowdsourced database.

Clause 58. The method of any of clauses 53-57, further comprising determining at least one or more parameters comprising context information, accuracy information, RF environment or a combination thereof, and wherein obtaining from the power mode database the actual operating power mode to be used in the current location zone is further based on the one or more parameters.

Clause 59. The method of clause 58, wherein obtaining from the power mode database the actual operating power mode to be used in the current location zone further comprises: determining likelihoods of operating power modes of achieving a desired operation performance for the current location zone based on the requested operating power mode and the one or more parameters from the power mode database; and selecting an operating power mode with a highest likelihood that is above a predetermined threshold as the actual operating power mode.

Clause 60. The method of any of clauses 58-59, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 61. The method of any of clauses 58-60, wherein the accuracy information comprises at least one of a requested positioning accuracy, an achieved positioning accuracy, an update rate, or a combination thereof.

Clause 62. The method of any of clauses 58-61, wherein the RF environment comprises characteristics of received RF signals.

Clause 63. A mobile device configured for using a power mode database for positioning, the mobile device comprising: a wireless transceiver configured to wirelessly communicate with entities in a wireless network; at least one memory; and at least one processor coupled to the wireless transceiver and the at least one memory, wherein the at least one processor is configured to: determine a current location zone in which the mobile device is located; obtain from the power mode database an actual operating power mode to be used in the current location zone based on the current location zone and a requested operating power mode, wherein the power mode database includes a plurality of location zones and power mode information associated with each location zone, the power mode information comprising the requested operating power mode and the actual operating power mode associated with each location zone; and apply the actual operating power mode to receive radio frequency (RF) signals for positioning in the current location zone.

Clause 64. The mobile device of clause 63, wherein an operating power mode comprises at least one of types and frequencies of RF signals received for positioning, positioning accuracy, power, time between fixes, or any combination thereof.

Clause 65. The mobile device of any of clauses 63-64, wherein the power mode database is stored on the mobile device.

Clause 66. The mobile device of any of clauses 63-64, wherein the power mode database is stored remotely from the mobile device, and wherein the at least one processor is configured to obtain from the power mode database the actual operating power mode by being configured to: send, via the wireless transceiver, to a server an indication of the current location zone and the requested operating power mode; and receive, via the wireless transceiver, from the server an indication of the actual operating power mode to be used in the current location zone based on the indication on the current location zone and the requested operating power mode.

Clause 67. The mobile device of clause 66, wherein the power mode database is a crowdsourced database.

Clause 68. The mobile device of any of clauses 63-67, wherein the at least one processor is further configured to determine at least one or more parameters comprising context information, accuracy information, RF environment or a combination thereof, and wherein obtaining from the power mode database the actual operating power mode to be used in the current location zone is further based on the one or more parameters.

Clause 69. The mobile device of clause 68, wherein the at least one processor is configured to obtain from the power mode database the actual operating power mode to be used in the current location zone by being configured to: determine likelihoods of operating power modes of achieving a desired operation performance for the current location zone based on the requested operating power mode and the one or more parameters from the power mode database; and select an operating power mode with a highest likelihood that is above a predetermined threshold as the actual operating power mode.

Clause 70. The mobile device of any of clauses 68-69, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 71. The mobile device of any of clauses 68-70, wherein the accuracy information comprises at least one of a requested positioning accuracy, an achieved positioning accuracy, an update rate, or a combination thereof.

Clause 72. The mobile device of any of clauses 68-71, wherein the RF environment comprises characteristics of received RF signals.

Clause 73. A mobile device configured for using a power mode database for positioning, the mobile device comprising: means for determining a current location zone in which the mobile device is located; means for obtaining from the power mode database an actual operating power mode to be used in the current location zone based on the current location zone and a requested operating power mode, wherein the power mode database includes a plurality of location zones and power mode information associated with each location zone, the power mode information comprising the requested operating power mode and the actual operating power mode associated with each location zone; and means for applying the actual operating power mode to receive RF signals for positioning in the current location zone.

Clause 74. The mobile device of clause 73, wherein an operating power mode comprises at least one of types and frequencies of RF signals received for positioning, positioning accuracy, power, time between fixes, or any combination thereof.

Clause 75. The mobile device of any of clauses 73-74, wherein the power mode database is stored on the mobile device.

Clause 76. The mobile device of any of clauses 73-74, wherein the power mode database is stored remotely from the mobile device, and wherein the means for obtaining from the power mode database the actual operating power mode comprises: means for sending to a server an indication of the current location zone and the requested operating power mode; and means for receiving from the server an indication of the actual operating power mode to be used in the current location zone based on the indication on the current location zone and the requested operating power mode.

Clause 77. The mobile device of clause 76, wherein the power mode database is a crowdsourced database.

Clause 78. The mobile device of any of clauses 73-76, further comprising means for determining at least one or more parameters comprising context information, accuracy information, RF environment or a combination thereof, and wherein the means for obtaining from the power mode database the actual operating power mode to be used in the current location zone further uses the one or more parameters.

Clause 79. The mobile device of clause 78, wherein the means for obtaining from the power mode database the actual operating power mode to be used in the current location zone further comprises: means for determining likelihoods of operating power modes of achieving a desired operation performance for the current location zone based on the requested operating power mode and the one or more parameters from the power mode database; and means for selecting an operating power mode with a highest likelihood that is above a predetermined threshold as the actual operating power mode.

Clause 80. The mobile device of any of clauses 78-79, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 81. The mobile device of any of clauses 78-80, wherein the accuracy information comprises at least one of a requested positioning accuracy, an achieved positioning accuracy, an update rate, or a combination thereof.

Clause 82. The mobile device of any of clauses 78-81, wherein the RF environment comprises characteristics of received RF signals.

Clause 83. A non-transitory storage medium including program code stored thereon, the program code is operable to configure at least one processor in a mobile device for using a power mode database for positioning, the program code comprising instructions to: determine a current location zone in which the mobile device is located; obtain from the power mode database an actual operating power mode to be used in the current location zone based on the current location zone and a requested operating power mode, wherein the power mode database includes a plurality of location zones and power mode information associated with each location zone, the power mode information comprising the requested operating power mode and the actual operating power mode associated with each location zone; and apply the actual operating power mode to receive RF signals for positioning in the current location zone.

Clause 84. The non-transitory storage medium of clause 83, wherein an operating power mode comprises at least one of positioning accuracy, power, time between fixes, or any combination thereof.

Clause 85. The non-transitory storage medium of any of clauses 83-84, wherein the power mode database is stored on the mobile device.

Clause 86. The non-transitory storage medium of any of clauses 83-85, wherein the power mode database is stored remotely from the mobile device, and wherein the instructions to obtain from the power mode database the actual operating power mode further comprise instructions to: send to a server an indication of the current location zone and the requested operating power mode; and receive from the server an indication of the actual operating power mode to be used in the current location zone based on the indication on the current location zone and the requested operating power mode.

Clause 87. The non-transitory storage medium of clause 86, wherein the power mode database is a crowdsourced database.

Clause 88. The non-transitory storage medium of any of clauses 83-86, wherein the program code further comprises instructions to determine at least one or more parameters comprising context information, accuracy information, RF environment or a combination thereof, and wherein obtaining from the power mode database the actual operating power mode to be used in the current location zone is further based on the one or more parameters.

Clause 89. The non-transitory storage medium of clause 88, wherein the instructions to obtain from the power mode database the actual operating power mode to be used in the current location zone further comprises instructions to: determine likelihoods of operating power modes of achieving a desired operation performance for the current location zone based on the requested operating power mode and the one or more parameters from the power mode database; and select an operating power mode with a highest likelihood that is above a predetermined threshold as the actual operating power mode.

Clause 90. The non-transitory storage medium of any of clauses 88-89, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 91. The non-transitory storage medium of any of clauses 88-90, wherein the accuracy information comprises at least one of a requested positioning accuracy, an achieved positioning accuracy, an update rate, or a combination thereof.

Clause 92. The non-transitory storage medium of any of clauses 88-91, wherein the RF environment comprises characteristics of received RF signals.

Clause 93. A method performed by a server for building a power mode database for positioning, comprising: receiving, from at least one mobile device, location zones in which each of the at least one mobile device is located and power mode information for radio frequency (RF) reception that is associated with each location zone, the power mode information comprising a requested operating power mode and an actual operating power mode used in each location zone, wherein an operating power mode comprises types and frequencies of RF signals received for positioning; and storing each location zone and the power mode information associated with each location zone in the power mode database.

Clause 94. The method of clause 93, wherein the operating power mode further comprises at least one of positioning accuracy, power, time between fixes, or any combination thereof.

Clause 95. The method of any of clauses 93-94, further comprising receiving additional power mode information associated with each location zone over time and updating the power mode information associated with each location zone that is stored in the power mode database.

Clause 96. The method of any of clauses 93-95, wherein the power mode database is a crowdsourced database and wherein location zones and associated power mode information are received from a plurality of mobile devices.

Clause 97. The method of any of clauses 93-96, further comprising receiving context information for each location zone and storing in the power mode database context information associated with each location zone and the power mode information.

Clause 98. The method of clause 97, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 99. The method of any of clauses 93-98, further comprising receiving accuracy information for each location zone and storing in the power mode database the accuracy information associated with each location zone and the power mode information.

Clause 100. The method of clause 99, wherein the accuracy information comprises at least one of a requested positioning accuracy, an achieved positioning accuracy, an update rate, or a combination thereof.

Clause 101. The method of any of clauses 93-100, further comprising receiving an RF environment for each location zone and storing in the power mode database the RF environment associated with each location zone and the power mode information.

Clause 102. The method of clause 101, wherein the RF environment comprises characteristics of received RF signals.

Clause 103. A server configured for building a power mode database for positioning, the server comprising: an external interface configured to communicate with entities in a wireless network; at least one memory; and at least one processor coupled to the external interface and the at least one memory, wherein the at least one processor is configured to: receive, from at least one mobile device, via the external interface, location zones in which each of the at least one mobile device is located and power mode information for radio frequency (RF) reception that is associated with each location zone, the power mode information comprising a requested operating power mode and an actual operating power mode used in each location zone, wherein an operating power mode comprises types and frequencies of RF signals received for positioning; and store each location zone and the power mode information associated with each location zone in the power mode database.

Clause 104. The server of clause 103, wherein the operating power mode further comprises at least one of positioning accuracy, power, time between fixes, or any combination thereof.

Clause 105. The server of any of clauses 103-104, wherein the at least one processor is further configured to receive, via the external interface, additional power mode information associated with each location zone over time and updating the power mode information associated with each location zone that is stored in the power mode database.

Clause 106. The server of any of clauses 103-105, wherein the power mode database is a crowdsourced database and wherein location zones and associated power mode information are received from a plurality of mobile devices.

Clause 107. The server of any of clauses 103-106, wherein the at least one processor is further configured to receive, via the external interface, context information for each location zone and store in the power mode database context information associated with each location zone and the power mode information.

Clause 108. The server of clause 107, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 109. The server of any of clauses 103-108, wherein the at least one processor is further configured to receive, via the external interface, accuracy information for each location zone and store in the power mode database the accuracy information associated with each location zone and the power mode information.

Clause 110. The server of clause 109, wherein the accuracy information comprises at least one of a requested positioning accuracy, an achieved positioning accuracy, an update rate, or a combination thereof.

Clause 111. The server of any of clauses 103-110, wherein the at least one processor is further configured to receive, via the external interface, an RF environment for each location zone and store in the power mode database the RF environment associated with each location zone and the power mode information.

Clause 112. The server of clause 111, wherein the RF environment comprises characteristics of received RF signals.

Clause 113. A server configured for building a power mode database for positioning, comprising: means for receiving, from at least one mobile device, location zones in which each of the at least one mobile device is located and power mode information for radio frequency (RF) reception that is associated with each location zone, the power mode information comprising a requested operating power mode and an actual operating power mode used in each location zone, wherein an operating power mode comprises types and frequencies of RF signals received for positioning; and means for storing each location zone and the power mode information associated with each location zone in the power mode database.

Clause 114. The server of clause 113, wherein the operating power mode further comprises at least one of positioning accuracy, power, time between fixes, or any combination thereof.

Clause 115. The server of any of clauses 113-114, further comprising means for receiving additional power mode information associated with each location zone over time and updating the power mode information associated with each location zone that is stored in the power mode database.

Clause 116. The server of any of clauses 113-115, wherein the power mode database is a crowdsourced database and wherein location zones and associated power mode information are received from a plurality of mobile devices.

Clause 117. The server of any of clauses 113-116, further comprising means for receiving context information for each location zone and storing in the power mode database context information associated with each location zone and the power mode information.

Clause 118. The server of clause 117, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 119. The server of any of clauses 113-118, further comprising means for receiving accuracy information for each location zone and storing in the power mode database the accuracy information associated with each location zone and the power mode information.

Clause 120. The server of clause 119, wherein the accuracy information comprises at least one of a requested positioning accuracy, an achieved positioning accuracy, an update rate, or a combination thereof.

Clause 121. The server of any of clauses 113-120, further comprising means for receiving an RF environment for each location zone and storing in the power mode database the RF environment associated with each location zone and the power mode information.

Clause 122. The server of clause 121, wherein the RF environment comprises characteristics of received RF signals.

Clause 123. A non-transitory storage medium including program code stored thereon, the program code is operable to configure at least one processor in a server for building a power mode database for positioning, the program code comprising instructions to: receive, from at least one mobile device, location zones in which each of the at least one mobile device is located and power mode information for radio frequency (RF) reception that is associated with each location zone, the power mode information comprising a requested operating power mode and an actual operating power mode used in each location zone, wherein an operating power mode comprises types and frequencies of RF signals received for positioning; and store each location zone and the power mode information associated with each location zone in the power mode database.

Clause 124. The non-transitory storage medium of clause 123, wherein the operating power mode further comprises at least one of positioning accuracy, power, time between fixes, or any combination thereof.

Clause 125. The non-transitory storage medium of any of clauses 123-124, wherein the program code further includes instructions to receive additional power mode information associated with each location zone over time and updating the power mode information associated with each location zone that is stored in the power mode database.

Clause 126. The non-transitory storage medium of any of clauses 123-125, wherein the power mode database is a crowdsourced database and wherein location zones and associated power mode information are received from a plurality of mobile devices.

Clause 127. The non-transitory storage medium of any of clauses 123-126, wherein the program code further includes instructions to receive context information for each location zone and store in the power mode database context information associated with each location zone and the power mode information.

Clause 128. The non-transitory storage medium of clause 127, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 129. The non-transitory storage medium of any of clauses 123-128, wherein the program code further includes instructions to receive accuracy information for each location zone and store in the power mode database the accuracy information associated with each location zone and the power mode information.

Clause 130. The non-transitory storage medium of clause 129, wherein the accuracy information comprises at least one of a requested positioning accuracy, an achieved positioning accuracy, an update rate, or a combination thereof.

Clause 131. The non-transitory storage medium of any of clauses 123-129, wherein the program code further includes instructions to receive an RF environment for each location zone and store in the power mode database the RF environment associated with each location zone and the power mode information.

Clause 132. The non-transitory storage medium of clause 131, wherein the RF environment comprises characteristics of received RF signals.

Clause 133. A method performed by a server for using a power mode database for positioning, comprising: receiving from a mobile device a current location zone in which the mobile device is located; receiving from the mobile device a requested operating power mode for the mobile device in the current location zone, wherein the requested operating power mode comprises types and frequencies of radio frequency (RF) signals received for positioning; obtaining from the power mode database an actual operating power mode to be used by the mobile device in the current location zone based on the current location zone and the requested operating power mode, wherein the power mode database includes a plurality of location zones and power mode information associated with each location zone, the power mode information comprising the requested operating mode and the actual operating mode associated with each location zone; and sending an indication of the actual operating power mode to the mobile device, the actual operating power mode to be used by the mobile device to receive RF signals for positioning in the current location zone.

Clause 134. The method of clause 133, wherein an operating power mode comprises at least one of types and frequencies of RF signals received for positioning, positioning accuracy, power, time between fixes, or any combination thereof.

Clause 135. The method of any of clauses 133-134, wherein the power mode database is a crowdsourced database.

Clause 136. The method of any of clauses 133-125, further comprising receiving from the mobile device at least one or more parameters comprising context information, accuracy information, RF environment or a combination thereof, and wherein obtaining from the power mode database the actual operating power mode to be used by the mobile device in the current location zone is further based on the one or more parameters.

Clause 137. The method of clause 136, wherein obtaining from the power mode database the actual operating power mode to be used by the mobile device in the current location zone further comprises: determining likelihoods of operating power modes of achieving a desired operation performance for the current location zone based on the requested operating power mode and the one or more parameters from the power mode database; and selecting an operating power mode with a highest likelihood that is above a predetermined threshold as the actual operating power mode.

Clause 138. The method of any of clauses 136-137, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 139. The method of any of clauses 136-138, wherein the accuracy information comprises at least one of a requested positioning accuracy, an achieved positioning accuracy, an update rate, or a combination thereof.

Clause 140. The method of any of clauses 136-139, wherein the RF environment comprises characteristics of received RF signals.

Clause 141. A server configured for using a power mode database for positioning, the server comprising: an external interface configured to communicate with entities in a wireless network; at least one memory; and at least one processor coupled to the external interface and the at least one memory, wherein the at least one processor is configured to: receive, via the external interface, from a mobile device a current location zone in which the mobile device is located; receive, via the external interface, from the mobile device a requested operating power mode for the mobile device in the current location zone, wherein the requested operating power mode comprises types and frequencies of radio frequency (RF) signals received for positioning; obtain from the power mode database an actual operating power mode to be used by the mobile device in the current location zone based on the current location zone and the requested operating power mode, wherein the power mode database includes a plurality of location zones and power mode information associated with each location zone, the power mode information comprising the requested operating mode and the actual operating mode associated with each location zone; and send, via the external interface, an indication of the actual operating power mode to the mobile device, the actual operating power mode to be used by the mobile device to receive RF signals for positioning in the current location zone.

Clause 142. The server of clause 141, wherein an operating power mode comprises at least one of types and frequencies of RF signals received for positioning, positioning accuracy, power, time between fixes, or any combination thereof.

Clause 143. The server of any of clauses 141-142, wherein the power mode database is a crowdsourced database.

Clause 144. The server of any of clauses 1411-143, wherein the at least one processor is further configured to receive, via the external interface, from the mobile device at least one or more parameters comprising context information, accuracy information, RF environment or a combination thereof, and wherein the at least one processor is configured to obtain from the power mode database the actual operating power mode to be used by the mobile device in the current location zone based on the one or more parameters.

Clause 145. The server of clause 144, wherein the at least one processor is configured to obtain from the power mode database the actual operating power mode to be used by the mobile device in the current location zone further by being configured to: determine likelihoods of operating power modes of achieving a desired operation performance for the current location zone based on the requested operating power mode and the one or more parameters from the power mode database; and select an operating power mode with a highest likelihood that is above a predetermined threshold as the actual operating power mode.

Clause 146. The server of any of clauses 144-145, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 147. The server of any of clauses 144-146, wherein the accuracy information comprises at least one of a requested positioning accuracy, an achieved positioning accuracy, an update rate, or a combination thereof.

Clause 148. The server of any of clauses 144-147, wherein the RF environment comprises characteristics of received RF signals.

Clause 149. A server configured for using a power mode database for positioning, comprising: means for receiving from a mobile device a current location zone in which the mobile device is located; means for receiving from the mobile device a requested operating power mode for the mobile device in the current location zone, wherein the requested operating power mode comprises types and frequencies of radio frequency (RF) signals received for positioning; means for obtaining from the power mode database an actual operating power mode to be used by the mobile device in the current location zone based on the current location zone and the requested operating power mode, wherein the power mode database includes a plurality of location zones and power mode information associated with each location zone, the power mode information comprising the requested operating mode and the actual operating mode associated with each location zone; and means for sending an indication of the actual operating power mode to the mobile device, the actual operating power mode to be used by the mobile device to receive RF signals for positioning in the current location zone.

Clause 150. The server of clause 149, wherein an operating power mode comprises at least one of types and frequencies of RF signals received for positioning, positioning accuracy, power, time between fixes, or any combination thereof.

Clause 151. The server of any of clauses 149-150, wherein the power mode database is a crowdsourced database.

Clause 152. The server of any of clauses 149-151, further comprising means for receiving from the mobile device at least one or more parameters comprising context information, accuracy information, RF environment or a combination thereof, and wherein the means for obtaining from the power mode database the actual operating power mode to be used by the mobile device in the current location zone uses the one or more parameters.

Clause 153. The server of clause 152, wherein the means for obtaining from the power mode database the actual operating power mode to be used by the mobile device in the current location zone further comprises: means for determining likelihoods of operating power modes of achieving a desired operation performance for the current location zone based on the requested operating power mode and the one or more parameters from the power mode database; and means for selecting an operating power mode with a highest likelihood that is above a predetermined threshold as the actual operating power mode.

Clause 154. The server of any of clauses 152-153, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 155. The server of any of clauses 152-154, wherein the accuracy information comprises at least one of a requested positioning accuracy, an achieved positioning accuracy, an update rate, or a combination thereof.

Clause 156. The server of any of clauses 152-155, wherein the RF environment comprises characteristics of received RF signals.

Clause 157. A non-transitory storage medium including program code stored thereon, the program code is operable to configure at least one processor in a server for using a power mode database for positioning, the program code comprising instructions to: receive from a mobile device a current location zone in which the mobile device is located; receive from the mobile device a requested operating power mode for the mobile device in the current location zone, wherein the requested operating power mode comprises types and frequencies of radio frequency (RF) signals received for positioning; obtain from the power mode database an actual operating power mode to be used by the mobile device in the current location zone based on the current location zone and the requested operating power mode, wherein the power mode database includes a plurality of location zones and power mode information associated with each location zone, the power mode information comprising the requested operating mode and the actual operating mode associated with each location zone; and send an indication of the actual operating power mode to the mobile device, the actual operating power mode to be used by the mobile device to receive RF signals for positioning in the current location zone.

Clause 158. The non-transitory storage medium of clause 157, wherein an operating power mode comprises at least one of types and frequencies of RF signals received for positioning, positioning accuracy, power, time between fixes, or any combination thereof.

Clause 159. The non-transitory storage medium of any of clauses 157-158, wherein the power mode database is a crowdsourced database.

Clause 160. The non-transitory storage medium of any of clauses 157-159, wherein the program code further comprises instructions to receive from the mobile device at least one or more parameters comprising context information, accuracy information, RF environment or a combination thereof, and wherein the instructions to obtain from the power mode database the actual operating power mode to be used by the mobile device in the current location zone uses the one or more parameters.

Clause 161. The non-transitory storage medium of clause 160, wherein the instructions to obtain from the power mode database the actual operating power mode to be used by the mobile device in the current location zone further includes instructions to: determine likelihoods of operating power modes of achieving a desired operation performance for the current location zone based on the requested operating power mode and the one or more parameters from the power mode database; and select an operating power mode with a highest likelihood that is above a predetermined threshold as the actual operating power mode.

Clause 162. The non-transitory storage medium of any of clauses 160-161, wherein the context information comprises one or more of the following: user context comprising at least a class of motion of mobile device; environmental context comprising at least one or more of being indoors or outdoors, obstructed or unobstructed RF signal reception, or a combination thereof; temporal context comprising at least one of time of day, day of week, or a combination thereof.

Clause 163. The non-transitory storage medium of any of clauses 160-162, wherein the accuracy information comprises at least one of a requested positioning accuracy, an achieved positioning accuracy, an update rate, or a combination thereof.

Clause 164. The non-transitory storage medium of any of clauses 160-163, wherein the RF environment comprises characteristics of received RF signals.

Therefore, it is intended that claimed subject matter not be limited to the particular examples disclosed, but that such claimed subject matter may also include all aspects falling within the scope of appended claims, and equivalents thereof.

What is claimed is:

1. A method performed by a mobile device for building a power mode database for positioning, the method comprising:
   determining one or more location zones in which the mobile device is located;
   determining power mode information for radio frequency (RF) reception that is associated with each location zone, the power mode information comprising a requested operating power mode and an actual operating power mode used in each location zone, wherein the power mode information comprises types and frequencies of RF signals received for positioning; and
   storing each location zone and the power mode information associated with each location zone in the power mode database.

2. The method of claim 1, wherein the operating power mode further comprises at least one of positioning accuracy, power, time between fixes, or any combination thereof.

3. The method of claim 1, further comprising determining additional power mode information associated with each location zone over time and updating the power mode information associated with each location zone that is stored in the power mode database.

4. The method of claim 1, wherein the power mode database is stored on the mobile device.

5. The method of claim 1, wherein the power mode database is stored remotely from the mobile device, and wherein storing each location zone and the power mode information associated with each location zone in the power mode database comprises sending each location zone and the power mode information associated with each location zone in the power mode database to a remote server that stores the each location zone and the power mode information associated with each location zone in the power mode database.

6. The method of claim 5, wherein the power mode database is a crowdsourced database.

7. The method of claim 1, further comprising:
   obtaining the requested operating power mode in a location zone, the requested operating power mode comprising a requested type of RF signal, a requested frequencies of RF signal, a requested update rate, and a required operation performance;
   adjusting the operating power mode from the requested operating power mode during positioning; and
   monitoring operation performance during positioning at the location zone to determine the actual operating power mode at the location zone that achieves the required operation performance.

8. The method of claim 1, further comprising determining context information for each location zone and storing in the power mode database context information associated with each location zone and the power mode information.

9. The method of claim 8, wherein the context information comprises one or more of the following:
   user context comprising at least a class of motion of mobile device;
   environmental context comprising at least one or more of being indoors or outdoors, obstructed, or unobstructed RF signal reception, or a combination thereof;
   temporal context comprising at least one of time of day, day of week, or a combination thereof.

10. The method of claim 1, further comprising determining accuracy information for each location zone and storing in the power mode database the accuracy information associated with each location zone and the power mode information.

11. The method of claim 10, wherein the accuracy information comprises at least one of a requested positioning accuracy, an achieved positioning accuracy, an update rate, or a combination thereof.

12. The method of claim 1, further comprising determining an RF environment for each location zone and storing in the power mode database the RF environment associated with each location zone and the power mode information.

13. The method of claim 12, wherein the RF environment comprises characteristics of received RF signals.

14. A mobile device configured for building a power mode database for positioning, the mobile device comprising:
   a wireless transceiver configured to wirelessly communicate with entities in a wireless network;
   at least one memory; and
   at least one processor coupled to the wireless transceiver and the at least one memory, wherein the at least one processor is configured to:
   determine one or more location zones in which the mobile device is located;
   determine power mode information for radio frequency (RF) reception that is associated with each location zone, the power mode information comprising a requested operating power mode and an actual operating power mode used in each location zone, wherein the power mode information comprises types and frequencies of RF signals received for positioning; and
   store each location zone and the power mode information associated with each location zone in the power mode database.

15. The mobile device of claim 14, wherein the operating power mode further comprises at least one of positioning accuracy, power, time between fixes, or any combination thereof.

16. The mobile device of claim 14, wherein the at least one processor is further configured to determine additional power mode information associated with each location zone over time and update the power mode information associated with each location zone that is stored in the power mode database.

17. The mobile device of claim 14, wherein the power mode database is stored on the mobile device.

18. The mobile device of claim 14, wherein the power mode database is stored remotely from the mobile device, and wherein the at least one processor is configured to store each location zone and the power mode information associated with each location zone in the power mode database by being configured to send, via the wireless transceiver, each location zone and the power mode information associated with each location zone in the power mode database to a remote server that stores the each location zone and the power mode information associated with each location zone in the power mode database.

19. The mobile device of claim 18, wherein the power mode database is a crowdsourced database.

20. The mobile device of claim 14, wherein the at least one processor is further configured to:
obtain the requested operating power mode in a location zone, the requested operating power mode comprising a requested type of RF signal, a requested frequencies of RF signal, a requested update rate, and a required operation performance;
adjust the operating power mode from the requested operating power mode during positioning; and
monitor operation performance during positioning at the location zone to determine the actual operating power mode at the location zone that achieves the required operation performance.

21. The mobile device of claim 14, wherein the at least one processor is further configured to determine context information for each location zone and store in the power mode database context information associated with each location zone and the power mode information.

22. The mobile device of claim 21, wherein the context information comprises one or more of the following:
user context comprising at least a class of motion of mobile device;
environmental context comprising at least one or more of being indoors or outdoors, obstructed or unobstructed RF signal reception, or a combination thereof;
temporal context comprising at least one of time of day, day of week, or a combination thereof.

23. The mobile device of claim 14, wherein the at least one processor is further configured to determine accuracy information for each location zone and store in the power mode database the accuracy information associated with each location zone and the power mode information.

24. The mobile device of claim 23, wherein the accuracy information comprises at least one of a requested positioning accuracy, an achieved positioning accuracy, an update rate, or a combination thereof.

25. The mobile device of claim 14, wherein the at least one processor is further configured to determine an RF environment for each location zone and store in the power mode database the RF environment associated with each location zone and the power mode information.

26. The mobile device of claim 25, wherein the RF environment comprises characteristics of received RF signals.

27. A method performed by a mobile device for using a power mode database for positioning, the method comprising:
determining a current location zone in which the mobile device is located;
obtaining from the power mode database an actual operating power mode to be used in the current location zone based on the current location zone and a requested operating power mode, wherein the power mode database includes a plurality of location zones and power mode information associated with each location zone, the power mode information comprising the requested operating power mode and the actual operating power mode associated with each location zone; and
applying the actual operating power mode to receive radio frequency (RF) signals for positioning in the current location zone.

28. The method of claim 27, wherein an operating power mode comprises at least one of types and frequencies of RF signals received for positioning, positioning accuracy, power, time between fixes, or any combination thereof.

29. The method of claim 27, wherein the power mode database is stored on the mobile device.

30. The method of claim 27, wherein the power mode database is stored remotely from the mobile device, and wherein obtaining from the power mode database the actual operating power mode comprises:
sending to a server an indication of the current location zone and the requested operating power mode; and
receiving from the server an indication of the actual operating power mode to be used in the current location zone based on the indication on the current location zone and the requested operating power mode.

31. The method of claim 30, wherein the power mode database is a crowdsourced database.

32. The method of claim 27, further comprising determining at least one or more parameters comprising context information, accuracy information, RF environment or a combination thereof, and wherein obtaining from the power mode database the actual operating power mode to be used in the current location zone is further based on the one or more parameters.

33. The method of claim 32, wherein obtaining from the power mode database the actual operating power mode to be used in the current location zone further comprises:
determining likelihoods of operating power modes of achieving a desired operation performance for the current location zone based on the requested operating power mode and the one or more parameters from the power mode database; and
selecting an operating power mode with a highest likelihood that is above a predetermined threshold as the actual operating power mode.

34. The method of claim 32, wherein the context information comprises one or more of the following:
user context comprising at least a class of motion of mobile device;
environmental context comprising at least one or more of being indoors or outdoors, obstructed or unobstructed RF signal reception, or a combination thereof;
temporal context comprising at least one of time of day, day of week, or a combination thereof.

35. The method of claim 32, wherein the accuracy information comprises at least one of a requested positioning accuracy, an achieved positioning accuracy, an update rate, or a combination thereof.

36. The method of claim 32, wherein the RF environment comprises characteristics of received RF signals.

37. A mobile device configured for using a power mode database for positioning, the mobile device comprising:
a wireless transceiver configured to wirelessly communicate with entities in a wireless network;
at least one memory; and
at least one processor coupled to the wireless transceiver and the at least one memory, wherein the at least one processor is configured to:

determine a current location zone in which the mobile device is located;

obtain from the power mode database an actual operating power mode to be used in the current location zone based on the current location zone and a requested operating power mode, wherein the power mode database includes a plurality of location zones and power mode information associated with each location zone, the power mode information comprising the requested operating power mode and the actual operating power mode associated with each location zone; and apply the actual operating power mode to receive radio frequency (RF) signals for positioning in the current location zone.

38. The mobile device of claim 37, wherein an operating power mode comprises at least one of types and frequencies of RF signals received for positioning, positioning accuracy, power, time between fixes, or any combination thereof.

39. The mobile device of claim 37, wherein the power mode database is stored on the mobile device.

40. The mobile device of claim 37, wherein the power mode database is stored remotely from the mobile device, and wherein the at least one processor is configured to obtain from the power mode database the actual operating power mode by being configured to:

send, via the wireless transceiver, to a server an indication of the current location zone and the requested operating power mode; and receive, via the wireless transceiver, from the server an indication of the actual operating power mode to be used in the current location zone based on the indication on the current location zone and the requested operating power mode.

41. The mobile device of claim 40, wherein the power mode database is a crowdsourced database.

42. The mobile device of claim 37, wherein the at least one processor is further configured to determine at least one or more parameters comprising context information, accuracy information, RF environment or a combination thereof, and wherein obtaining from the power mode database the actual operating power mode to be used in the current location zone is further based on the one or more parameters.

43. The mobile device of claim 42, wherein the at least one processor is configured to obtain from the power mode database the actual operating power mode to be used in the current location zone by being configured to:

determine likelihoods of operating power modes of achieving a desired operation performance for the current location zone based on the requested operating power mode and the one or more parameters from the power mode database; and select an operating power mode with a highest likelihood that is above a predetermined threshold as the actual operating power mode.

44. The mobile device of claim 42, wherein the context information comprises one or more of the following:

user context comprising at least a class of motion of mobile device;

environmental context comprising at least one or more of being indoors or outdoors, obstructed or unobstructed RF signal reception, or a combination thereof;

temporal context comprising at least one of time of day, day of week, or a combination thereof.

45. The mobile device of claim 42, wherein the accuracy information comprises at least one of a requested positioning accuracy, an achieved positioning accuracy, an update rate, or a combination thereof.

46. The mobile device of claim 42, wherein the RF environment comprises characteristics of received RF signals.

* * * * *

UNITED STATES PATENT AND TRADEMARK OFFICE
CERTIFICATE OF CORRECTION

PATENT NO.         : 12,096,395 B2
APPLICATION NO.    : 17/476308
DATED              : September 17, 2024
INVENTOR(S)        : David Tuck Page 1 of 1

It is certified that error appears in the above-identified patent and that said Letters Patent is hereby corrected as shown below:

In the Specification

On Column 6 Line 2:
Delete "to the mobile device"

On Column 6 Line 12:
Delete "power mode power mode"
Insert -- power mode --

On Column 7 Line 50:
Delete "power mode power"
Insert -- power --

On Column 62 Line 37:
Delete "1411"
Insert -- 141 --

Signed and Sealed this
Fourth Day of February, 2025

Coke Morgan Stewart
*Acting Director of the United States Patent and Trademark Office*